(12) United States Patent
Choi et al.

(10) Patent No.: US 12,481,334 B2
(45) Date of Patent: Nov. 25, 2025

(54) ELECTRONIC DEVICE COMPRISING ELECTRONIC COMPONENT ARRANGEMENT STRUCTURE

(71) Applicant: SAMSUNG ELECTRONICS CO., LTD., Suwon-si (KR)

(72) Inventors: Nakhyun Choi, Suwon-si (KR); Jooyoung Kang, Suwon-si (KR); Yeonggyu Yoon, Suwon-si (KR); Inkuk Yun, Suwon-si (KR); Wonho Lee, Suwon-si (KR); Joungmin Cho, Suwon-si (KR); Junyoung Choi, Suwon-si (KR); Yangwook Kim, Suwon-si (KR); Hyunju Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 299 days.

(21) Appl. No.: 18/096,777

(22) Filed: Jan. 13, 2023

(65) Prior Publication Data

US 2023/0176615 A1 Jun. 8, 2023

Related U.S. Application Data

(63) Continuation of application No. PCT/KR2021/008279, filed on Jun. 30, 2021.

(30) Foreign Application Priority Data

Jul. 14, 2020 (KR) .................. 10-2020-0086795
Dec. 30, 2020 (KR) .................. 10-2020-0187320

(51) Int. Cl.
*G06F 1/16* (2006.01)
*H04M 1/02* (2006.01)

(52) U.S. Cl.
CPC .......... *G06F 1/1688* (2013.01); *G06F 1/1624* (2013.01); *G06F 1/1652* (2013.01); *H04M 1/0237* (2013.01); *H04M 1/0268* (2013.01)

(58) Field of Classification Search
CPC .... G06F 1/1624; G06F 1/1652; G06F 1/1688; G06F 1/1686; H04M 1/0268; H04M 1/0237

See application file for complete search history.

(56) References Cited

U.S. PATENT DOCUMENTS 10,582,629 B2   3/2020   Xu et al.
10,880,417 B1 * 12/2020   Song ................... H04M 1/0268
(Continued)

FOREIGN PATENT DOCUMENTS

CN   106233361    12/2016
JP   2016-197255  11/2016
(Continued)

OTHER PUBLICATIONS

Office Action issued Sep. 11, 2024 in corresponding U.S. Appl. No. 18/150,595.

(Continued)

*Primary Examiner* — Nidhi Thaker
(74) *Attorney, Agent, or Firm* — Nixon & Vanderhye P.C.

(57) ABSTRACT

According to various embodiments, an electronic device comprises: a first housing including a first space formed through a first side member comprising a first side, a second side extending in a direction perpendicular to the first side, and a third side extending from the second side in parallel with the first side; a second housing slidably coupled to the first housing along a first direction and comprising a second space formed through a second side member; a bendable support connected to the first housing, is, in a slide-in state, at least partially accommodated into the second space, and (Continued)

in a slide-out state, forms a side at least partially coplanar with the first housing; a flexible display supported through the first housing and the bendable support; at least one electronic component disposed in the second space and in communication with an external environment through a first opening formed in at least a portion of the second side member in the slide-in state; and a bendable electrical connection member configured to connect the electronic component to the first space, wherein in the slide-in state, at least a portion of the first side and the third side are accommodated in the second space so as not to be visible from the outside, and the at least one electronic component may be disposed at a position not interfered with by the first side and/or the second side in the slide-in state.

17 Claims, 41 Drawing Sheets

(56) References Cited

U.S. PATENT DOCUMENTS

| | | | | |
|---|---|---|---|---|
| 10,904,371 | B1* | 1/2021 | Song | G06F 1/1656 |
| 11,561,576 | B2* | 1/2023 | Kang | H04M 1/026 |
| 12,072,734 | B2* | 8/2024 | Kang | G06F 1/1624 |
| 12,169,424 | B2* | 12/2024 | Shin | G06F 1/1652 |
| 2006/0222174 | A1 | 10/2006 | Kang | |
| 2007/0275773 | A1 | 11/2007 | Joung et al. | |
| 2008/0058039 | A1 | 3/2008 | Lee | |
| 2011/0058320 | A1 | 3/2011 | Kim | |
| 2013/0141847 | A1 | 6/2013 | Ryu | |
| 2013/0235538 | A1* | 9/2013 | Hashimoto | H04N 5/645 |
| | | | | 361/752 |
| 2015/0230349 | A1 | 8/2015 | Lee et al. | |
| 2017/0064847 | A1 | 3/2017 | Lim | |
| 2017/0068288 | A1 | 3/2017 | Uttermann et al. | |
| 2017/0364119 | A1* | 12/2017 | Lee | G06F 1/1652 |
| 2018/0014417 | A1 | 1/2018 | Seo et al. | |
| 2019/0012544 | A1* | 1/2019 | Park | H04N 25/70 |
| 2019/0053387 | A1 | 2/2019 | Choi et al. | |
| 2019/0268455 | A1 | 8/2019 | Baek et al. | |
| 2019/0278336 | A1 | 9/2019 | Choi et al. | |
| 2019/0310686 | A1 | 10/2019 | Lee et al. | |
| 2020/0020255 | A1 | 1/2020 | Yoon | |
| 2020/0264660 | A1* | 8/2020 | Song | H04M 1/0268 |
| 2020/0363841 | A1* | 11/2020 | Kim | G09F 9/301 |
| 2020/0371558 | A1 | 11/2020 | Kim et al. | |
| 2020/0413557 | A1 | 12/2020 | Zhang | |
| 2021/0135492 | A1* | 5/2021 | Kim | H02J 7/02 |
| 2021/0181801 | A1 | 6/2021 | Yin | |
| 2021/0392224 | A1* | 12/2021 | Noh | G06F 3/048 |
| 2022/0019260 | A1* | 1/2022 | Kang | G06F 1/1698 |
| 2022/0113764 | A1* | 4/2022 | Kwak | H04M 1/0237 |
| 2022/0174829 | A1* | 6/2022 | Choi | G06F 1/1624 |
| 2022/0182477 | A1* | 6/2022 | Kim | G06F 1/1652 |
| 2022/0232716 | A1* | 7/2022 | Lim | H10K 77/00 |
| 2023/0010760 | A1* | 1/2023 | Lee | G06F 1/1658 |
| 2023/0096954 | A1 | 3/2023 | An | |
| 2023/0130795 | A1* | 4/2023 | Yoon | H04M 1/0268 |
| | | | | 361/807 |

FOREIGN PATENT DOCUMENTS

| | | |
|---|---|---|
| JP | 2017-117433 | 6/2017 |
| KR | 10-2012-0009846 | 2/2012 |
| KR | 10-2013-0071606 | 7/2013 |
| KR | 10-2015-0094833 | 8/2015 |
| KR | 10-2016-0149008 A1 | 12/2016 |
| KR | 10-2018-0006533 | 1/2018 |
| KR | 10-2019-0018592 A | 2/2019 |
| KR | 10-2019-0086305 | 7/2019 |
| KR | 10-2019-0101605 | 9/2019 |
| KR | 10-2019-0105858 A | 9/2019 |
| KR | 10-2019-0115888 | 10/2019 |
| KR | 10-2019-0117985 A | 10/2019 |
| KR | 10-2020-0007366 | 1/2020 |

OTHER PUBLICATIONS

Office Action issued Oct. 24, 2024 in corresponding U.S. Appl. No. 18/146,888.
Extended European Search Report and Written Opinion dated Jun. 22, 2023 issued by the European Patent Office for European Patent Application No. 21843380.3.
Notice of Allowance issued May 1, 2024 in corresponding U.S. Appl. No. 18/157,909.
Extended European Search Report dated Oct. 31, 2023 issued in European Patent Application No. 21841844.0.
Extended European Search Report dated Oct. 30, 2023 issued in European Patent Application No. 21842077.6.
Extended European Search Report dated Nov. 8, 2023 issued in European Patent Application No. 21842131.1.
Indian Office Action issued Jan. 5, 2023 in corresponding Indian Patent Application No. 202317002790.
European Office Action dated Mar. 13, 2025 for EP Application No. 21842077.6.
European NOA dated Mar. 12, 2025 for EP Application No. 21841844.0.
European NOA dated Mar. 12, 2025 for EP Application No. 21842131.1.
European NOA dated Feb. 5, 2025 for EP Application No. 21843380.3.
Final Office Action dated Feb. 11, 2025 for U.S. Appl. No. 18/146,888; Shin.
Final Office Action dated Feb. 14, 2025 for U.S. Appl. No. 18/150,595; Kang.
IN Notice of Hearing dated May 5, 2025 issued in Indian Patent Application No. 202317002790, 2 pp.
US Notice of Allowance dated May 19, 2025 issued in U.S. Appl. No. 18/150,595, 21 pp.
US Office Action dated May 2, 2025 issued in U.S. Appl. No. 18/146,888, 26 pp.
KR Notice of Allowance dated Jun. 27, 2025 issued in Korean Patent Application No. 10-2020-0187278 and English translation, 9 pp.
KR Office Action dated Jul. 9, 2025 issued in Korean Patent Application No. 10-2020-0187264 and English translation, 15 pp.
Korean Notice of Allowance dated Sep. 5, 2025 issued in Korean Patent Application No. 10-2020-0187320, 7 pp.
Korean Notice of Allowance dated Sep. 5, 2025 issued in Korean Patent Application No. 10-2020-0187341, 7 pp.

* cited by examiner

ELECTRONIC DEVICE COMPRISING ELECTRONIC COMPONENT ARRANGEMENT STRUCTURE

CROSS-REFERENCE TO RELATED APPLICATIONS

This application is a continuation of International Application No. PCT/KR2021/008279 designating the United States, filed on Jun. 30, 2021, in the Korean Intellectual Property Receiving Office and claiming priority to Korean Patent Application No. 10-2020-0086795, filed on Jul. 14, 2020, in the Korean Intellectual Property Office, and to Korean Patent Application No. 10-2020-0187320, filed on Dec. 30, 2020, in the Korean Intellectual Property Office, the disclosures of all of which are incorporated by reference herein in their entireties.

BACKGROUND

Field

The disclosure relates to an electronic device including an electronic component arrangement structure.

Description of Related Art

Electronic devices are gradually becoming slimmer, and are being improved to increase their rigidity, strengthen their design aspects, and differentiate their functional features. The electronic device is being developed to have various shapes, departing from a uniform rectangular shape. The electronic device may have a deformable structure that provides high portability and also provides a large-screen display in use. In connection with such a deformable structure, the electronic device may have a structure (e.g., a rollable structure or a slidable structure) capable of varying the display area of a flexible display through support of housings that slide with respect to each other. This electronic device may have an arrangement structure of electronic components in consideration of a combining structure of housings that operate in a sliding manner.

The electronic device may include a deformable slidable electronic device (e.g., a rollable electronic device) capable of expanding a display area. The slidable electronic device may include a first housing (e.g., a first housing structure, a base housing, a base bracket, or a base structure) and a second housing (e.g., a second housing structure, a slide housing, a slide bracket, or a slide structure) which can be fitted together at least in part and flexibly combined with each other. For example, the first housing and the second housing operate to be slidable with respect to each other and support at least a part of a flexible display (or expandable display), thereby enabling the flexible display to have a first display area in a slide-in state and to have a second display area greater than the first display area in a slide-out state.

The slidable electronic device may include a plurality of electronic components disposed in an inner space. Because these electronic components require different mounting spaces, it may be difficult to arrange them in the inner space of housings that slide with respect to each other. For example, electronic components that perform their functions by being connected to the outside may be disposed in the inner space of the electronic device at a position corresponding to at least one opening formed in the housings.

However, these electronic components may not fully perform their functions due to an assembly tolerance or a gap between two housings that perform the sliding operation. For example, in the case that the electronic components include a speaker or a receiver, sound generated from the speaker may not be properly transmitted to the outside due to a phenomenon, such as a sound leak, by an assembly tolerance or gap between two housings.

SUMMARY

Embodiments of the disclosure may provide an electronic device including an electronic component arrangement structure.

Embodiments of the disclosure provide an electronic device including an arrangement structure of electronic components that can perform their functions regardless of a sliding operation.

Embodiments of the disclosure provide an electronic device including an electronic component arrangement structure that can be firmly supported in an inner space of a housing.

According to various example embodiments, an electronic device includes: a first housing having a first space formed through a first lateral portion including a first side surface, a second side surface extending in a direction perpendicular to the first side surface, and a third side surface extending from the second side surface and parallel to the first side surface; a second housing slidably combined with the first housing along a first direction and having a second space formed through a second lateral portion; a bendable support connected to the first housing, accommodated at least in part in the second space in a slide-in state, and coplanar at least in part with the first housing in a slide-out state; a flexible display including a first portion disposed to be visible from outside in the slide-in state, and a second portion extending from the first portion and accommodated in the second space through the bendable support so as not to be visible at least in part from the outside; at least one electronic component disposed in the second space and communicating with an external environment through a first opening formed in at least a part of the second lateral portion in the slide-in state; and a bendable electrical connection member comprising a conductor connecting the electronic component to the first space. At least a part of the first and third side surfaces may be accommodated in the second space in the slide-in state so as not to be visible from the outside, and the at least one electronic component may be disposed at a position not subject to interference from the first side surface and/or the second side surface in the slide-in state.

According to various example embodiments of the disclosure, the electronic device includes at least one electronic component, which is disposed in the inner space of the second housing which is not subject to interference from the sliding operation of the first housing even in the slide-in state, and also electrically connected to the first housing through the FPCB. Therefore, it is possible to reduce the performance degradation of the electronic component due to interference between the two housings caused by the sliding operation.

In addition, various effects explicitly or implicitly appreciated through the disclosure may be provided.

BRIEF DESCRIPTION OF THE DRAWINGS

In relation to the description of drawings, the same or similar reference numerals may be used for the same or similar components. Further, the above and other aspects, features and advantages of certain embodiments of the present disclosure will be more apparent from the following detailed description, taken in conjunction with the accompanying drawings, in which.

DETAILED DESCRIPTION

Figure 1:
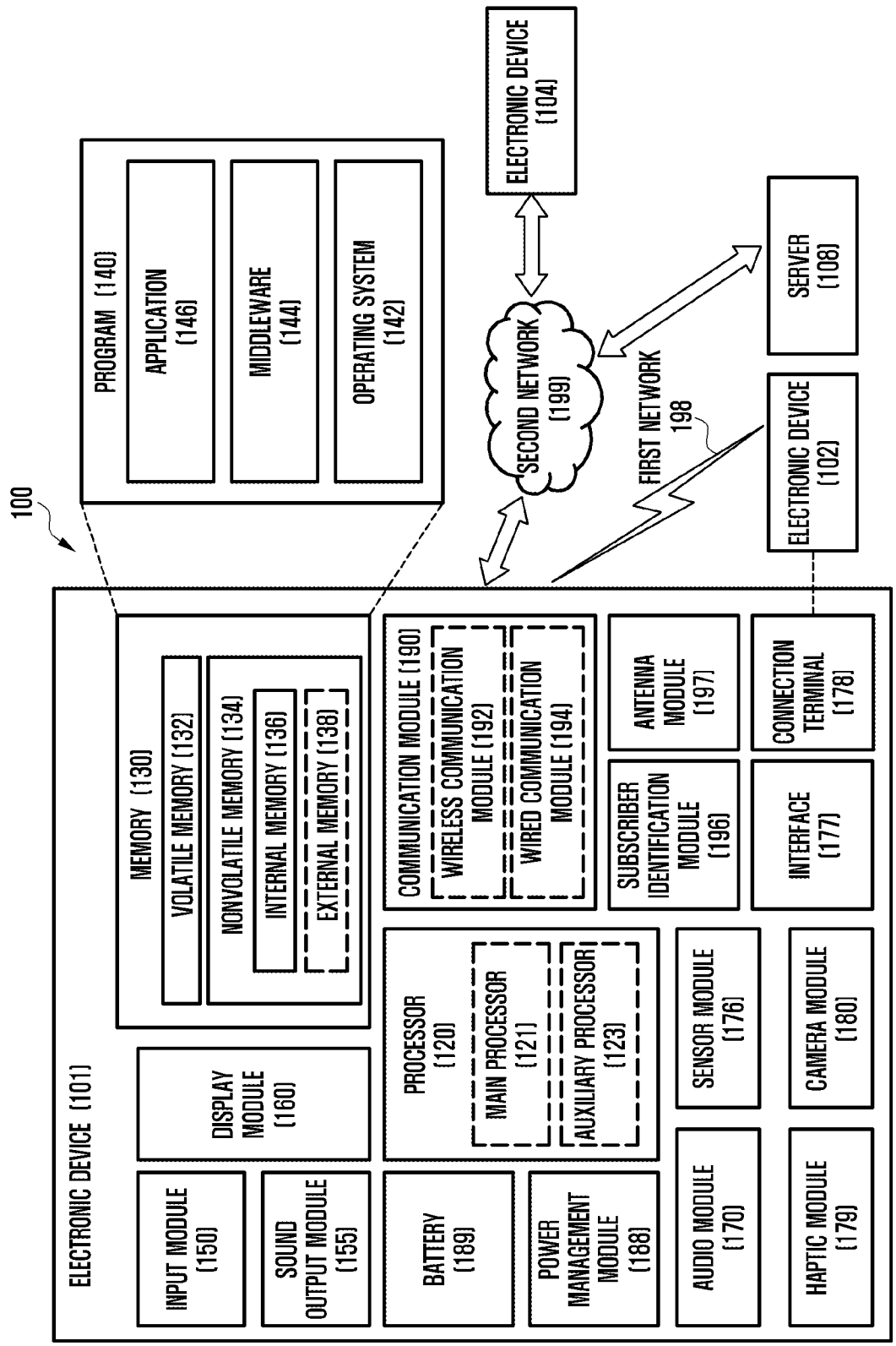
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
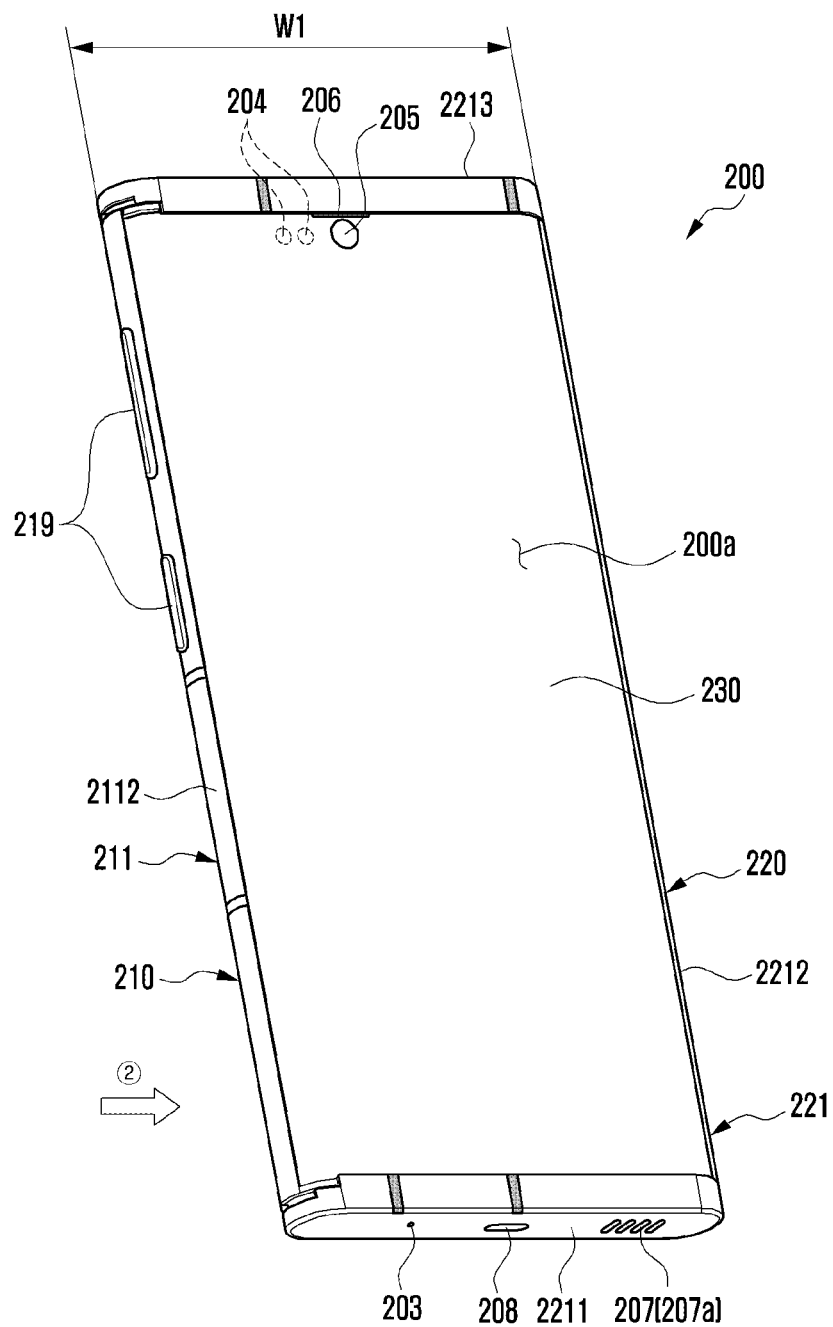
FIG. 2A and FIG. 2B are diagrams illustrating a front surface and a rear surface of an electronic device in a slide-in state, respectively, according to various embodiments.
Figure 2B:
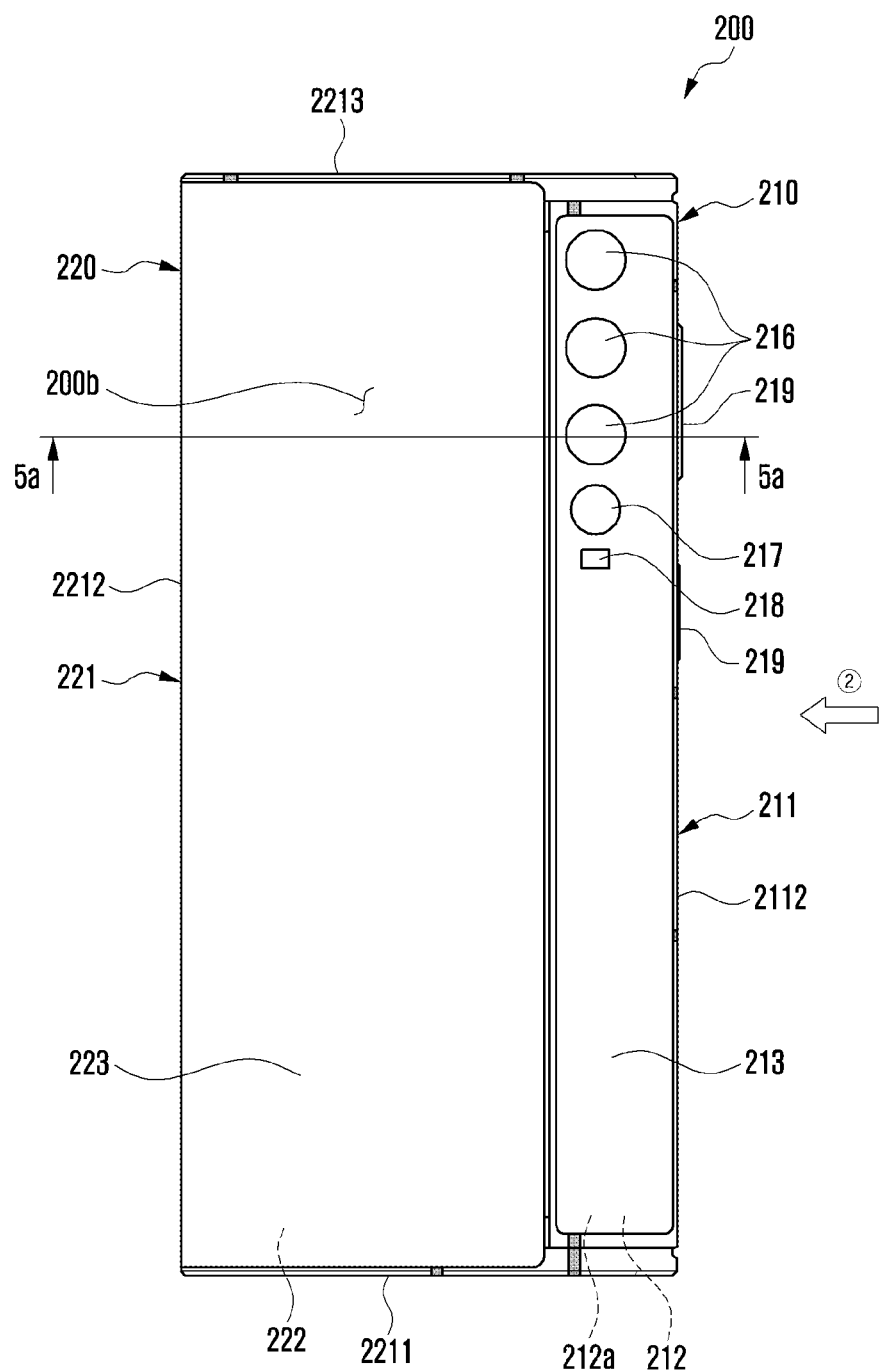
Figure 3A:
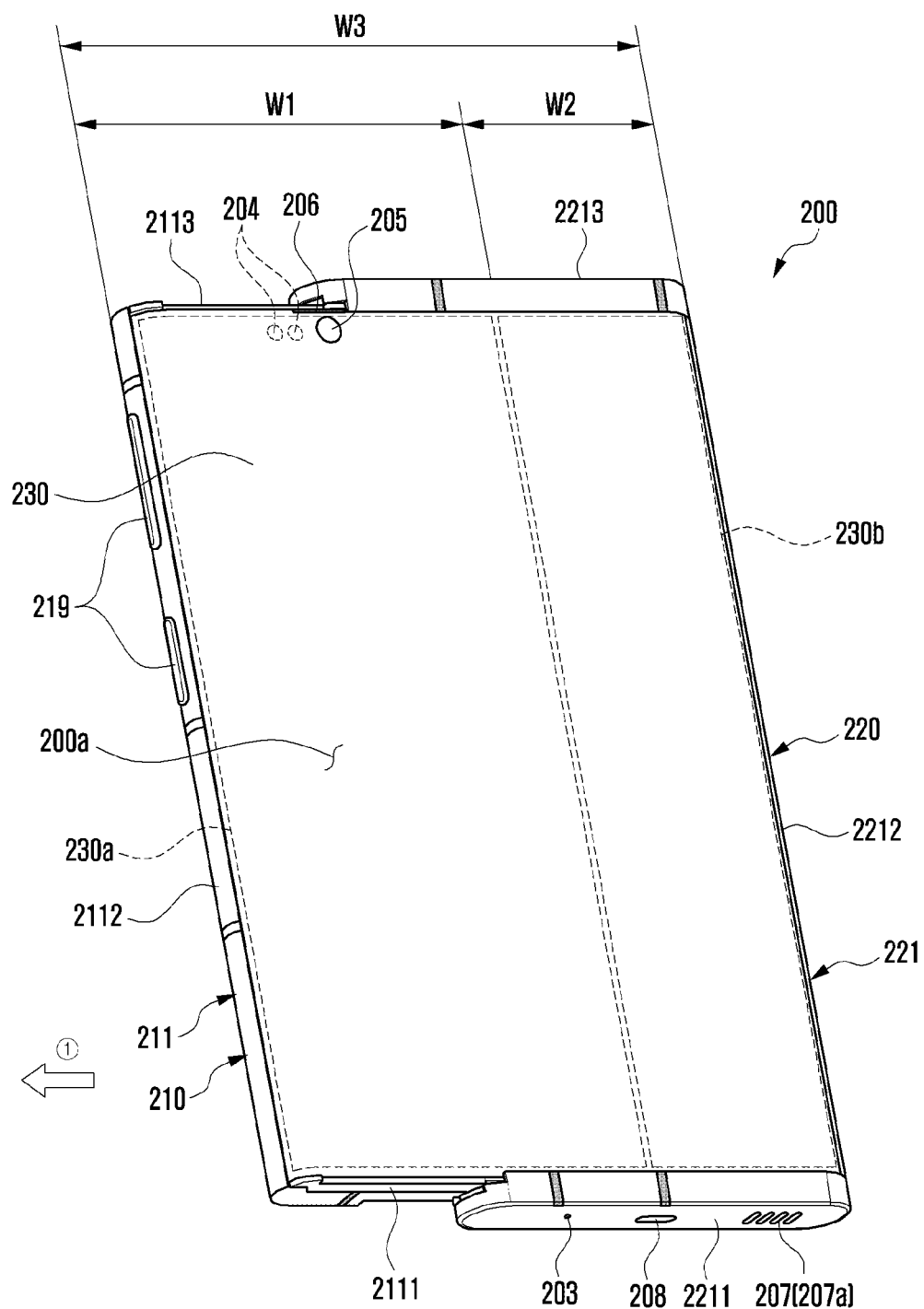
FIG. 3A and FIG. 3B are diagrams illustrating a front surface and a rear surface of an electronic device in a slide-out state, respectively, according to various embodiments.
Figure 3B:
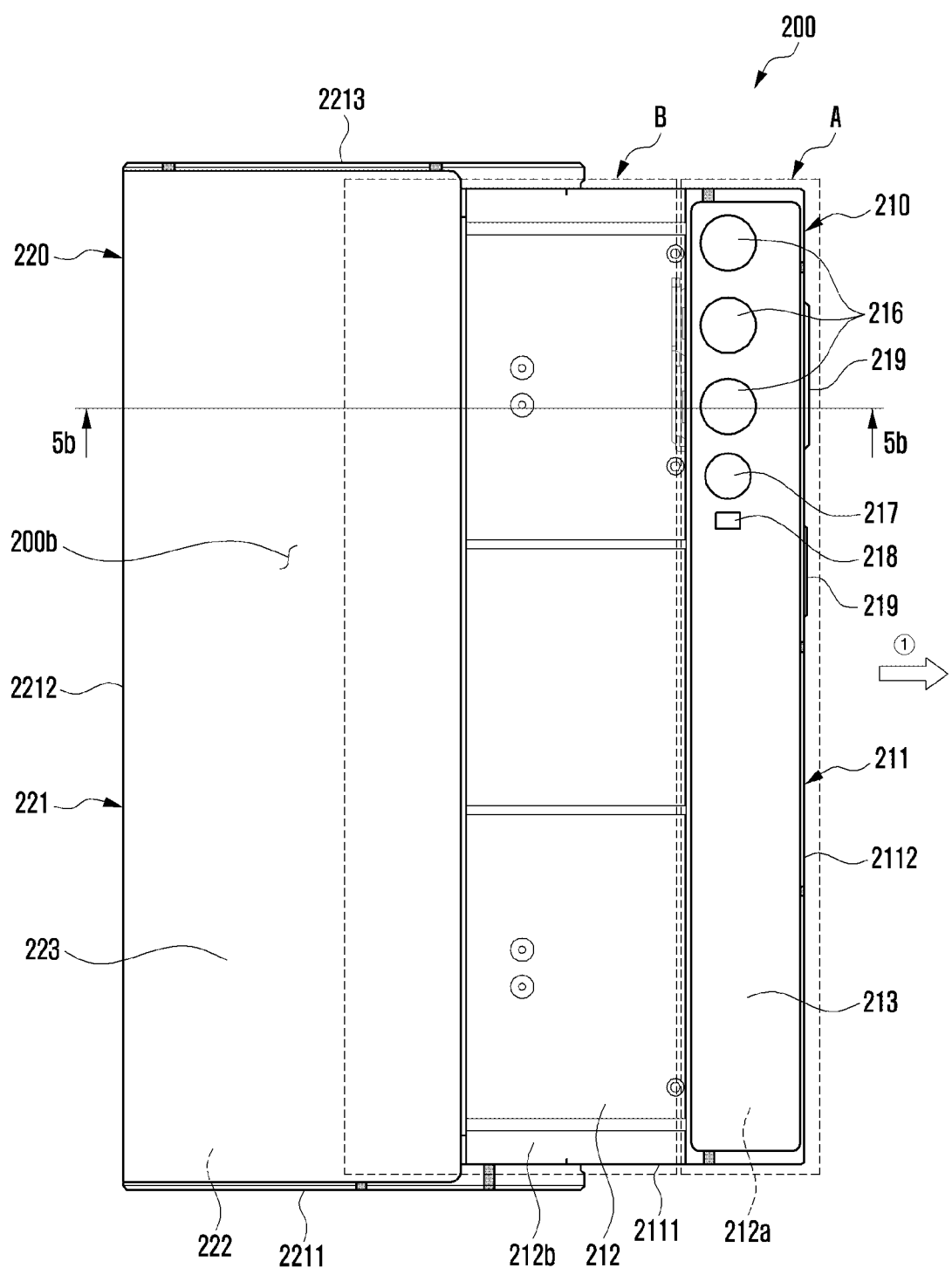

FIG. 2A and FIG. 2B are diagrams illustrating a front surface and a rear surface of an electronic device in a slide-in state, respectively, according to various embodiments. FIG. 3A and FIG. 3B are diagrams illustrating a front surface and a rear surface of an electronic device in a slide-out state, respectively, according to various embodiments.

An electronic device 200 of FIGS. 2A, 2B, 3A and 3B (which may be referred to as FIGS. 2A to 3B) may be at least partially similar to the electronic device 101 of FIG. 1, or may further include various embodiments of an electronic device.

Referring to FIGS. 2A to 3B, the electronic device 200 may include a first housing 210 (e.g., a first housing structure or a base housing), a second housing 220 (e.g., a second housing structure or a slide housing) coupled to be movable from the first housing 210 in a predetermined (e.g., specified) first direction (direction ①) and a second direction (direction ②) opposite to the first direction (direction ①), and a flexible display 230 (e.g., an expandable display) disposed to be supported by at least a portion of the first housing 210 and the second housing 220. According to an embodiment, the electronic device 200 may be at least partially connected to at least a portion of the first housing 210 in a slide-out state and may be at least partially accommodated in the inner space (e.g., a second space 2201 of FIG. 5A) of the second housing 220 in a slide-in state, thereby including a bendable member (or a bendable support member, bendable support, etc.) (e.g., a bendable member 240 of FIG. 5A) (e.g., a multi-joint hinge module) configured to support the flexible display 230. According to an embodiment, at least a portion of the flexible display 230 may be accommodated in the inner space (e.g., the second space 2201 of FIG. 5A) of the second housing 220 in a slide-in state while being supported by the bendable member (e.g., the bendable member 240 of FIG. 5A), and thus may be disposed to prevent and/or reduce the portion from being viewed from the outside. According to an embodiment, at least a portion of the flexible display 230 may be disposed to be visible from the outside in a slide-out state while being supported by the bendable member (e.g., the bendable member 240 of FIG. 5A) at least partially forming the same plane as the first housing 210.

According to various embodiments, the electronic device 200 may include a front surface 200a (e.g., a first surface), a rear surface 200b (e.g., a second surface) facing a direction opposite to the front surface 200a, and a side surface (not shown) surrounding a space between the front surface 200a and the rear surface 200b. According to an embodiment, the electronic device 200 may include a first housing 210 including a first side surface member 211 and a second housing 220 including a second side surface member 221. According to an embodiment, the first side surface member 211 may include a first side surface 2111 having a first length along a first direction (direction ①), a second side surface 2112 extending from the first side surface 2111 to have a second length greater than the first length along a direction substantially perpendicular to the first side surface, and a third side surface 2113 extending from the second side surface 2112 to be substantially parallel to the first side surface 2111 and having the first length. According to an embodiment, the first side surface member 211 may be at least partially configured of a conductive material (e.g., metal). According to an embodiment, the first side surface member 211 may include a first support member 212 extending to at least a portion of the inner space (e.g., a first space 2101 of FIG. 5A) of the first housing 210. For example, the first side surface member 211 may be integrally configured with the first support member 212. For another example, the first support member 212 may be configured separately from the first side surface member 211 to be structurally coupled to the first side surface member 211.

According to various embodiments, the second side surface member 221 may include a fourth side surface 2211 at least partially corresponding to the first side surface 2111 and having a third length, a fifth side surface 2212 extending from the fourth side surface 2211 in a direction substantially parallel to the second side surface 2112 and having a fourth length greater than the third length, and a sixth side surface 2213 extending from the fifth side surface 2212 to correspond to the third side surface 2113 and having the third length. According to an embodiment, the second side surface member 221 may be at least partially configured of a conductive material (e.g., metal). According to an embodiment, at least a portion of the second side surface member 221 may include a second support member 222 extending to at least a portion of the inner space (e.g., the second space 2201 of FIG. 5) of the second housing 220. For example, the second side surface member 221 may be integrally configured with the second support member 222. For another example, the second support member 222 may be configured separately from the second side surface member 221 to be coupled to the second side surface member 221. According to an embodiment, the first side surface 2111 and the fourth side surface 2211 and/or the third side surface 2113 and the sixth side surface 2213 may be coupled to be slidable with respect to each other. According to an embodiment, at least a portion of the first side surface 2111 may overlap at least a portion of the fourth side surface 2211 in a slide-in state, and thus may be disposed to prevent and/or reduce the at least portion of the first side surface 2111 from being viewed from the outside. According to an embodiment, at least a portion of the third side surface 2113 may overlap at least a portion of the sixth side surface 2213 in a slide-in state, and thus may be disposed to be not visible from the outside. According to an embodiment, in a slide-in state, at least a portion of the first support member 212 may overlap the second support member 222 and the rest portion of the first support member 212 may be disposed to be visible from the outside. Therefore, the first support member 212 may include a non-overlapping portion 212a which does not overlap the second support member 222 and an overlapping portion 212b which overlaps the second support member 222 in a slide-in state. In an embodiment, the non-overlapping portion 212a and the overlapping portion 212b may be integrally configured. In an embodiment, the non-overlapping portion 212a and the overlapping portion 212b may be separately provided and be structurally coupled.

Figure 4:
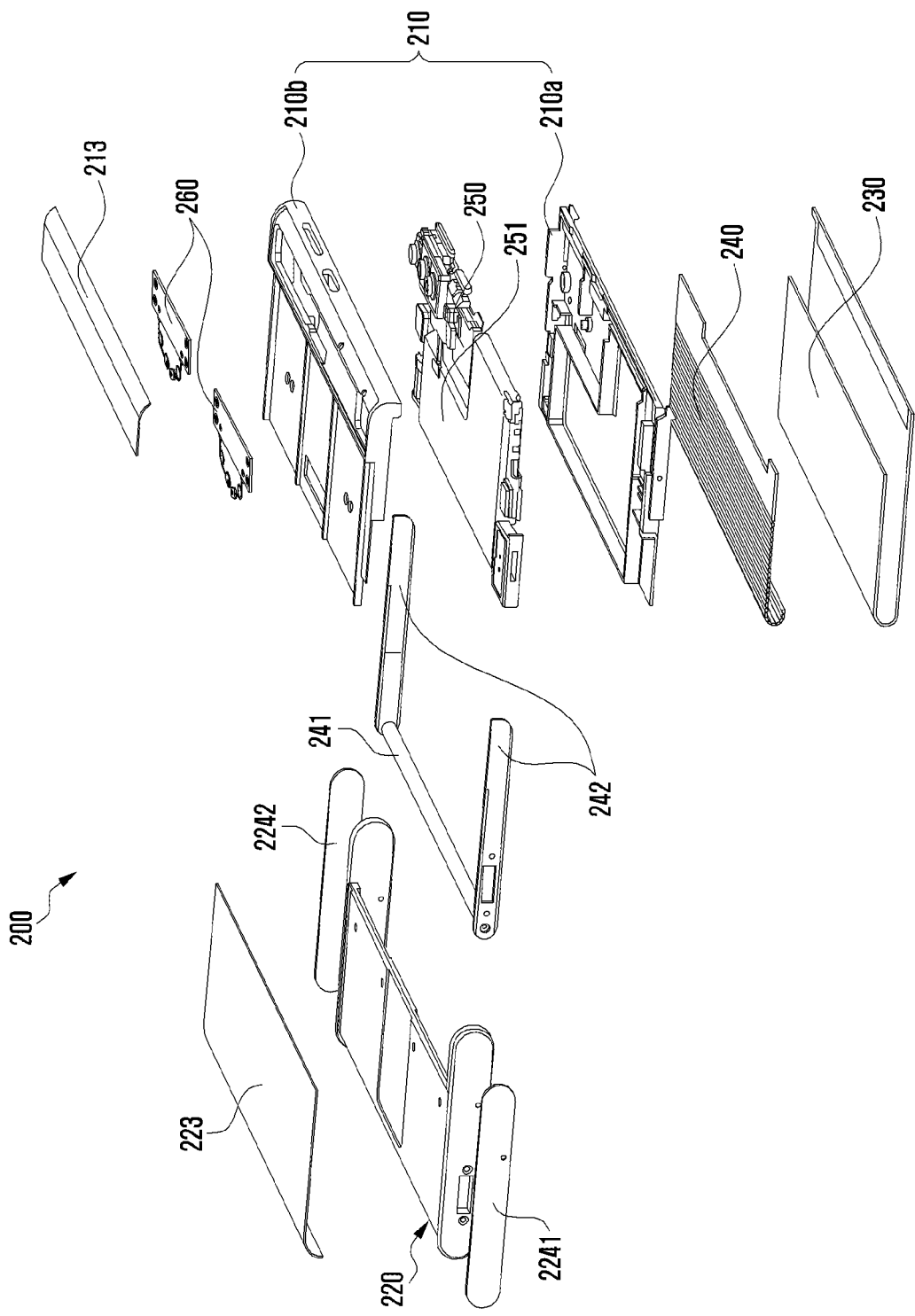
FIG. 4 is an exploded perspective view of an electronic device according to various embodiments.
Figure 5A:
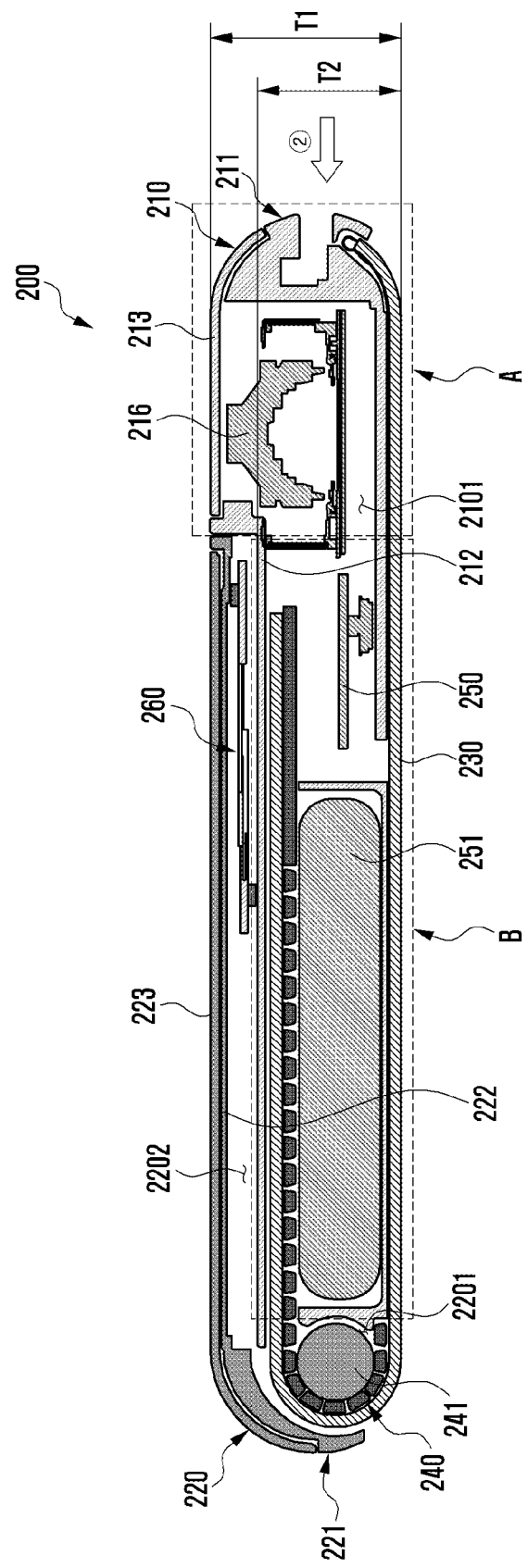
FIG. 5A is a cross-sectional view of the electronic device taken along line 5a-5a of FIG. 2B according to various embodiments.

According to various embodiments, the first housing 210 may include a first sub-space A corresponding the non-overlapping portion 212a and a second sub-space B corresponding to the overlapping portion 212b in the first space (e.g., the first space 2101 of FIG. 5A). According to an embodiment, the first sub-space A and the second sub-space B may be arranged to be at least partially connected to each other or separated from each other. According to an embodiment, the first sub-space A may be configured in a shape different from that of the second sub-space B. This may result from the overlapping structure in which the second support member 222 and the first support member 212 overlap each other in an area corresponding to the second sub-space B. According to an embodiment, the first sub-space A and the second sub-space B may be configured to have heights or space volumes different from each other. According to an embodiment, the electronic device 200 may include a plurality of electronic components (e.g., a camera module 216, a sensor module 217, a flash 218, a main board (e.g., a main board 250 of FIG. 4), or a battery (e.g., a battery 251 of FIG. 4)) arranged in the first space (e.g., the first space 2101 of FIG. 5) of the first housing 210. According to an embodiment, the first sub-space A may be used, for example, as an area in which electronic components (e.g., a camera module 216, a sensor module 217, or a flash 218), the operation of which requires a comparatively large mounting space, a relatively large mounting thickness, or avoiding an overlapping structure, are arranged. According to an embodiment, the second sub-space B may be used, for example, as an area in which electronic components (e.g., the main board 250 (PCB) of FIG. 4 or a battery (e.g., a battery 251 of FIG. 4)), which require a comparatively small mounting space or a relatively small mounting thickness or are operable regardless of an overlapping structure, are arranged.

According to various embodiments, the front surface 200a and the rear surface 200b of the electronic device 200 may have variable areas according to a slide-in state and a slide-out state. In an embodiment, the electronic device 200 may include a first rear surface cover 213 disposed in at least a portion of the first housing 210 and a second rear surface cover 223 disposed on at least a portion of the second housing 220 in the rear surface 200b. According to an embodiment, the first rear surface cover 213 and/or the second rear surface cover 223 may be arranged to be coupled to at least a portion of the first support member 212 and the second support member 213. In an embodiment, the first rear surface cover 213 may be configured integrally with the first side surface member 211. For another example, the second rear surface cover 223 may be configured integrally with the second side surface member 221. According to an embodiment, the first rear surface cover 213 and/or the second rear surface cover 223 may be configured of a polymer, coated or colored glass, ceramic, metal (e.g., aluminum, stainless steel (STS), or magnesium), or a combination of at least two of the above materials. In an embodiment, the first rear surface cover 213 may extend to at least a portion of the first side surface member 211. In an embodiment, the second rear surface cover 223 may extend to at least a portion of the second side surface member 211. In an embodiment, at least extending portion of the first side surface member 211 of the first rear surface cover 213 may be configured to have a curved surface. In an embodiment, at least extending portion of the second side surface member 221 of the second rear surface cover 223 may be configured to have a curved surface. In an embodiment, at least a portion of the first support member 212 may be substituted by the first rear surface cover 213, and at least a portion of the second support member 222 may be substituted by the second rear surface cover 223.

According to various embodiments, the electronic device 200 may include a first housing 210 and a flexible display 230 disposed to be supported by at least a portion of a second housing 220. According to an embodiment, the flexible display 230 may include a first portion 230a (e.g., a flat surface part) which is visible from the outside and a second portion 230b (e.g., a bendable part) extending from the first portion 230a and at least partially introduced to the inner space (e.g., the first space 2101 in FIG. 5A) of the second housing 220 so as to prevent and/or reduce the second portion 230b from being viewed from the outside in a slide-in state. According to an embodiment, the first portion 230a may be disposed to be supported by the first housing 210, and the second portion 230b may be disposed to be at least partially supported by the bendable member (e.g., the bendable member 240 in FIG. 5A and FIG. 5B). According to an embodiment, in a state where the first housing 210 is slid out along a predetermined first direction (direction ①), at least a portion of the second portion 230b of the flexible display 230 may extend from the first portion 230a while being supported by the bendable member (e.g., the bendable member 240 of FIG. 5A), configure substantially the same plane as the first portion 230a, and be disposed to be visible from the outside. According to an embodiment, in a state where the first housing 210 is slid in along a predetermined second direction (direction ②), at least a portion of the second portion 230b of the flexible display 230 may be slid in the inner space (e.g., the second space 2201 of FIG. 5A) of the second housing 220, and be disposed to prevent and/or reduce the at least a portion from being viewed from the outside. Therefore, in the electronic device 200, the display area of the flexible display 230 may vary as the first housing 210 slides along the predetermined direction from the second housing 220.

According to various embodiments, the first housing 210 and the second housing 220 may operate in a sliding manner with respect to each other to allow the total width to be variable. According to an embodiment, the electronic device 200 may be configured to have a first width W1 from the second side surface 2112 to the fourth side surface in a slide-in state. According to an embodiment, in a slide-out state, the electronic device 200 may be configured to have a third width W3 greater than the first width W1, by allowing a portion of the bendable member (e.g., the bendable member 240 of FIG. 5A) slid in the inner space (e.g., the second space 2201 of FIG. 5A) of the second housing 210 to be moved to have an additional second width W2. For example, the flexible display 230 may have a display area substantially corresponding to the first width W1 in a slide-in state, and have an expanded display area substantially corresponding to the third width W3 in a slide-out state.

According to various embodiments, a slide-out operation of the electronic device 200 may be performed by a user's operation. For example, the electronic device 200 may be switched from a slide-in state to a slide-out state via an operation of the flexible display 230 which is moved in a predetermined first direction (direction ①) by a user's operation. According to an embodiment, the electronic device 200 may be switched from a slide-out state to a slide-in state via an operation of the flexible display 230 which is moved in a predetermined second direction (direction ②) by a user's operation. According to an embodiment, the electronic device 200 may maintain a slide-out state and/or a slide-in state by being pressed in a direction in which the first housing 210 is to be slid in or slid out from the second housing with reference to a predetermined inflection point via a slide hinge module (e.g., a slide hinge module 260 of FIG. 5A) disposed between the first housing 210 and the second housing 220. In an embodiment, the electronic device 200 may be configured to allow the first housing 210 to be slid out in a predetermined first direction (e.g., direction ①) by an operation of a locker exposed through the rear surface 200b of the electronic device 200. In an embodiment, the electronic device 200 may be automatically operated via a drive mechanism (e.g., a drive motor, a deceleration module, and/or a gear assembly) disposed in the inner space (e.g., the first space 2101 of FIG. 5A) of the first housing 210 and/or the inner space (e.g., the second space 2201 of FIG. 5A) of the second housing 220. According to an embodiment, the electronic device 200 may be configured to control an operation of the second housing 220 via a drive mechanism via a processor (e.g., a processor 120 of FIG. 1), if an event for switching of a slide-in and slide-out state of the electronic device 200 is detected. In an embodiment, the processor (e.g., the processor 120 of FIG. 1) of the electronic device 200 may control the flexible display 230 to display an object in various manners and execute an application program, in response to the display area of the flexible display 230, the display area having been changed according to a slide-in state, a slide-out state, or an intermediate state (e.g., including an arbitrarily stopped state). For example, an intermediate state may refer to a middle state between a slide-in state and a slide-out state. For example, a state changing from a slide-in state to a slide-out state may be called an intermediate state. For another example, a state change from a slide-out state to a slide-in state may be called an intermediate state.

According to various embodiments, the electronic device 200 may include at least one of an input device 203, sound output devices 206 and 207, sensor modules 204 and 217, camera modules 205 and 216, a connector port 208, a key input device 219, or an indicator (not shown). In an embodiment, the electronic device 200 may be configured such that at least one of the above-described components is omitted or other components are additionally included.

According to various embodiments, the input device 203 may include a microphone. In an embodiment, the input device 203 may include a plurality of microphones arranged to detect the direction of sound. The sound output devices 206 and 207 may include a speaker. The sound output devices 206 and 207 may include a receiver 206 for a call and an external speaker 207. According to an embodiment, the external speaker 207 may be disposed in the second housing and be configured to transmit sound to the outside through a first speaker hole 207a. According to an embodiment, the external speaker 207 may be disposed in the inner space (e.g., the second space 2201 of FIG. 5A) of the second housing 220, and thus may provide sound of excellent quality to a user, regardless of a sliding operation of the first housing 210. According to an embodiment, the connector port 208 may be disposed in the inner space (e.g., the inner space 2201 of FIG. 5A) of the second housing 220 together with the external speaker 207. In an embodiment, the connector port 208 may be disposed in the inner space of the first housing 210, and in a slide-in state, may face the outside through a connector port hole (not shown) extending through the second housing 220. In this case, the connector port 208 may be configured to be covered via the second housing 220 in a slide-in state. According to an embodiment, the receiver 206 may be configured to correspond to an external environment in the inner space (e.g., the first space of FIG. 5A) of the first housing 210. In this case, the first housing may include a sound release hole (e.g., a sound release hole 206a of FIG. 17). According to an embodiment, the sound release hole (e.g., the sound release hole 206a of FIG. 17) may be covered to maintain sound release performance and to prevent and/or reduce the sound release hole from being viewed from the outside via at least a portion of the second housing 220. In an embodiment, the sound output devices 206 and 207 may include a speaker (e.g., a piezo speaker) which is operated while a separate speaker hole is excluded.

According to various embodiments, the sensor modules 204 and 217 may produce an internal operation state of the electronic device 200 or an electric signal or a data value corresponding to an external environmental state. The sensor modules 204 and 217 may include a first sensor module 204 (e.g., a proximity sensor or an illuminance sensor) disposed on the front surface 200a of the electronic device 200 and a second sensor module 217 disposed on the rear surface 200b of the electronic device 200. According to an embodiment, the first sensor module 204 may be disposed under the flexible display 230 at the side of the front surface 200a of the electronic device 200. According to an embodiment, the first sensor module 204 and/or the second sensor module 217 may include at least one of a proximity sensor, an illuminance sensor, a time of flight (TOF) sensor, an ultrasonic sensor, a fingerprint recognition sensor, a gesture sensor, a gyro sensor, a barometric pressure sensor, a magnetic sensor, an acceleration sensor, a grip sensor, a color sensor, an infrared (IR) sensor, a biometric sensor, a temperature sensor, and a humidity sensor.

According to various embodiments, the camera modules 205 and 216 may include a first camera module 205 disposed on the front surface 200a of the electronic device 200 and a second camera module 216 disposed on the rear surface 200b of the electronic device 200. According to an embodiment, the electronic device 200 may include a flash 218 located adjacent to the second camera module 216. According to an embodiment, the camera modules 205 and 216 may include one or more lenses, image sensors, and/or image signal processors. According to an embodiment, the first camera module 205 may be disposed under the flexible display 230 and be configured to photograph an object through a portion of an active area of the flexible display 230. According to an embodiment, the flash 218 may include, for example, a light emitting diode or a xenon lamp.

According to various embodiments, the first camera module 205 of the camera modules 205 and 216 and a sensor module 204 among the sensor modules 204 and 217 may be arranged to come in contact with an external environment through an opening or a transmitting area perforated through the flexible display 230, in the inner space (e.g., the first space 2101 of FIG. 5A) of the electronic device 200. According to an embodiment, an area facing the first camera module 205 of the flexible display 230 may be configured to be a transmitting area having a predetermined transmittance as a portion of an area of displaying contents. According to an embodiment, the transmitting area may be configured to have a transmittance in the range of about 5% to about 20%. Such a transmitting area may include an area which overlaps an effective area (e.g., an angle-of-view area) of the first camera module 205 and through which light for forming an image by means of an image sensor passes. For example, the transmitting area of the flexible display 230 may include an area in which the density of pixels and/or the density of wiring is lower than that of the surrounding area. For example, the transmitting area may replace the opening described above. For example, a camera module 205 may include an under display camera (UDC). In an embodiment, the sensor module 204 may be disposed in the inner space of the electronic device 200 to perform a function without being visually exposed through the flexible display 230. According to an embodiment, the second camera module 216 of the camera modules 205 and 216 and/or the sensor module 217 among the sensor modules 204 and 217 may be arranged in the inner space (e.g., the first space 2101 of FIG. 5A) of the electronic device 200 to correspond to an external environment through at least a portion (e.g., a first rear surface cover 213) of the first housing. The second camera module and/or the sensor module 217 may be arranged at predetermined positions of the first housing 210 to be visible from the outside regardless of a slide-in state and/or a slide-out state.

FIG. 4 is an exploded perspective view of an electronic device according to various embodiments.

Referring to FIG. 4, an electronic device 200 may include a first housing 210 including a first space (e.g., the first space 2101 of FIG. 5A), a second housing 220 slidably coupled to the first housing 210 and including a second space (e.g., the second space 2201 of FIG. 5A), a bendable member 240 disposed to be at least partially rotatable in the second space (e.g., the second space 2201 of FIG. 5A), a flexible display 230 disposed to be supported by the first housing 210 and at least a portion of the bendable member 240, and at least one slide hinge module 260 configured to press the first housing 210 from the second housing 220 in a direction to slide the first housing in or out. According to an embodiment, the first space (e.g., the first space 2101 of FIG. 5A) of the first housing 210 may be provided by coupling a first bracket housing 210a (e.g., a front bracket housing) and a second bracket housing 210b (e.g., a rear bracket housing). In an embodiment, at least a portion of the first bracket housing 210a and/or the second bracket housing 210b may include at least a portion of the first side surface member 211 or the first support member (e.g., the first support member 212 of FIG. 3B), or may be replaced by the first support member 212. According to an embodiment, the electronic device 200 may include a main board 250 disposed in a first space (e.g., the first space 2101 of FIG. 5A). According to an embodiment, the electronic device 200 may include a camera module (e.g., the camera module 216 of FIG. 3B) disposed in the first space (e.g., the first space 2101 of FIG. 5A) or a sensor module (e.g., the sensor module 217 of FIG. 3B). According to an embodiment, the bendable member 240 may be disposed to have one end fixed to the first housing 210 and the other end to be received in the second space (e.g., the second space 2201 of FIG. 5A) of the second housing 220 to be at least partially rotatable. According to an embodiment, the bendable member 240 may include a plurality of multi-bars rotatably connected to each other. According to an embodiment, the bendable member 240 may be supported by a shaft-shaped support member 241 disposed in the second space (e.g., the second space 2201 of FIG. 5A). According to an embodiment, the support member 241 may include a support roller rotatably disposed in the second space (e.g., the second space 2201 of FIG. 5A). In an embodiment, the electronic device 200 may include a tension providing member disposed in the inner space (e.g., the second space 2201 of FIG. 5A) of the electronic device 200 and configured to provide tension to prevent and/or reduce sagging of the flexible display 230 during movement by supporting the rear surface of the bendable member 240. According to an embodiment, the tension providing member may include a tension belt of a metal material.

According to various embodiments, the bendable member 240 may be at least partially accommodated in the second space (e.g., the second space 2201 of FIG. 5A) in a slide-in state, and may be at least partially slid out from the second space (e.g., the second space 2201 of FIG. 5A) so as to form substantially the same plane as the first housing 210 in a slide-out state. Therefore, the flexible display 230 supported by the first housing 210 and the bendable member 240 may have a variable display area according to a sliding operation. According to an embodiment, the electronic device 200 may further include a guide rail 242 disposed on a side surface of the coupled first bracket housing 210a and second bracket housing 210b and configured to be guided in the inner space (e.g., the second space 2201 of FIG. 5) of the second housing 220. In an embodiment, the electronic device 200 may include at least one cover member 2241 and 2242 arranged at opposite side surfaces of the second support member (e.g., the second support member 222 of FIG. 3B) of the second housing 220. According to an embodiment, the at least one cover member 2241 and 2242 may include a first cover member 2241 disposed to at least partially cover the fourth side surface (e.g., the fourth side surface 2211 of FIG. 2A) of the second housing 220 and a second cover member 2242 disposed to at least partially cover the sixth side surface (e.g., the sixth side surface 2213 of FIG. 2A) of the second housing 220.

Figure 5B:
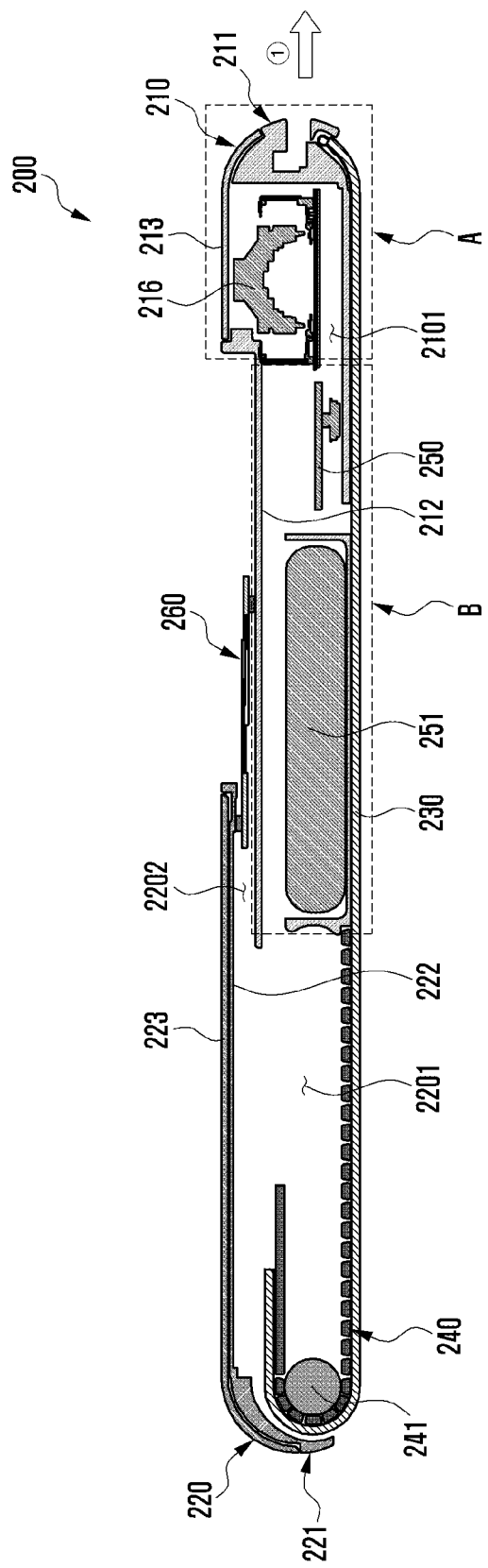
FIG. 5B is a cross-sectional view of the electronic device taken along line 5b-5b of FIG. 3B according to various embodiments.

FIG. 5A is a cross-sectional view of the electronic device taken along line 5a-5a of FIG. 2B according to various embodiments. FIG. 5B is a cross-sectional view of the electronic device taken along line 5b-5b of FIG. 3B according to various embodiments.

Referring to FIGS. 5A 5B, an electronic device 200 may include a first housing 210 including a first space 2101, a second housing 220 including a second space 2201, a bendable member 240 connected to the first housing 210 and at least partially received in the second space 2201 in a slide-in state, a flexible display 230 disposed to be supported by at least a portion of the bendable member 240 and at least a portion of the first housing 210, and a slide hinge module 260 disposed in a third space 2202 between the first housing 210 and the second housing 220 and configured to press the first housing from the second housing 220 in a direction (direction ①)) to slide the first housing out or in. According to an embodiment, the electronic device 200 may include a plurality of electronic components. According to an embodiment, the plurality of electronic components may be arranged in the first space 2101 of the first housing 210. According to an embodiment, the first space 2101 may include a first sub-space A and a second sub-space B connected to the first sub-space A. According to an embodiment, the second sub-space B may include a space corresponding to an area in which a portion of the first housing 210 and a portion of the second housing 220 overlap each other, in the rear surface (e.g., the rear surface 200b of FIG. 3B) of the electronic device 200, when the electronic device 200 is in a slide-in state.

According to various embodiments, first electronic components of the plurality of electronic components, the operation of which requires a comparatively large mounting space, a relatively large mounting thickness T1 of the electronic device 200, or avoiding the overlapping structure of the two housings 210 and 220, may be arranged in the first sub-space A. According to an embodiment, the first electronic components may include a camera module 216, a sensor module (e.g., the sensor module 217 of FIG. 3B), or a flash (e.g., the flash 218 of FIG. 3B). At least a portion of the first electronic components may be arranged to face an external environment via the first support member 212 and/or the first rear surface cover 213. According to an embodiment, second electronic components of the plurality of electronic components, which require a comparatively small mounting space or a relatively small mounting thickness T2 of the electronic device 200 or are operable regardless of the overlapping structure of the two housings 210 and 220, may be arranged in the second sub-space B. According to an embodiment, the second electronic components may include a main board 250 and/or a battery 251. In an embodiment, a portion of electronic components (e.g., a main board 250 or an FPCB) of the plurality of electronic components may be arranged in the two sub-spaces together, in a case where the first sub-space A and the second sub-space B are connected to each other. In an embodiment, the first sub-space A and/or the second sub-space B described above may be designed to provide an efficient arrangement space for the plurality of electronic components, regardless of a slide-in state and/or a slide-out state of the electronic device 200.

According to various embodiments, at least one slide hinge module 260 may be disposed in the third space 2202 between the first support member 212 of the first housing 210 and the second support member 222 of the second housing 220, at the side of the rear surface (e.g., the rear surface 200b of FIG. 3B) of the electronic device 200. According to an embodiment, the third space 2202 may be configured to a structure of being partially separated from the second space 2201 by at least a portion of the first housing 210 in a slide-in state and being at least partially connected to the second space 2201 in a slide-out state. According to an embodiment, the at least one slide hinge module 260 may include an elastic member (e.g., a torsion spring) configured to provide an elastic force of pressing the first housing 210 in a direction (direction ①) of being slid out from the second housing 220 and/or in a direction (direction ②) of being slid in the second housing 220 with reference to a predetermined inflection point. For example, by an operation of a user, the electronic device 200 may be pressed in a direction (direction ①) in which the flexible display 230 is to be slid out, and at the time of having moved beyond an inflection point, may be continuously pressed so as to maintain a slide-out state via the slide hinge module 260. According to an embodiment, by an operation of a user, the electronic device 200 may be pressed in a direction (direction ②) in which the flexible display 230 is to be slid in, and at the time of having moved beyond an inflection point, may be continuously pressed so as to maintain a slide-in state via the slide hinge module 260.

In the electronic device 200 according to embodiments of the disclosure, electronic components may be appropriately arranged in the first space 2101 of the first housing 210 to correspond to the sub-spaces A and B having shapes different from each other, and thus an efficient arrangement structure may help to slim the electronic device 200 and improve performance, and the first housing 210 may be pressed in a direction (direction ①) of being slid out from the second housing 220 and/or in a direction (direction ②) of being slid in the second housing 220 via the slide hinge module 260 with reference to a predetermined inflection point, and thus improved operational convenience may be provided.

Figure 6:
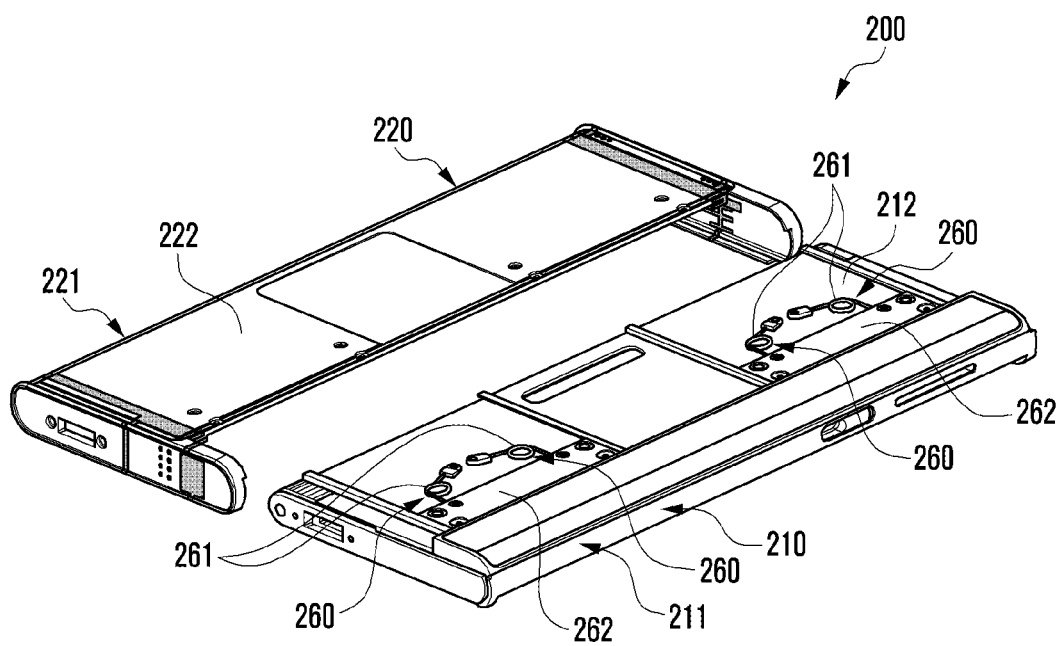
FIG. 6 is a partial exploded perspective view of an electronic device including a slide hinge module according to various embodiments.

FIG. 6 is a partial exploded perspective view of an electronic device including a slide hinge module according to various embodiments.

Referring to FIG. 6, an electronic device 200 may include a first housing 210, a second housing 220 slidably coupled to the first housing 210, and at least one slide hinge module 260 disposed between the first housing 210 and the second housing 220 and configured to press the first housing 210 from the second housing 220 in a direction to slide the first housing in or out. According to an embodiment, the at least one slide hinge module 260 may be disposed between the first support member 212 of the first housing 210 and the second support member 222 of the second housing 220. According to an embodiment, the at least one slide hinge module 260 may be arranged at four places to be spaced a predetermined space apart between the first support member 212 and the second support member 222, but is not limited to this. For example, the at least one slide hinge module 260 may be arranged at less than four places or at four or more places according to the magnitude of a pressing force by which the first housing 210 is slid in or slid out.

According to various embodiments, each of the at least one slide hinge module 260 may include a torsion spring 261. According to an embodiment, the torsion spring 261 may be installed to be capable of pressing the first housing 210 from the second housing 220 in a direction to slide the first housing in or out with reference to a predetermined inflection point. According to an embodiment, the at least one slide hinge module 260 may be slidably coupled to the first support member 212 and may include a slide plate 262 fixed to the second support member 222. Therefore, the slide plate 262 may slidably move on the first support member 212 according to a slide-in operation and a slide-out operation of the electronic device. According to an embodiment, a sliding distance (e.g., a sliding distance S of FIG. 7B) of the first housing 210 may be determined according to the shape of the slide plate 262 and the coupling position of the at least one slide hinge module 260. According to an embodiment, a portion (e.g., the other end 2612 of FIG. 7B) of the torsion spring 261 may be fixed to the slide plate 262. In an embodiment, the at least one slide hinge module 260 may be configured in a manner in which at least one torsion spring 261 is coupled to one slide plate 262. As illustrated, the at least one slide hinge module 260 has two torsion springs 261 coupled to one slide plate 262, but one torsion spring 261 or three or more torsion springs 261 may be coupled to one slide plate 262.

Figure 7A:
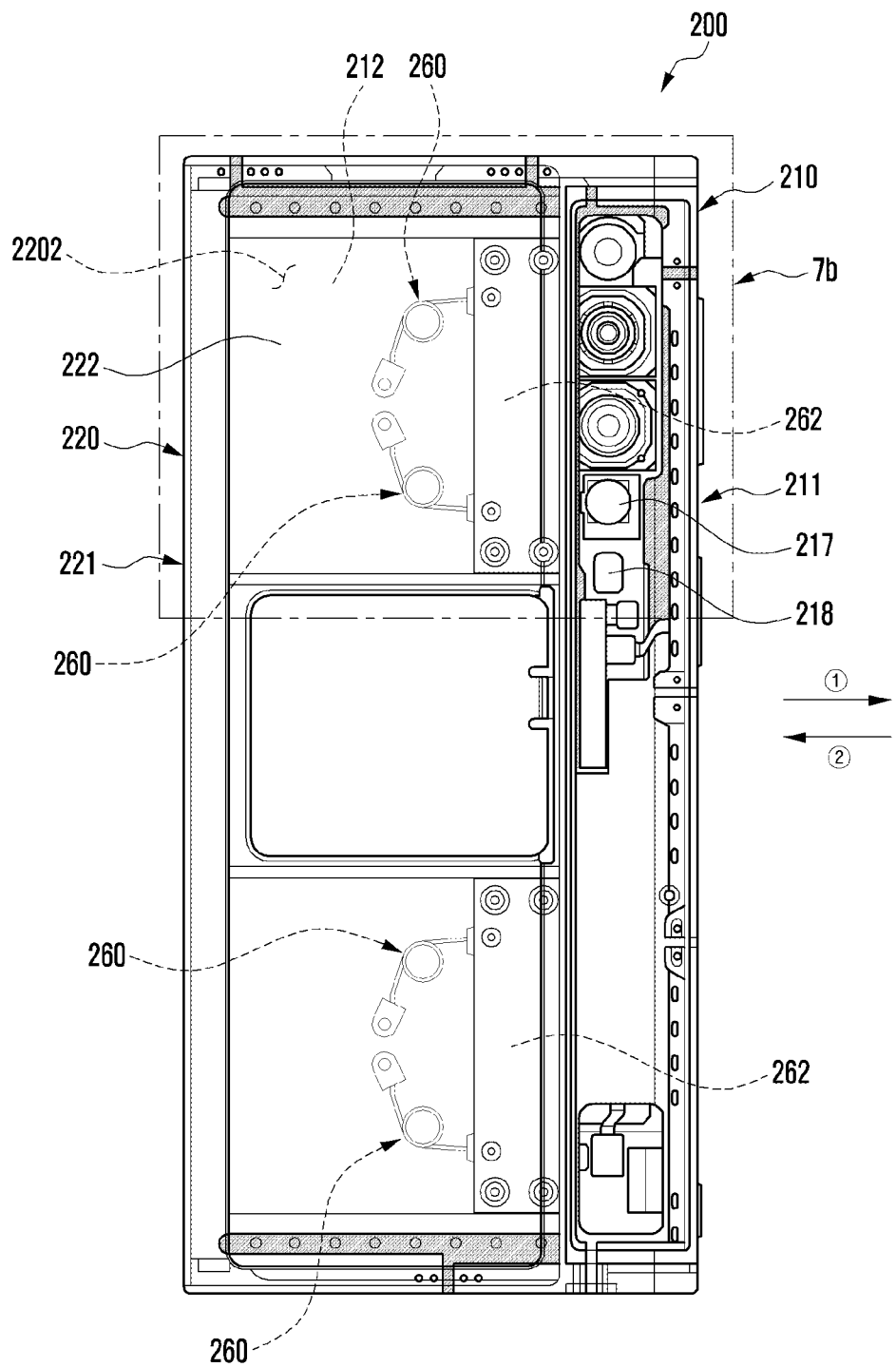
FIG. 7A is a diagram illustrating an electronic device having a slide hinge module disposed therein in a slide-in state according to various embodiments.
Figure 7B:
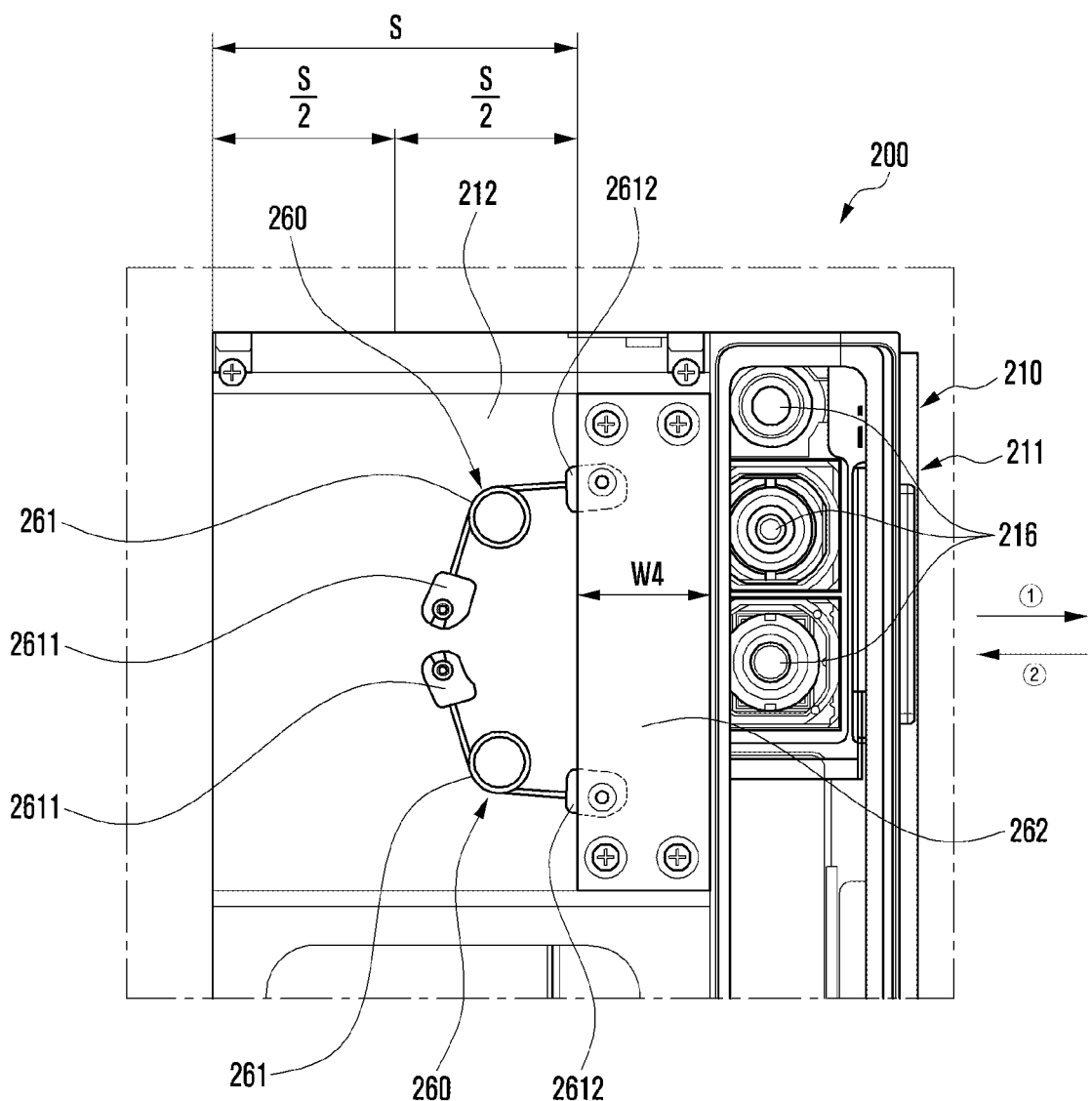
FIG. 7B is a diagram illustrating an enlarged view of area 7b of FIG. 7A according to various embodiments.

FIG. 7A is a diagram illustrating an electronic device having a slide hinge module disposed therein in a slide-in state according to various embodiments. FIG. 7B is a diagram illustrating an enlarged view of area 7b of FIG. 7A according to various embodiments. FIG. 7B is a view illustrating a state in which the slide hinge module is disposed in the first housing, in a state where the second housing is omitted.

Referring to FIGS. 7A and 7B, an electronic device 200 may include a first housing 210, a second housing 220 slidably coupled to the first housing 210, and at least one slide hinge module 260 disposed between the first housing 210 and the second housing 220 and configured to press the first housing 210 from the second housing 220 in a direction to slide the first housing in or out. According to an embodiment, the electronic device 200 may include a slide plate 262 slidably disposed on the first support member 212 of the first housing 210. According to an embodiment, the slide plate 262 may be fixed to the second support 212 of the second housing 220 via a fastening member such as a screw.

According to various embodiments, the at least one slide hinge module 260 may include a torsion spring 261 disposed between the first support member 212 of the first housing 210 and the second support member 222 of the second housing 220. According to an embodiment, one end 2611 of the torsion spring 261 may be flexibly coupled to the first support member 212 and the other end 2612 thereof may be flexibly coupled to the slide plate 262. According to an embodiment, the torsion spring 261 may have elasticity between the first support member 212 and the second support member 222 and be at least partially flexible, while the electronic device 200 is sliding to be switched from a slide-in state to a slide-out state or switched from a slide-out state to a slide-in state. According to an embodiment, when the slide plate 262 is moved in a direction (direction ①) to be slid out with reference to a predetermined inflection point, the torsion spring 261 may be disposed to provide a pressing force of continuously pressing the first housing 210 in a direction (direction ①) to be slid out. According to an embodiment, when the slide plate 262 is moved in a direction (direction ②) to be slid in with reference to a predetermined inflection point, the torsion spring 261 may be disposed to provide a pressing force of continuously pressing the first housing 210 in a direction (direction ②) to be slid in.

According to various embodiment, an inflection point may be configured at a position of half S/2 of the total sliding distance S of the slide plate 262. According to an embodiment, when the flexible display 230 is switched from a slide-in state to a slide-out state, the sliding distance S may be substantially the same as the second width W2 of a second portion (e.g., the second portion 230b of FIG. 3A) which is visible from the outside. In an embodiment, an inflection point may be configured to a position biased to a direction in which the first housing 210 is slid in or slid out, a position S/2 of half of the total sliding distance S of the slide plate 262. In an embodiment, one end 2611 of the torsion spring 261 may be flexibly coupled to the first support member 212 of the first housing 210 and the other end 2612 thereof may be flexibly coupled to the second support member 222 of the second housing 220, while the slide plate 262 is omitted.

According to various embodiments, the sliding distance S may be determined according to the shape of the slide plate 262 slidably coupled to the first support member 212. According to an embodiment, the sliding distance S may be determined according to the width W4 of the slide plate 262. For example, as the width W4 of the slide plate 262 may become greater, so the sliding distance S may become smaller, and as the width W4 of the slide plate 262 may become smaller, so the sliding distance S may become greater. In an embodiment, the sliding distance S may be determined according to the coupling positions at which one end 2611 of the torsion spring 261 and the other end 2612 thereof are coupled to the first support member 212 and the second support member 222, respectively.

According to various embodiments, one end 2611 of the torsion spring 261 may rotate clockwise or counterclockwise with reference to the point fixed to the first support member 212. For another example, the other end 2612 of the torsion spring 261 may rotate clockwise or counterclockwise with reference to the point fixed to the second support member 222 or the slide plate 262.

Figure 8:
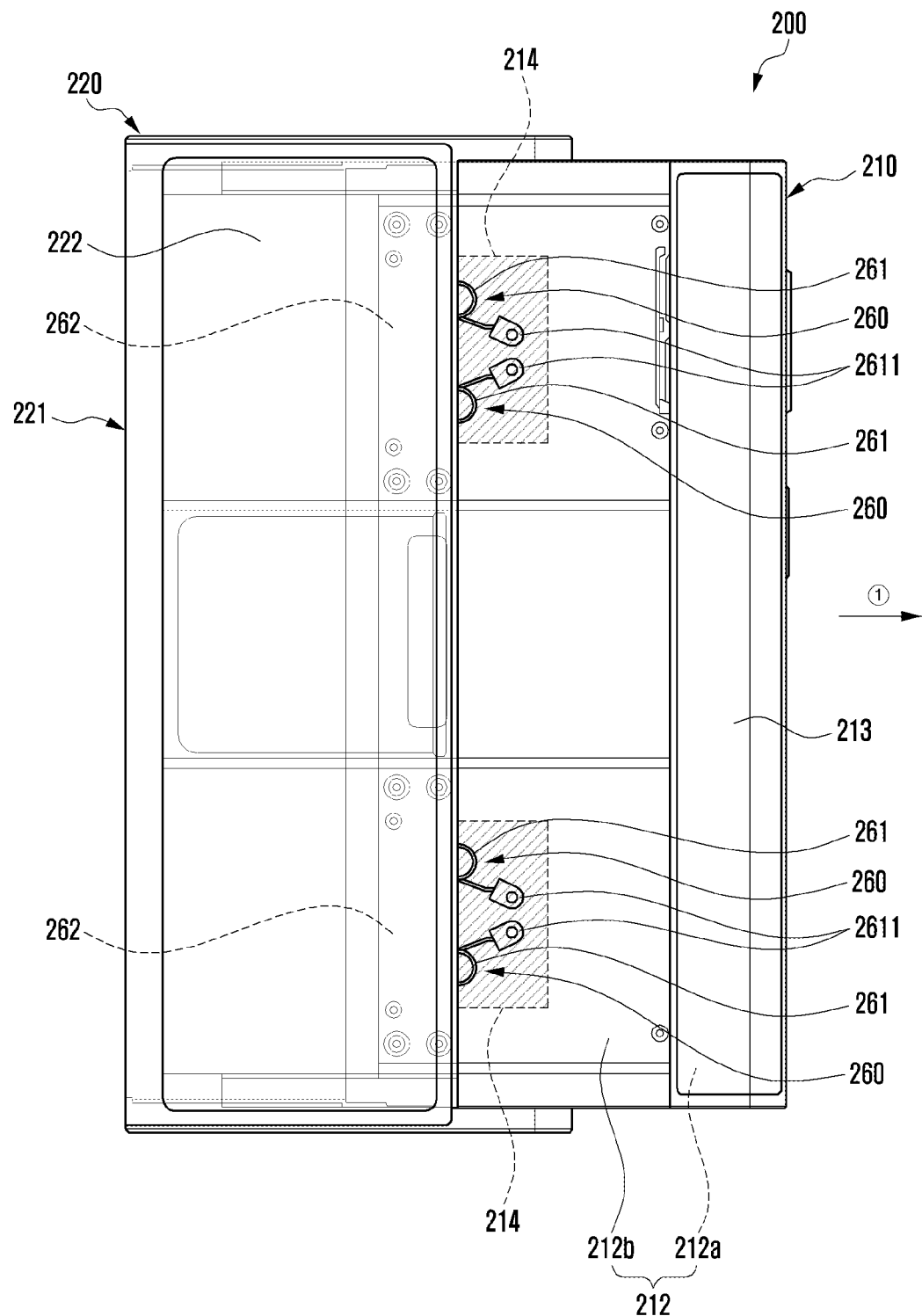
FIG. 8 is a diagram illustrating an electronic device having a slide hinge module disposed therein in a slide-out state according to various embodiments.

FIG. 8 is a diagram illustrating an electronic device having a slide hinge module disposed therein in a slide-out state according to various embodiments.

Referring to FIG. 8, an electronic device 200 may include a first housing 210, a second housing 220 slidably coupled to the first housing 210, and at least one slide hinge module 260 disposed between the first housing 210 and the second housing 220 and configured to press the first housing 210 from the second housing 220 in a direction to slide the first housing in or out. According to an embodiment, the slide hinge module 260 may be disposed at an overlapping portion 212b of the first housing 210, and thus, in a slide-in state, may be at least partially covered to prevent and/or reduce the slide hinge module 260 from being viewed from the outside via the second support member 222 of the second housing 220. According to an embodiment, in a slide-out state of the electronic device 200, the slide hinge module 260 may reduce the aesthetics of the electronic device 200 because a portion disposed on the first support member, which is, for example, at least a portion (e.g., one end 2611) of the torsion spring 261, is exposed to be visible from the outside. Therefore, the electronic device 200 may include a cover member 214 at least partially disposed on the first support member 212 of the first housing 210 and configured to be capable of covering a portion of the slide hinge module 260 in a slide-out state. According to an embodiment, the cover member 214 may be disposed in a manner where interference for a sliding operation of the first housing 210 and the second housing 220 is avoided. In an embodiment, the cover member 214 may also include a conduit structure disposed between the first housing 210 and the second housing 220, slidable in or out, and having an inner space, changeable in association with the sliding operation of the first housing 210. Therefore, one end of the conduit structure may be fixed to the first housing 210 and the other end thereof may be fixed to the second housing 220. According to an embodiment, the conduit structure may include a plurality of conduits arranged to be slidable into or out of each other and including inner spaces. For example, in a slide-out state, at least a portion of the slide hinge module 260 exposable to the outside of the electronic device may be accommodated in the inner space of the conduit structure, and thus may be covered to prevent and/or reduce the at least a portion from being viewed from the outside.

Figure 9A:
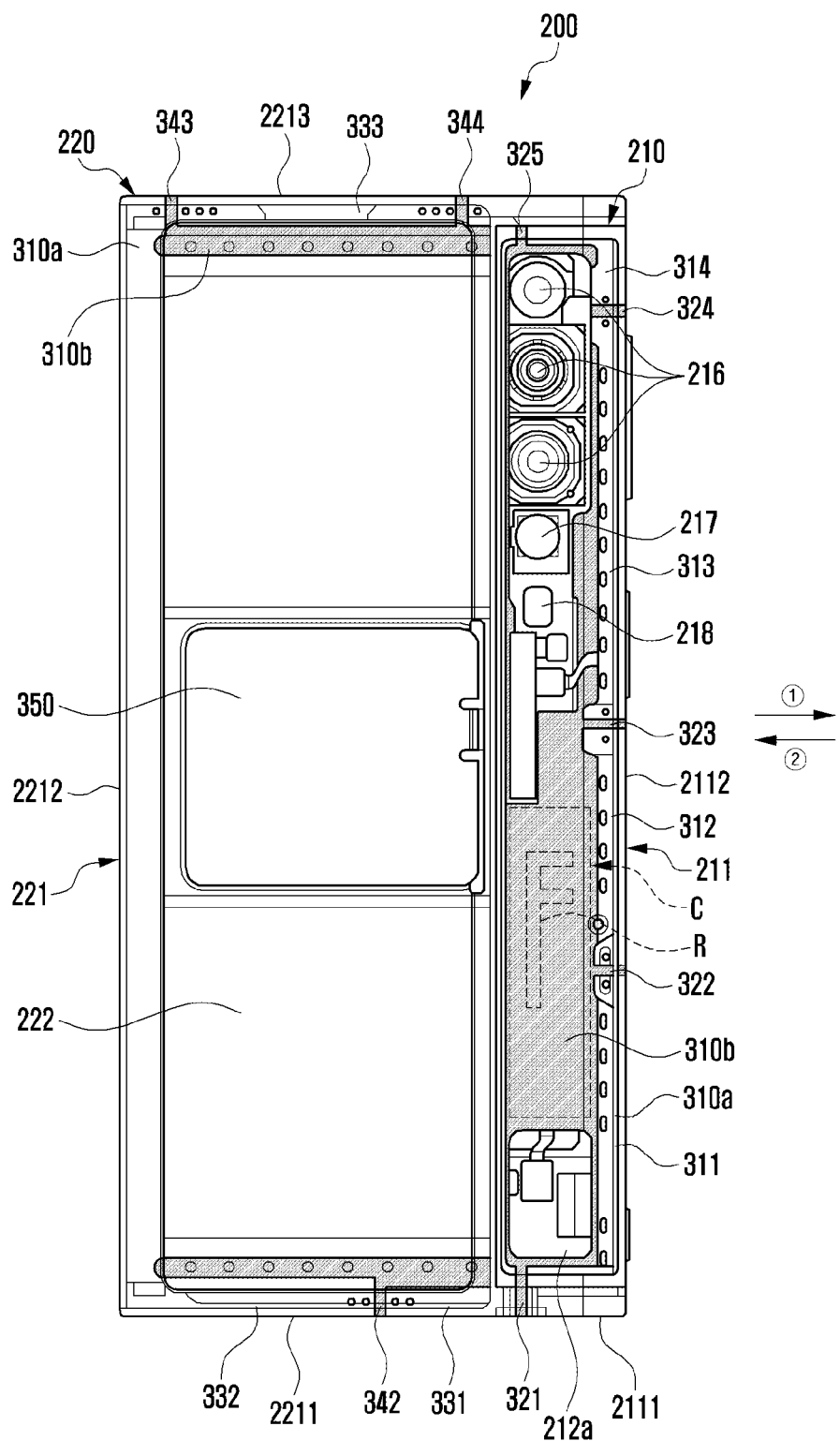
FIG. 9A and FIG. 9B are diagrams illustrating a slide-in state and a slide-out state of an electronic device including an antenna, respectively, according to various embodiments.
Figure 9B:
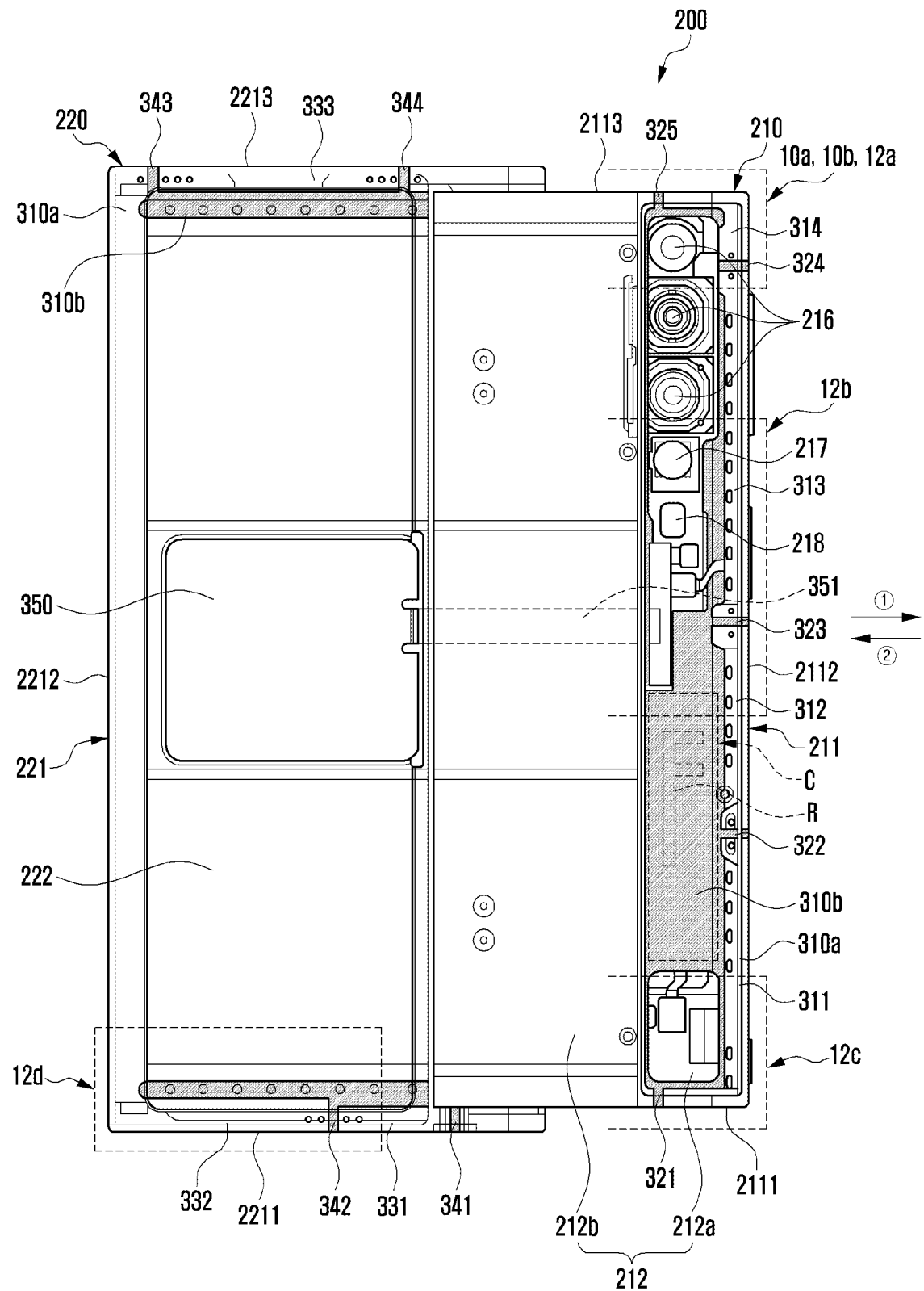

FIG. 9A and FIG. 9B are diagrams illustrating a slide-in state and a slide-out state of an electronic device including an antenna, respectively, according to various embodiments.

Referring to FIG. 9A and FIG. 9B, an electronic device 200 may include a first housing 210 and a second housing 220 slidably coupled to the first housing 210 by a predetermined reciprocating distance. According to an embodiment, the first housing 210 may include a first side surface member 211 including a first side surface 2111, a second side surface 2112, and a third side surface 2113 and a first support member 212 extending from the first side surface member 211 to a first space 2101. According to an embodiment, the first side surface member 211 and/or the first support member 212 may at least partially include a conductive material 310a (e.g., metal) and/or a non-conductive material 310b (e.g., polymer). For example, the non-conductive material 310b may be insert-injected with the conductive material 310a. According to an embodiment, the second housing 220 may include a second side surface member 221 including a fourth side surface 2211, a fifth side surface 2212, and a sixth side surface 2213 and a second support member 222 extending from the second side surface member 221 to the second space 2201. According to an embodiment, the second side surface member 221 and/or the second support member 222 may at least partially include the conductive material 310a (e.g., metal) and/or the non-conductive material 310b (e.g., polymer).

According to various embodiments, the electronic device 200 may include an antenna R disposed through at least partial area C of the first housing 210, visible from the outside in a slide-in state. According to an embodiment, when the first support member 212 is viewed from above, the antenna R may be disposed at a position overlapping an area configured of the non-conductive material 310b, in the first sub-space (e.g., the first sub-space A of FIG. 3B) corresponding to the non-overlapping portion 212a. According to an embodiment, the antenna R may include at least one conductive pattern (e.g., an antenna pattern) arranged via the main board 250 or an antenna carrier. According to an embodiment, the antenna R may be electrically connected to a wireless communication circuit (e.g., a wireless communication module 192 of FIG. 1) disposed on the main board 250 of the first space 2101. According to an embodiment, the wireless communication circuit (e.g., the wireless communication module 192 of FIG. 1) may be configured to transmit and/or receive a wireless signal via a first conductive part 311 in at least one frequency band among a low band (about 700 MHz to 900 MHz), a mid band (about 1700 MHz to 2100 MHz), a high band (about 2300 MHz to 2700 MHz), a sub-6 band (about 3 GHz to 6 GHz), or an NR band (about 3 GHz to 300 GHz). However, an operation frequency band may not be limited to the above example. Therefore, regardless of a slide-in state and a slide-out state, the antenna R may be disposed at a position corresponding to the non-overlapping portion 212a of the first support member 212 disposed to be visible from the outside, and thus the interference of the second housing 220 according to a slide-in/slide-out operation may be avoided and radiation performance deterioration resulting therefrom may be reduced.

According to various embodiments, in a slide-in state, the electronic device 200 may include at least one first conductive part disposed via at least a portion of the first side surface member 211 exposed (e.g., visible) to the outside without the interference of the second housing 220 and electrically connected to the wireless communication circuit (e.g., the wireless communication module 192 of FIG. 1). According to an embodiment, in a slide-in state, at least one first conductive part may be configured by at least one among at least a portion of the first support member 212, at least a portion of the first side surface 2111, at least a portion of the second side surface 2112, or at least a portion of the third side surface 2113, visible from the outside. According to an embodiment, the at least one first conductive part may include a first conductive portion 311 segmented via a first non-conductive portion 321 disposed on the first side surface 2111 and a second non-conductive portion 322 disposed on the second side surface 2112, a second conductive portion 312 segmented via the second non-conductive portion 322 and a third non-conductive portion 323 disposed on the second side surface 2112, a third conductive portion 313 segmented via the third non-conductive portion 323 and a fourth non-conductive portion 324 disposed on the second side surface 2112, and a fourth conductive portion 314 configured by the fourth non-conductive portion 324 and a fifth non-conductive portion 325 disposed on the third side surface 2113. According to an embodiment, the first, second, third, and fourth conductive portions 311, 312, 313, and 314 may be electrically connected to the wireless communication circuit (e.g., a wireless communication module 192 of FIG. 1) disposed in the first space 2101 of the first housing 210, and thus may operate as antennas configured to transmit and/or receive a wireless signal in a predetermined frequency band. According to an embodiment, the wireless communication circuit (e.g., the wireless communication module 192 of FIG. 1) may be configured to transmit and/or receive a wireless signal via the first, second, third, and fourth conductive portions 311, 312, 313, and 314 in at least one frequency band among a low band (e.g., about 700 MHz to 900 MHz), a mid band (about 1700 MHz to 2100 MHz), a high band (about 2300 MHz to 2700 MHz), or a sub-6 band (about 3 GHz to 6 GHz). However, the operation frequency band may not be limited to the above example.

According to various embodiments, the electronic device 200 may include at least one second conductive part disposed on at least a portion of the second housing 220 and used as an antenna so as to exhibit excellent radiation performance regardless of a slide-in state and a slide-out state. According to an embodiment, the at least one second conductive part may include a fifth conductive portion 331 segmented via a sixth non-conductive portion 341 and a seventh non-conductive portion 342 arranged to be spaced a predetermined interval apart from each other on the fourth side surface 2211, a sixth conductive portion 332 segmented via the seventh non-conductive portion 342 and a eighth non-conductive portion 343 of the sixth side surface 2213, and a seventh conductive portion 333 segmented via the eighth non-conductive portion 343 and a ninth non-conductive portion 344 disposed on the sixth side surface 2213. According to an embodiment, the fifth, sixth, and seventh conductive portions 331, 332, and 333 may be electrically connected to the main board 250 disposed in the first housing 210 via a flexible FPCB (e.g., an FPCB 2071 in FIG. 12D) having a length and flexibility enough to correspond to a sliding operation. For example, the FPCB may be electrically connected to the wireless communication circuit disposed on the main board 250. According to an embodiment, the wireless communication circuit (e.g., the wireless communication module 192 of FIG. 1) may be configured to transmit and/or receive a wireless signal via the fifth, sixth and seventh conductive portions 331, 332, and 333 in at least one frequency band among a low band (e.g., about 700 MHz to 900 MHz), a mid band (about 1700 MHz to 2100 MHz), a high band (about 2300 MHz to 2700 MHz), or a sub-6 band (about 3 GHz to 6 GHz). However, an operation frequency band may not be limited to the above examples.

According to various embodiments, in a slide-in state, the first side surface 2111 may face the fourth side surface 2211 and be accommodated in the second space 2201 of the second housing 220, to prevent and/or reduce the first side surface 2111 from being viewed from the outside. The radiation performance of the first conductive portion 311 and/or the fifth conductive portion 331 may be deteriorated by parasitic resonance frequencies of the overlapping counterpart conductive portions. Therefore, in a slide-in state, the first non-conductive portion 321 may be disposed to correspond to (be aligned with) the sixth non-conductive portion 341, and thus may reduce radiation performance deterioration. In an embodiment, in a slide-in state, the first side surface 2111 may be partially accommodated in the second space 2201 of the second housing 220, and thus may be disposed to allow at least a portion thereof to be visible from the outside. In an embodiment, in a slide-in state, the third side surface 2113 may face the sixth side surface 2213 and be accommodated in the second space 2201 of the second housing 220 so as to prevent and/or reduce the third side surface 2113 from being viewed from the outside. The radiation performance of the fourth conductive portion 314 and/or the seventh conductive portion 333 may be deteriorated by parasitic resonance frequencies of the overlapping counterpart conductive portions. Therefore, in a slide-in state, the fifth non-conductive portion 325 may be disposed to correspond to (be aligned with) the ninth non-conductive portion 344, and thus may reduce radiation performance deterioration.

According to embodiments of the disclosure, at least one antenna R 311, 312, 313, 314, 331, 332, and 333 included in the electronic device 200 may exhibit predetermined radiation performance regardless of a sliding operation in a slide-in state and/or a slide-out state, by being arranged at a position where the first housing 210 and the second housing 220 do not overlap each other.

Figure 10A:
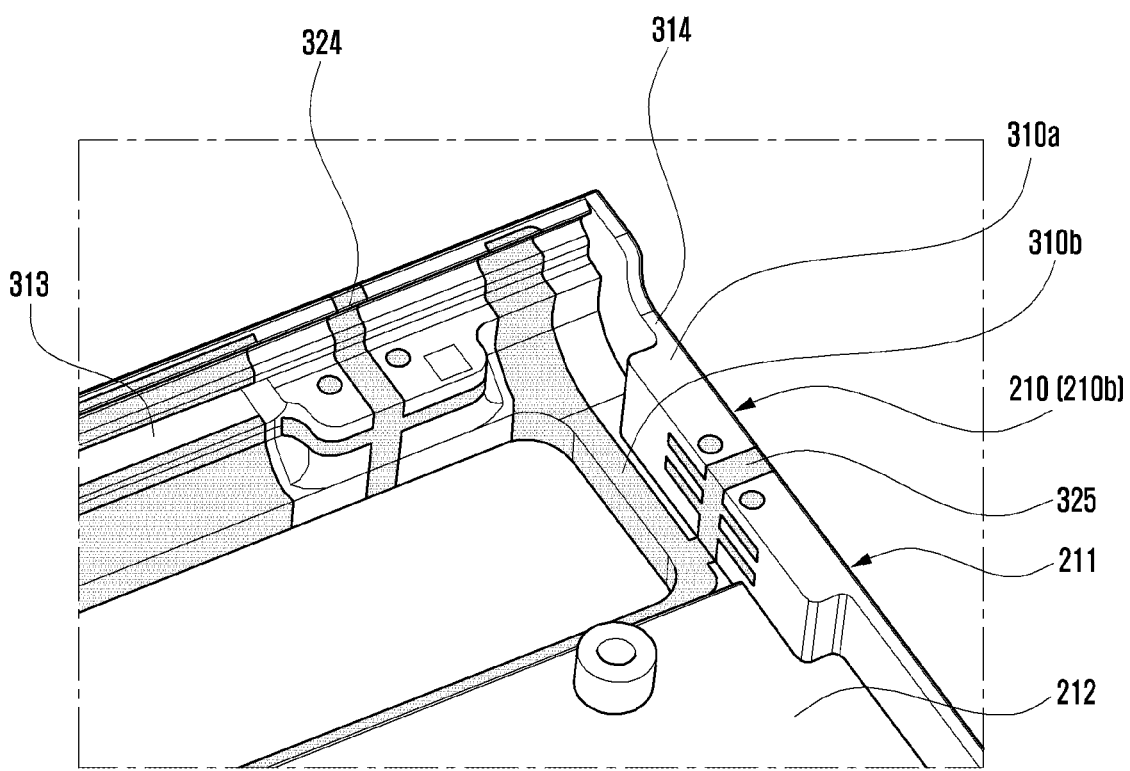
FIG. 10A is a partial perspective view illustrating an inner portion of a first housing in area 10a of FIG. 9B according to various embodiments.
Figure 10B:
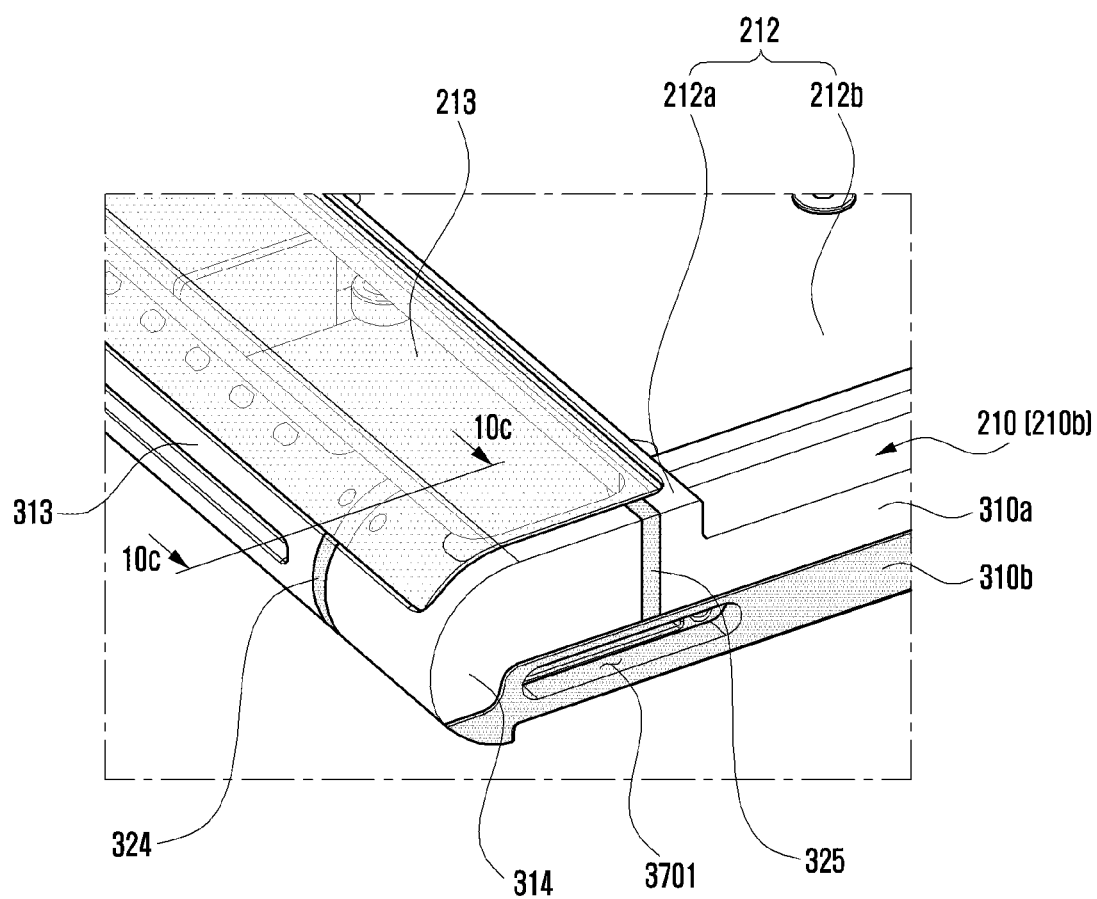
FIG. 10B is an enlarged perspective view illustrating area 10b of FIG. 9B according to various embodiments.
Figure 10C:
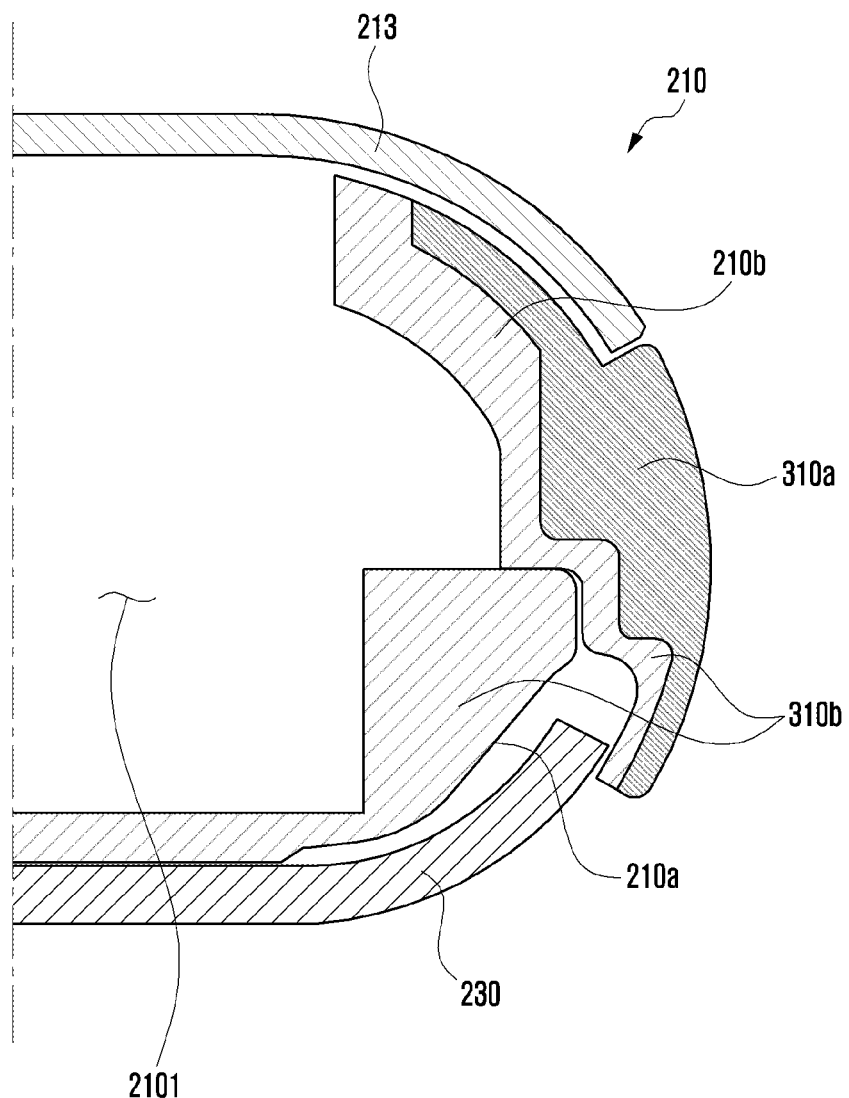
FIG. 10C is a partial cross-sectional view of the first housing taken along line 10c-10c of FIG. 10B according to various embodiments.

FIG. 10A is a partial perspective view illustrating an inner configuration of a first housing in area 10a of FIG. 9B according to various embodiments. FIG. 10B is an enlarged perspective view illustrating area 10b of FIG. 9B according to various embodiments. FIG. 10C is a partial cross-sectional view of the first housing taken along line 10c-10c of FIG. 10B according to various embodiments.

Referring to FIGS. 10A, 10B and 10C, the fourth conductive portion 314 may be segmented via the fourth non-conductive portion 324 and the fifth non-conductive portion 325 spaced a predetermined interval apart from each other in the second bracket housing 210b. For example, the fourth conductive portion 314 may be segmented via the fourth non-conductive portion 324 and the fifth non-conductive portion 325 configured of the non-conductive material 310b at least partially extending to a portion of the first support member 212.

According to various embodiments, the first housing 210 may include the first bracket housing 210a and the second bracket housing 210b configured to be couplable to each other through the conductive material 310a and the non-conductive material 310b insert-injected with the conductive material 310a. In an embodiment, the first bracket housing 210a and the second bracket housing 210b may be coupled to each other via a coupling structure provided via the non-conductive member 310b. In an embodiment, the first bracket housing 210a and the second bracket housing 210b may also be coupled to each other via a coupling structure provided via the conductive material 310a. In an embodiment, the first bracket housing 210a and the second bracket housing 210b may also be coupled to each other via a coupling structure provided via the conductive material 310a and the non-conductive material 310b. According to an embodiment, at least a portion of the first bracket housing 210a may be configured to support the flexible display 230 through the conductive material 310a and/or the non-conductive material 310b. According to an embodiment, at least a portion of the second bracket housing 210b may be configured to support the first rear surface cover 213 through the conductive material 310a and/or the non-conductive material 310b. According to an embodiment, the non-conductive material 310b configuring the second bracket housing 210a is advantageous for shape change, and thus may include at least one opening 3701 configured to allow an external electronic component (e.g., a socket tray) to be accommodated therethrough. According to an embodiment, the at least one opening 3701 may extend to be connected to the non-conductive portion 325. In an embodiment, the conductive material 310a and/or the non-conductive material 310b may configure the exterior (a portion of a side surface and/or a rear surface of an electronic device) of the electronic device 200 so as to be visible from the outside.

Figure 11A:
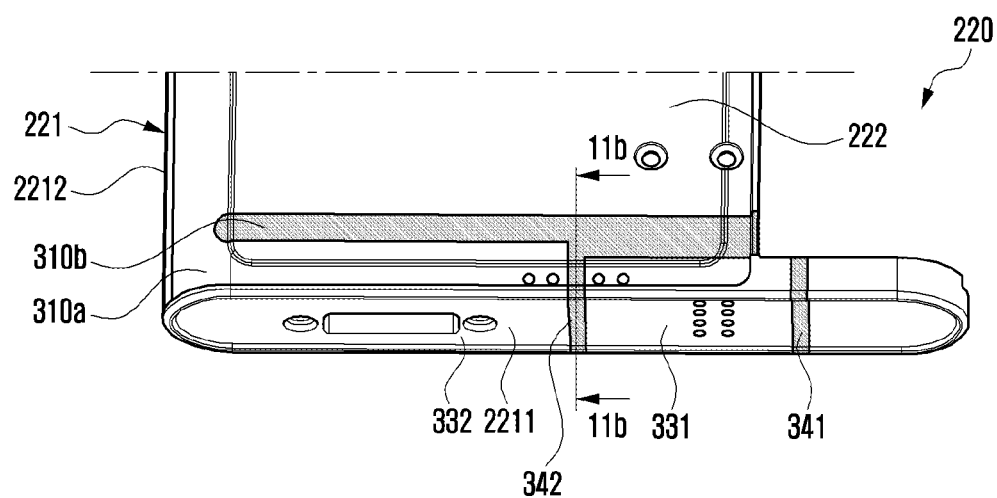
FIG. 11A is a partial perspective view of a second housing according to various embodiments.
Figure 11B:
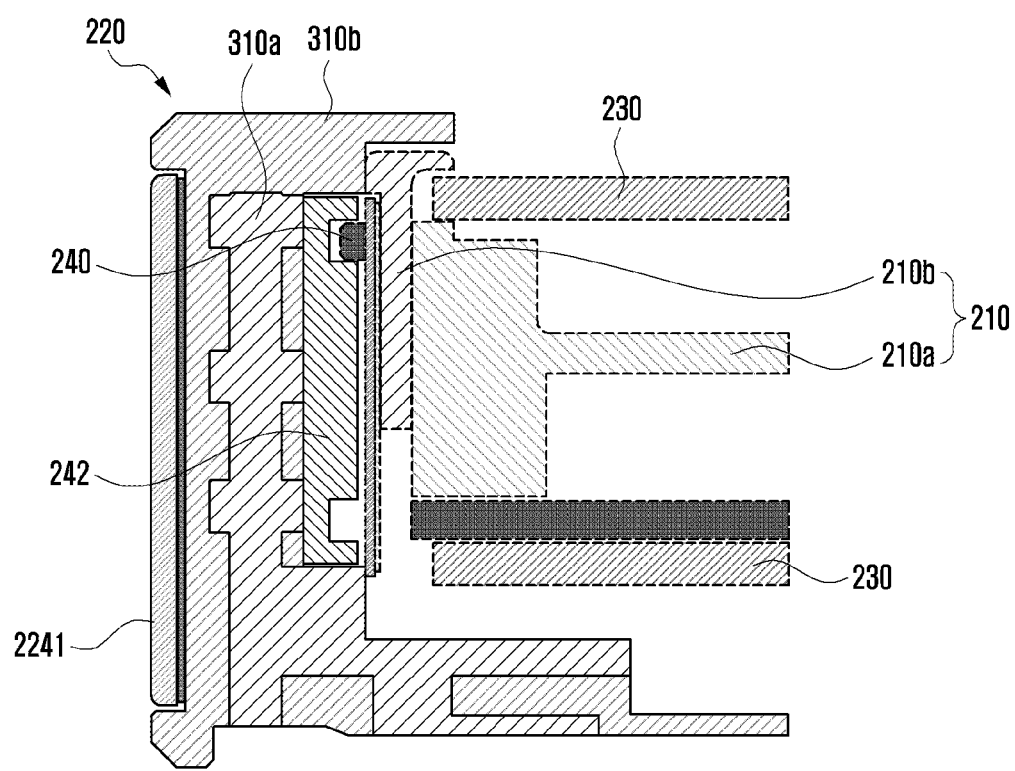
FIG. 11B is a partial cross-sectional view of the second housing taken along line 11b-11b of FIG. 11A according to various embodiments.

FIG. 11A is a partial perspective view of a second housing according to various embodiments. FIG. 11B is a partial cross-sectional view of the second housing taken along line 11b-11b of FIG. 11A according to various embodiments. FIG. 11A is a view illustrating a portion of the second housing 220 in which the first side surface cover 2241 is omitted.

Referring to FIGS. 11A and 11B, the second housing 220 may include the fifth conductive portion 331 and the sixth conductive portion 332 segmented via the sixth non-conductive portion 341 and the seventh non-conductive portion 342 spaced a predetermined interval apart from each other, in the fourth side surface 2211. According to an embodiment, the fifth conductive portion 331 and the sixth conductive portion 332 configured of the conductive material 310a and the sixth non-conductive portion 341 and the seventh non-conductive portion 342 configured of the non-conductive material 310b may also be configured to extend to at least a portion of the second support member 222 of the second housing 220.

According to various embodiments, the fifth conductive portion 331, the sixth conductive portion 332, the sixth non-conductive portion 341, and the seventh non-conductive portion 342 may be arranged in the fourth side surface 2211 to be visible from the outside. According to an embodiment, in the second housing, at least a portion of the fifth conductive portion 331, the sixth conductive portion 332, the sixth non-conductive portion 341, and the seventh non-conductive portion 342 may be covered to prevent and/or reduce the at least a portion from being viewed from the outside by the first side surface cover 2241 disposed on the fourth side surface 2211.

According to various embodiments, the second side surface member 221 and the second support member 222 configured of the conductive material 310a and the non-conductive material 310b may be configured in a shape corresponding to a coupling structure of the guide rail 242 coupled to the second housing 220 and the first housing 210 configured by the coupling of the first bracket housing 210a and the second bracket housing 210b. According to an embodiment, at least a portion of a corresponding portion of the first housing 210 coupled to the guide rail 242 and/or the first housing 210 may be configured to allow the conductive material 310a to be disposed therein to reinforce rigidity.

Figure 12A:
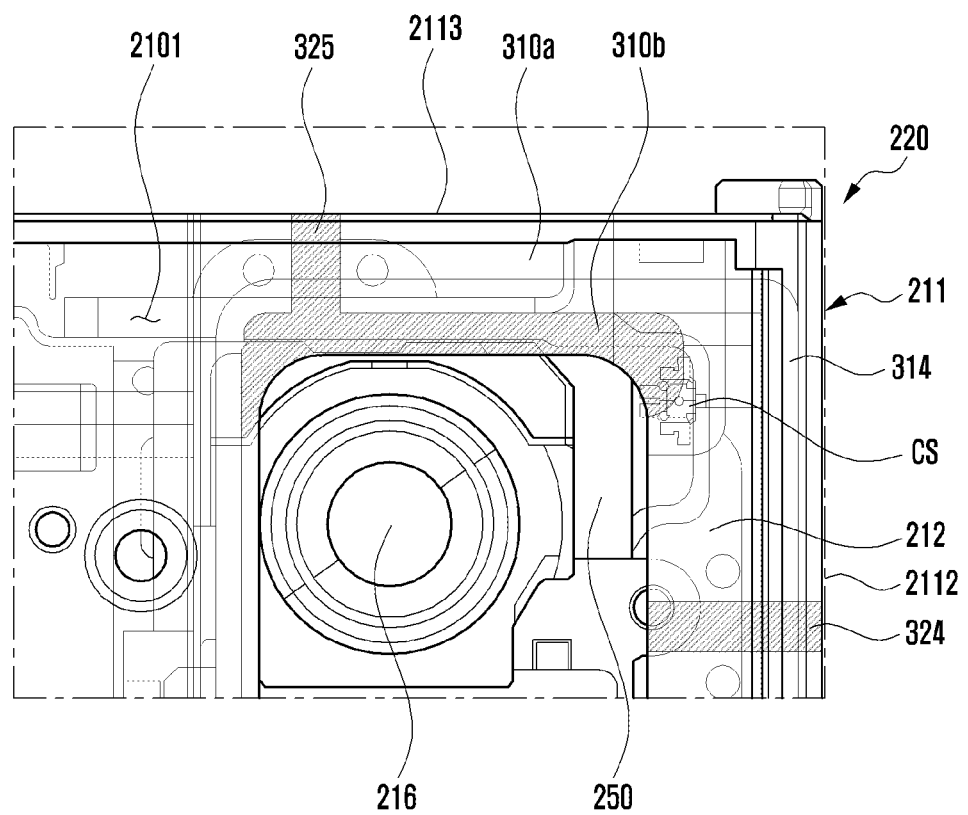
FIG. 12A is a diagram illustrating an electrical connection structure of an antenna in area 12a of FIG. 9B according to various embodiments.
Figure 12B:
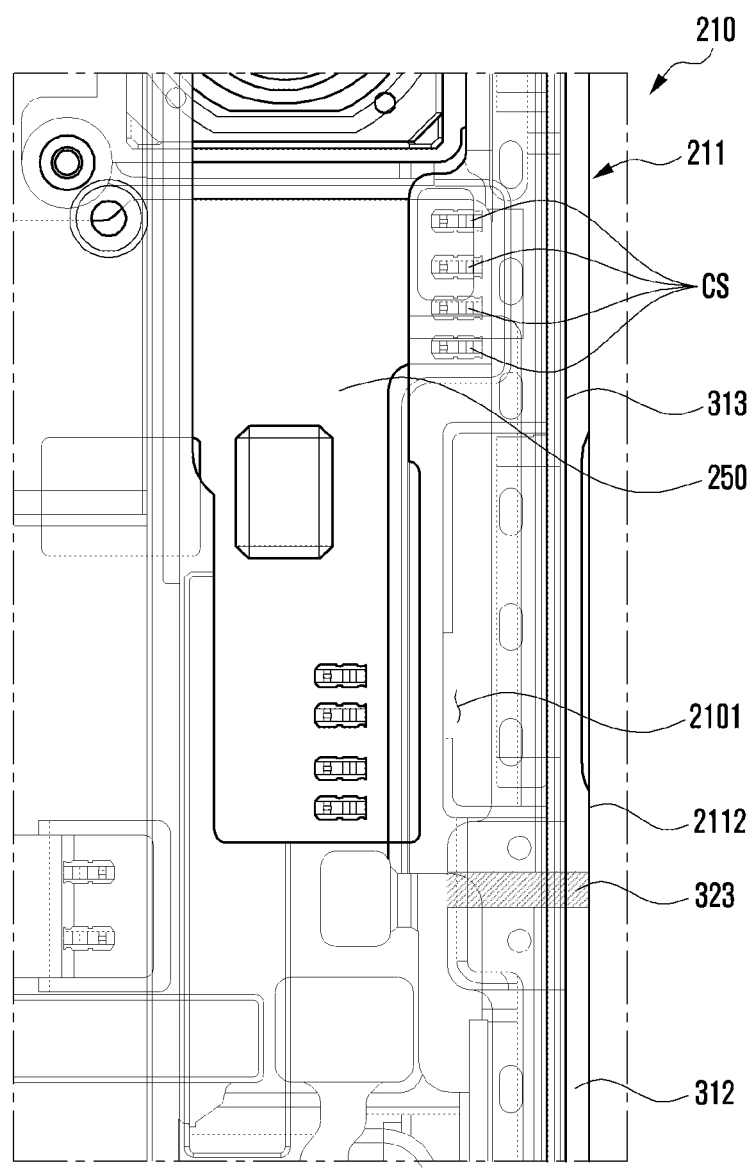
FIG. 12B is a diagram illustrating an electrical connection structure of an antenna in area 12b of FIG. 9B according to various embodiments.
Figure 12C:
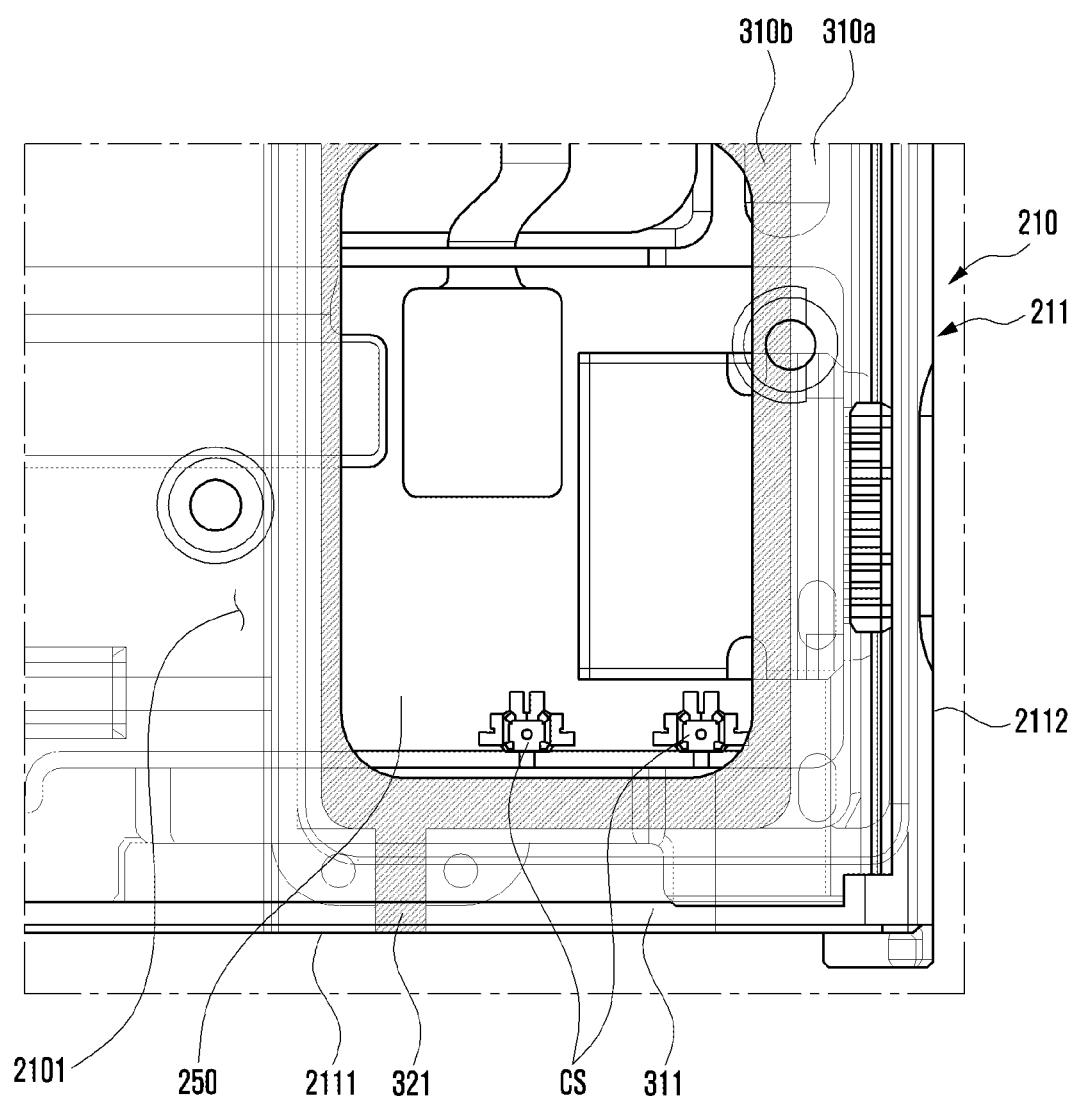
FIG. 12C is a diagram illustrating an electrical connection structure of an antenna in area 12c of FIG. 9B according to various embodiments.

FIG. 12A is a diagram illustrating an electrical connection structure of an antenna in area 12a of FIG. 9B according to various embodiments. FIG. 12B is a diagram illustrating an electrical connection structure of an antenna in area 12b of FIG. 9B according to various embodiments. FIG. 12C is a diagram illustrating an electrical connection structure of an antenna in area 12c of FIG. 9B according to various embodiments.

Referring to FIG. 12A and FIG. 12C, the first housing 210 may include the first side surface member 211 and the first support member 212 at least partially extending from the first side surface member 211 to the first space 2101. According to an embodiment, the first housing 210 and/or the second housing 220 may include a conductive material and a non-conductive material coupled to the conductive material, and the conductive material may include at least one conductive portion segmented via the non-conductive material. According to an embodiment, at least a portion of the at least one conductive portion may be electrically connected to a wireless communication circuit, and thus may be used as an antenna. For example, the first housing 210 may include the conductive portions 311, 312, 313, 314, and 315 configured of the conductive material 310a and segmented via the plurality of non-conductive portions 321, 322, 323, 324, and 325 spaced a predetermined interval apart from each other and configured of the non-conductive material 310b. According to an embodiment, the conductive portions 311, 312, 313, 314, and 315 may be electrically connected to the main board 250 disposed in the first space 2101 of the first housing 210. For example, the conductive portions 311, 312, 313, 314, or 315 may be electrically connected to the main board 250 via an electrical connection member CS. In an embodiment, the conductive portions 311, 312, 313, 314, and 315 may include portions (e.g., connection pieces extending to the first space 2101) easy to be connected to the electrical connection member CS. According to an embodiment, the electrical connection member CS may include a C-clip, a conductive contact switch, or a pogo pin. Therefore, the conductive portions 311, 312, 313, 314, and 315 may be electrically connected to the wireless communication circuit (e.g., the wireless communication module 192 of FIG. 1) of the main board 250, and thus may be used as antennas configured to operate in at least one predetermined frequency band. In an embodiment, the wireless communication circuit (e.g., the wireless communication module 192 of FIG. 1) may be disposed at a position different from the main board in the first space 210, or may be disposed on a sub-board (e.g., a sub-board 252 of FIG. 15A) spaced apart from and electrically connected to the main board 250.

Figure 12D:
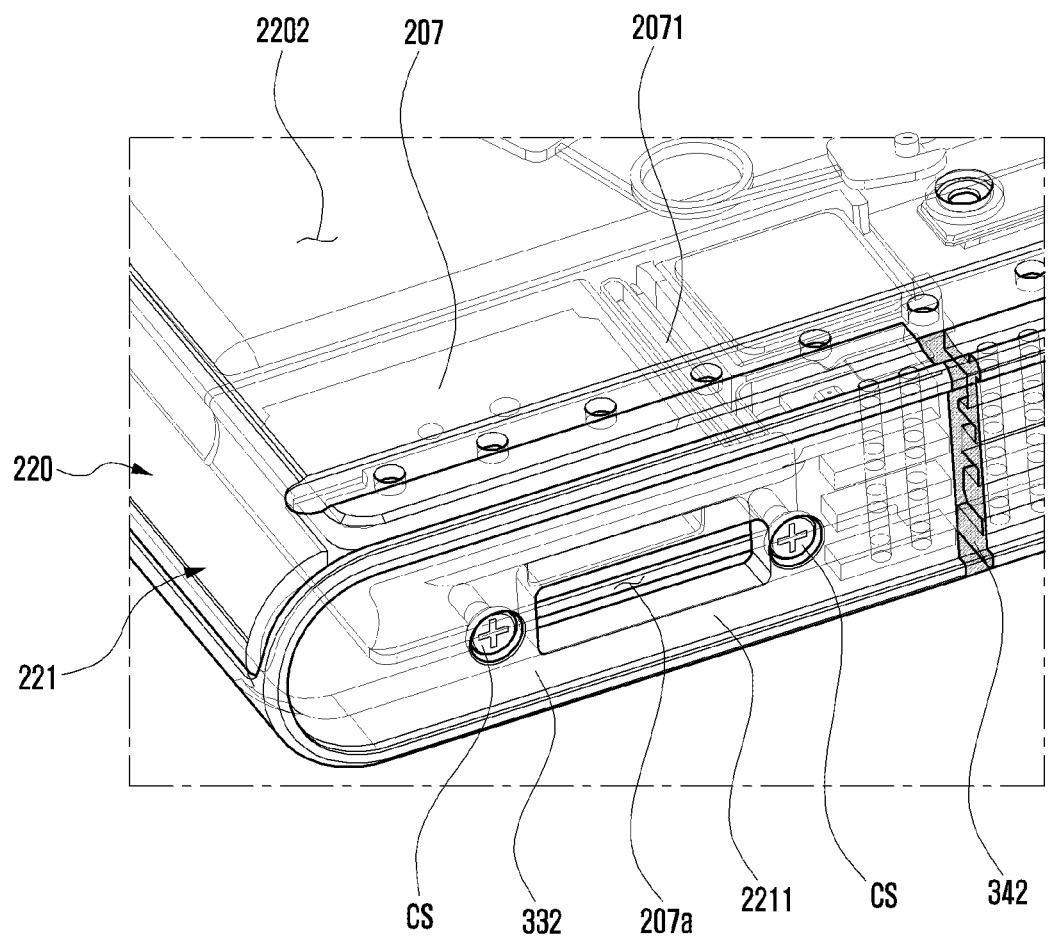
FIG. 12D is a partial perspective view illustrating an electrical connection structure of an antenna in area 12d of FIG. 9B according to various embodiments.

FIG. 12D is a partial perspective view illustrating an electrical connection structure of an antenna in area 12*d* of FIG. 9B according to various embodiments.

Referring to FIG. 12D, the second housing 220 may include the sixth conductive portion 332 segmented via the seventh non-conductive portion 342. According to an embodiment, the sixth conductive portion 332 may be electrically connected to the wireless communication circuit (e.g., the wireless communication module 192 of FIG. 1) via a bendable FPCB 2071 extending from the second space 2201 to the first space 2101 of the first housing 210. According to an embodiment, the bendable FPCB 2071 may be disposed to have a length and flexibility enough to accommodate the sliding operation of the electronic device 200. Although not illustrated, but the fifth conductive portion (e.g., the fifth conductive portion 331 of FIG. 9B) and/or the seventh conductive portion (e.g., the seventh conductive portion 333 of FIG. 9B) arranged in the second housing 220 may also be electrically connected to the wireless communication circuit (e.g., the wireless communication module 192 of FIG. 1) disposed in the first space 2101 in a substantially similar manner.

According to various embodiments, the second housing 210 may include the speaker 207 (e.g., an external speaker or a speaker module) disposed to allow sound to be output to the outside through the first speaker hole 207*a* disposed on the fourth side surface 2211 in the second space 2201. According to an embodiment, the speaker 207 may move together with the second housing 220, and may extend to the first housing 210 via the bendable FPCB 2071. The sixth conductive portion 332 used as an antenna may be electrically connected to the wireless communication circuit (e.g., the wireless communication module 192 of FIG. 1) via the bendable FPCB 2071 extending from the speaker 207 to the first space 2101. In an embodiment, the FPCB 2071 connecting the speaker 207 and an FPCB connecting the sixth conductive portion 332 may be separately arranged. According to an embodiment, as an electrical connection member CS, the sixth conductive portion 332 may be electrically connected to the bendable FPCB 2071 via a screw which is fastened through the fourth side surface 2211 so that the speaker 207 is fixed in the second space 2201.

Figure 13A:
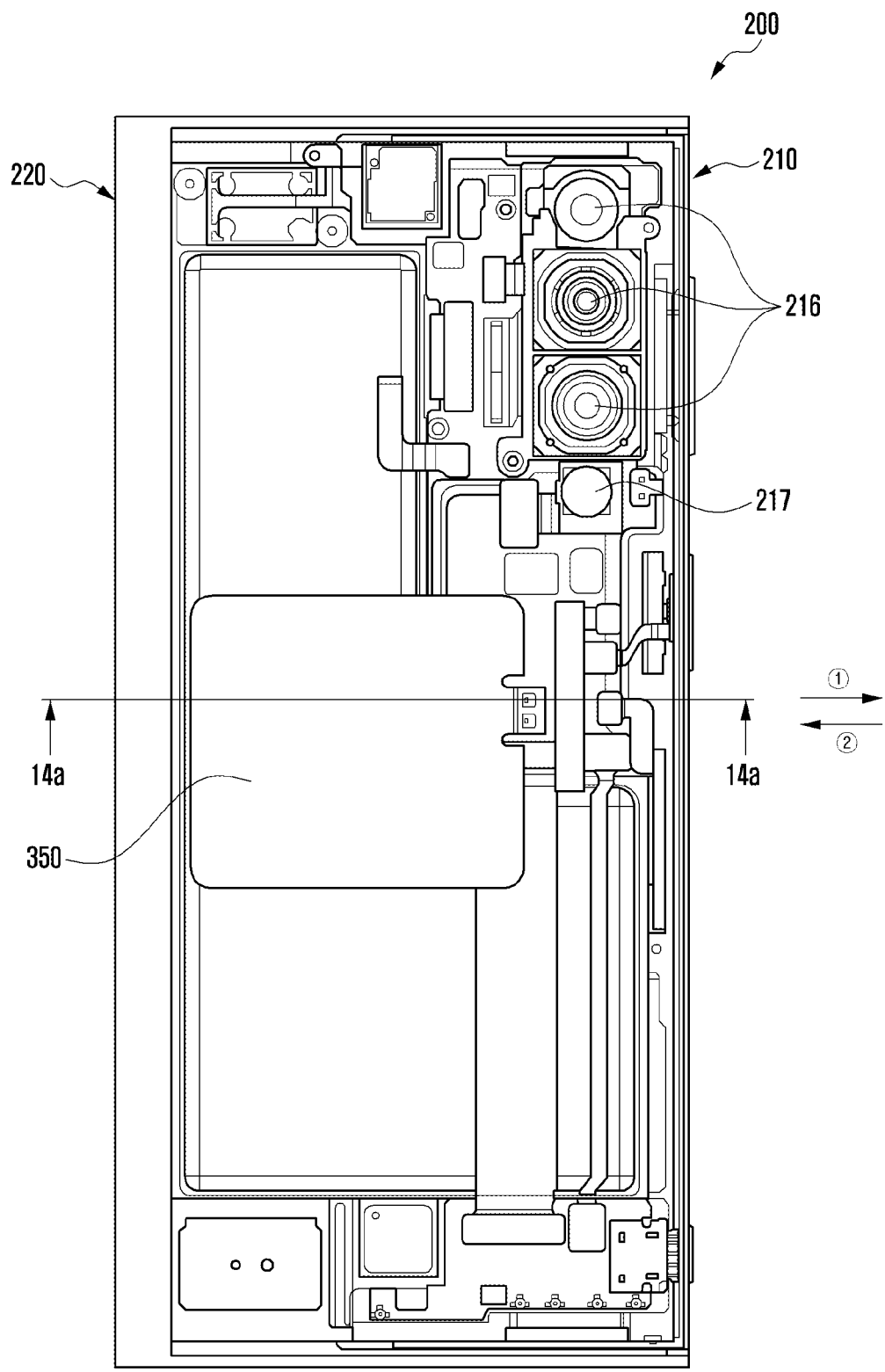
FIG. 13A and FIG. 13B are diagrams illustrating a slide-in state and a slide-out state of an electronic device including an antenna member, respectively, according to various embodiments.
Figure 13B:
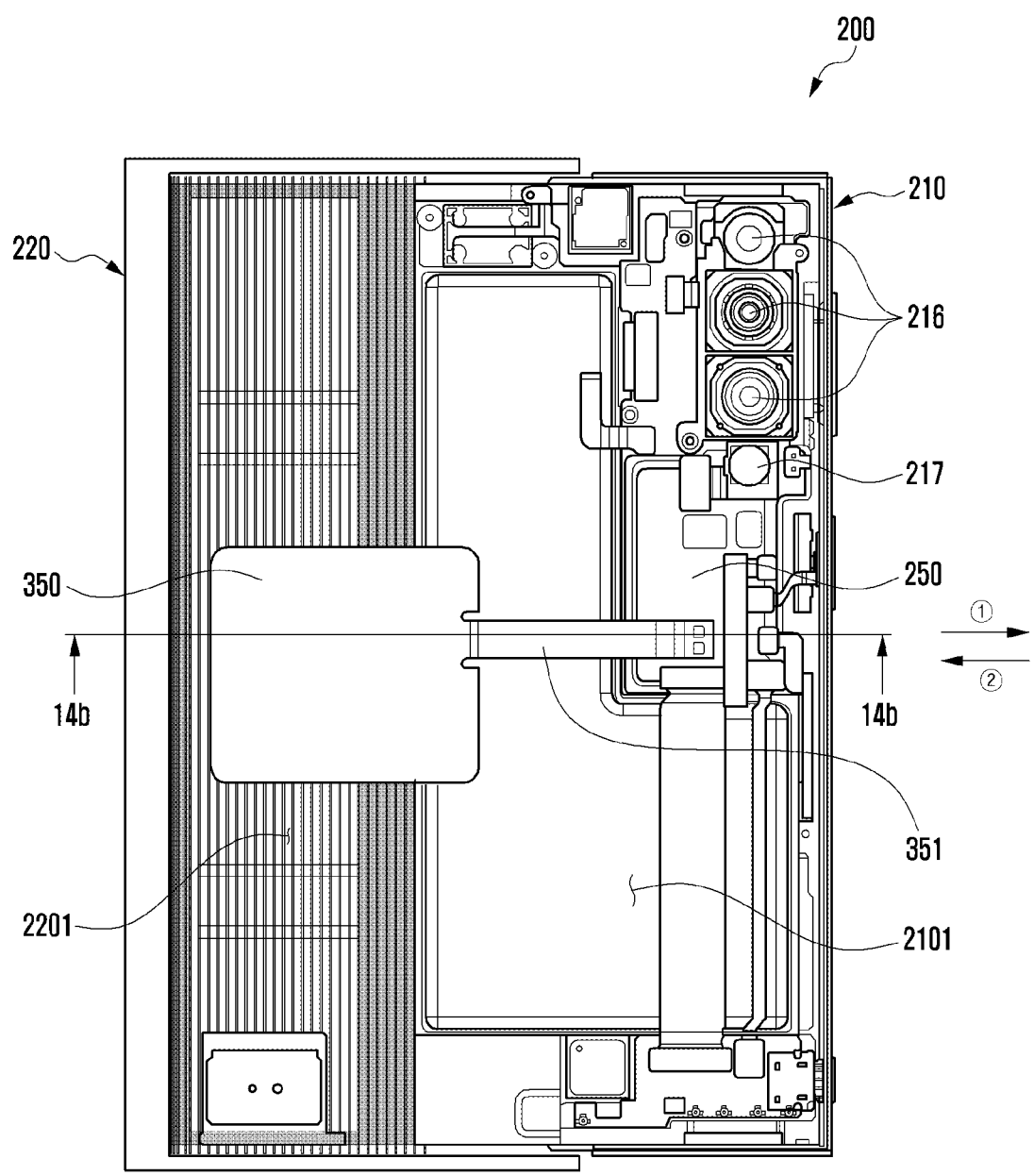
Figure 14A:
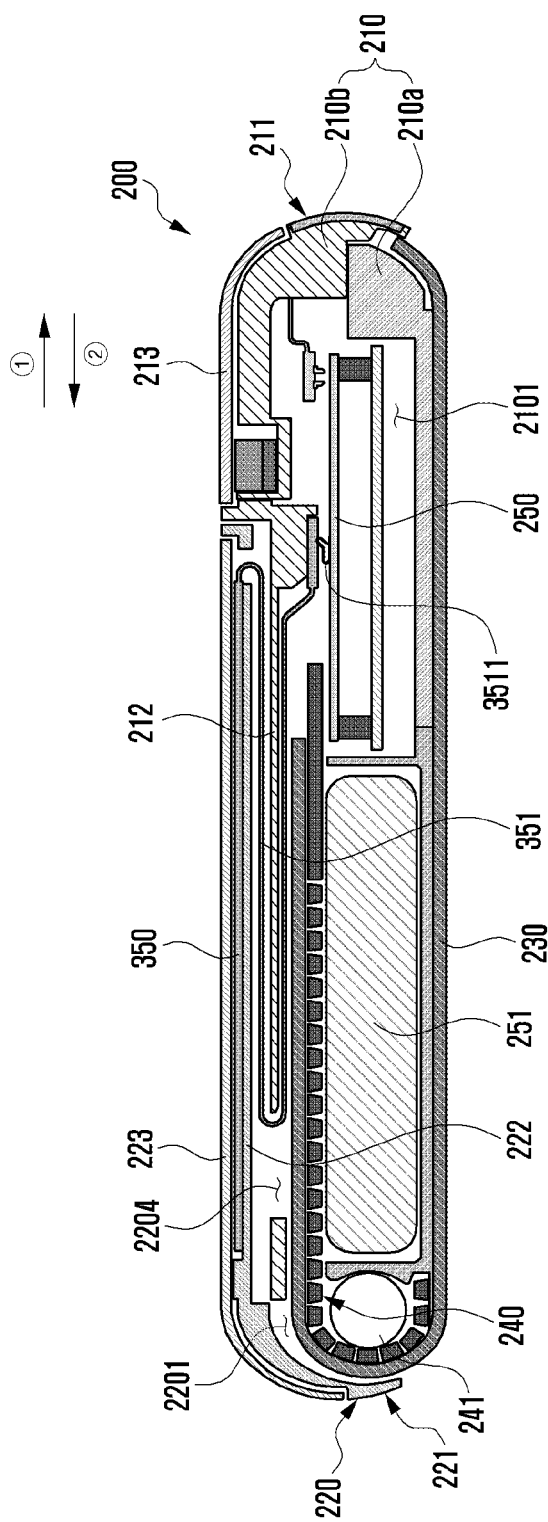
FIG. 14A is a cross-sectional view of the electronic device taken along line 14a-14a of FIG. 13A according to various embodiments.
Figure 14B:
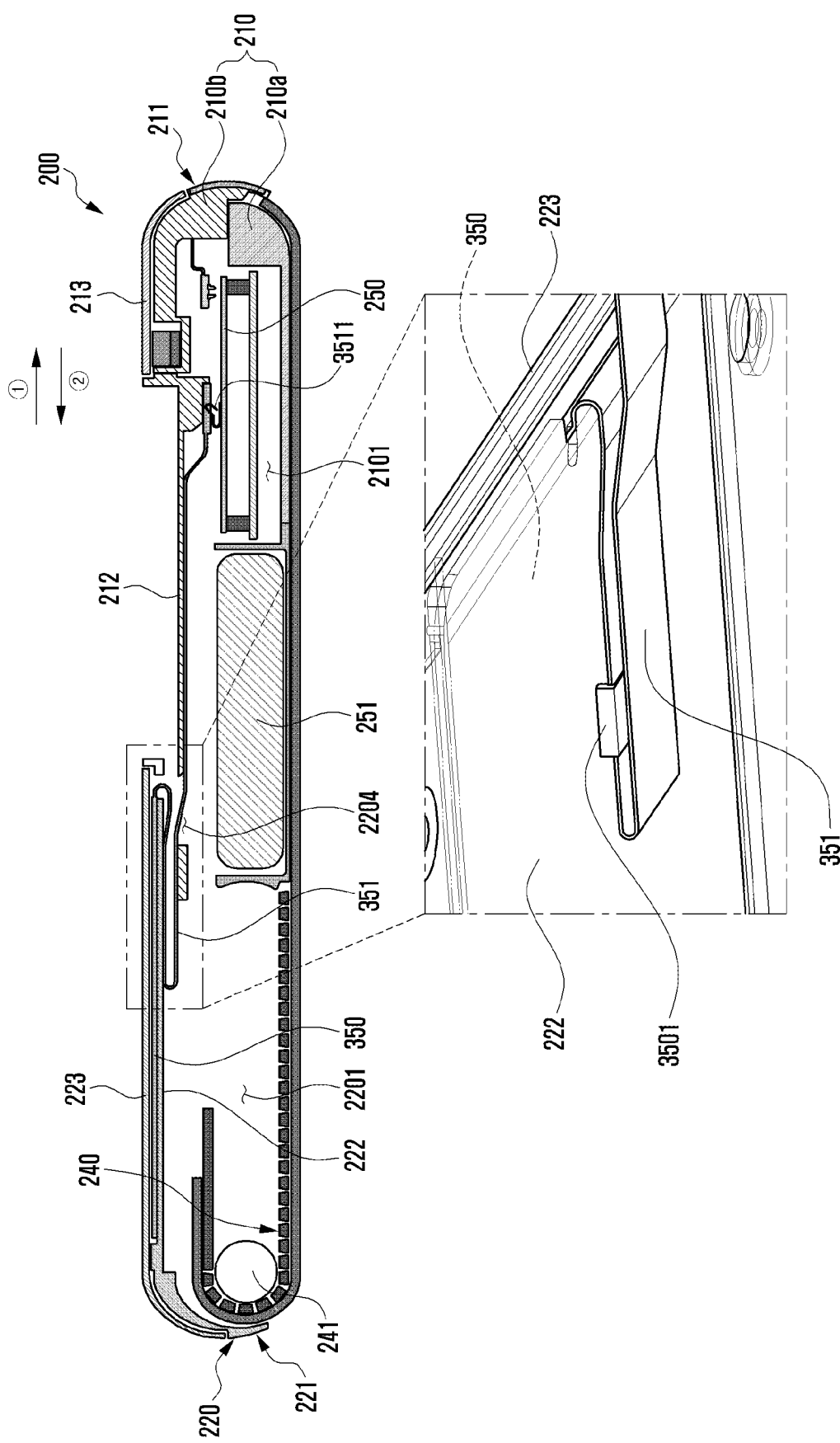
FIG. 14B is a cross-sectional view of the electronic device taken along line 14b-14b of FIG. 13B according to various embodiments.

FIGS. 13A 13B are diagrams illustrating a slide-in state and a slide-out state of an electronic device including an antenna member, respectively, according to various embodiments. FIG. 14A is a cross-sectional view of the electronic device taken along line 14*a*-14*a* of FIG. 13A according to various embodiments. FIG. 14B is a cross-sectional view of the electronic device taken along line 14*b*-14*b* of FIG. 13B according to various embodiments.

In explaining components of the electronic device 200 of FIG. 13A to FIG. 14B, the same reference numerals have been used for the components substantially the same as the components of the electronic device 200 of FIG. 5A and FIG. 5B, and the detailed descriptions may be omitted.

Referring to FIG. 13A to FIG. 14B, the electronic device 200 may include an antenna member 350 disposed to transmit and receive a wireless signal via the second housing 220 of the rear surface (e.g., the rear surface 200*b* of FIG. 2B) side of the electronic device 200. According to an embodiment, the antenna member 350 may be disposed between the second rear surface cover 223 and the second support member 222 of the second housing 220. The second rear surface cover 223 may be configured of a dielectric material (e.g., polymer or glass) to allow the antenna member 350 to guide radiation in a direction toward which the second rear surface cover 223 is oriented. According to an embodiment, the antenna member 350 may be electrically connected to the main board 250 via a bendable extension unit 351 extending from the antenna member 350 to the first space 2101 of the first housing 210. According to an embodiment, the bendable extension unit 351 may include a bendable FPCB extending from the antenna member 350. According to an embodiment, one end of the extension unit may be electrically connected to the antenna member 350, and the other end thereof may be electrically connected to the main board via an electrical connection member such as a conductive spring 3511. According to an embodiment, the extension unit 351 may be disposed on the rear surface of the second support member 222 or may be disposed to be at least partially supported via a support unit 3501 which is additionally disposed. In an embodiment, the bendable extension unit 351 may be disposed separately from the antenna member 350 and may be electrically connected to the antenna member 350.

According to various embodiments, the electronic device 200 may include a through-hole 2204 extending through the first support member 212 of the first housing 210 so as to allow the bendable extension unit 351 to pass through the first space 2101 from a space between the second support member 222 and the second rear surface cover 223. According to an embodiment, the through-hole 2204 may be disposed at a position corresponding to the first support member 212 of the first housing 210 in a slide-out state to prevent and/or reduce the through-hole 2204 from being viewed from the outside via the second support member 222, and thus may be disposed to prevent and/or reduce the bendable extension unit 315 from being viewed from the outside even in a slide-out state. According to an embodiment, the antenna member 350 may include a coil member disposed via a dielectric film. According to an embodiment, the antenna member 350 may include a multi-function coil or multi-function core (MFC) antenna configured to perform a wireless charging function, a neat field communication (NFC) function, and/or an electronic payment function.

Figure 15A:
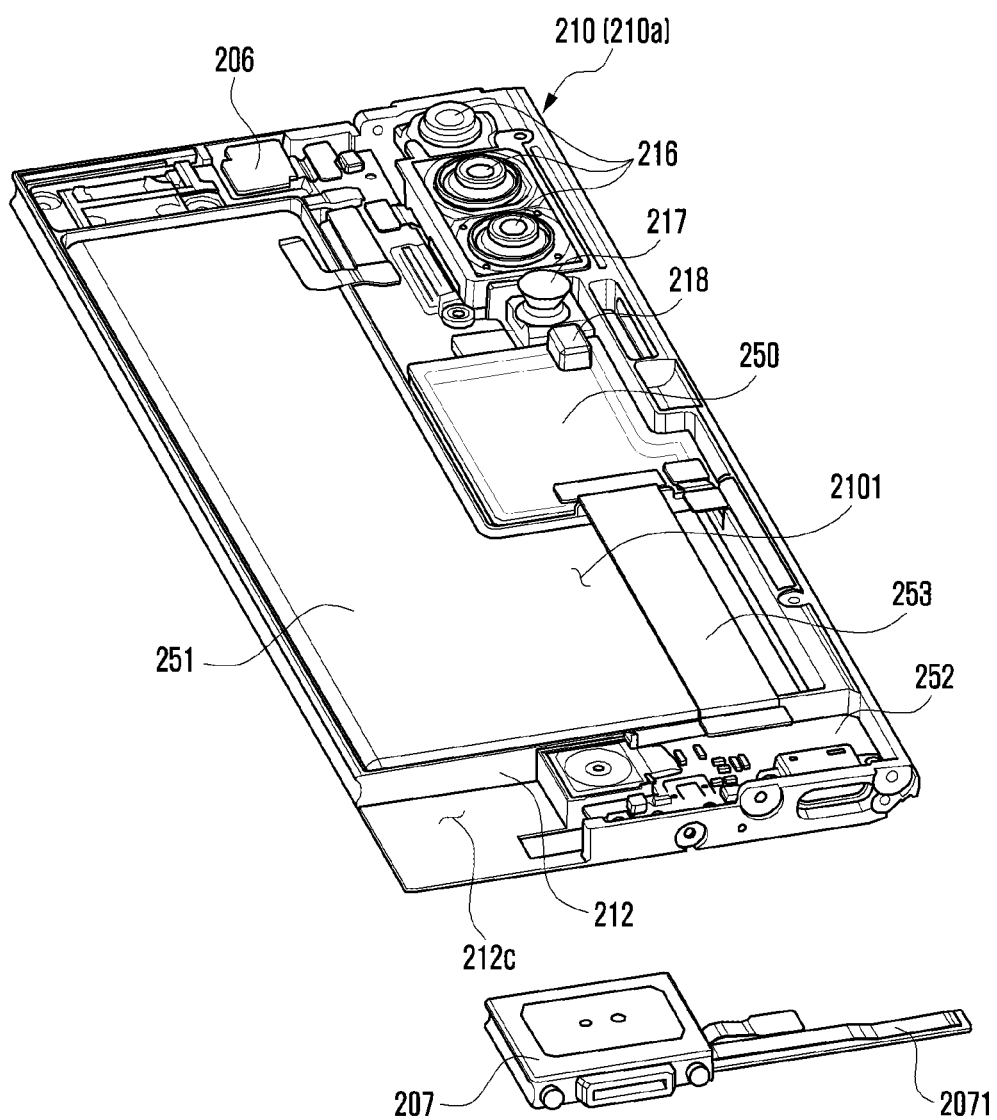
FIG. 15A is a perspective view of a first housing showing a component arrangement structure according to various embodiments.
Figure 15B:
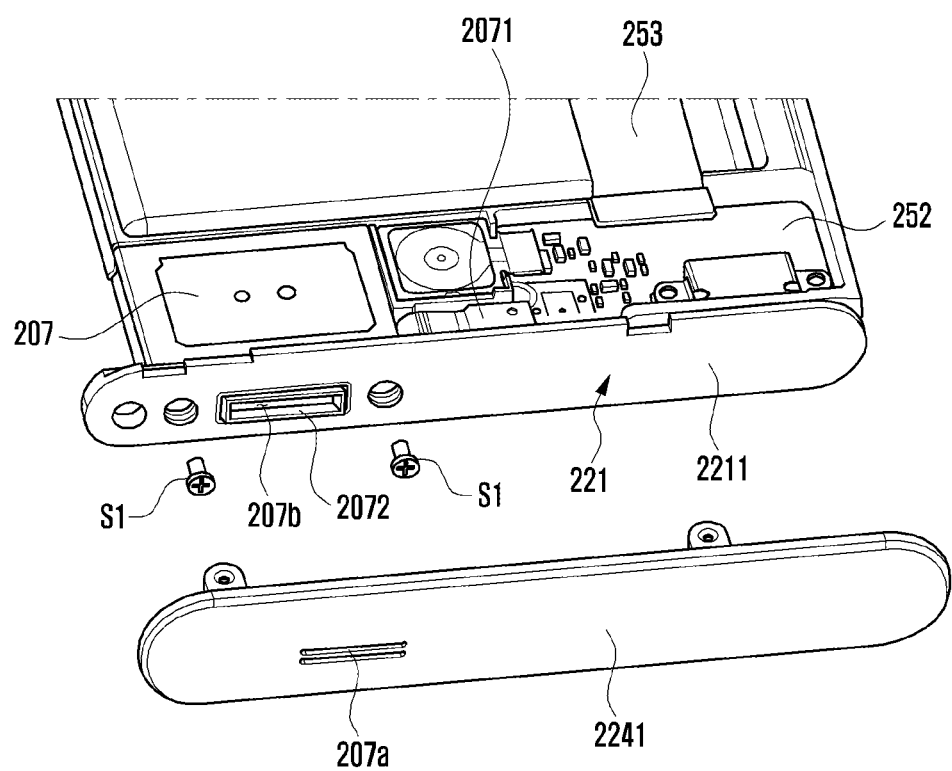
FIG. 15B is a partial perspective view of an electronic device showing a speaker arrangement structure according to various embodiments.

FIG. 15A is a perspective view illustrating a first housing showing a component arrangement structure according to various embodiments. FIG. 15B is a partial perspective view of an electronic device illustrating a speaker arrangement structure according to various embodiments.

Figure 16A:
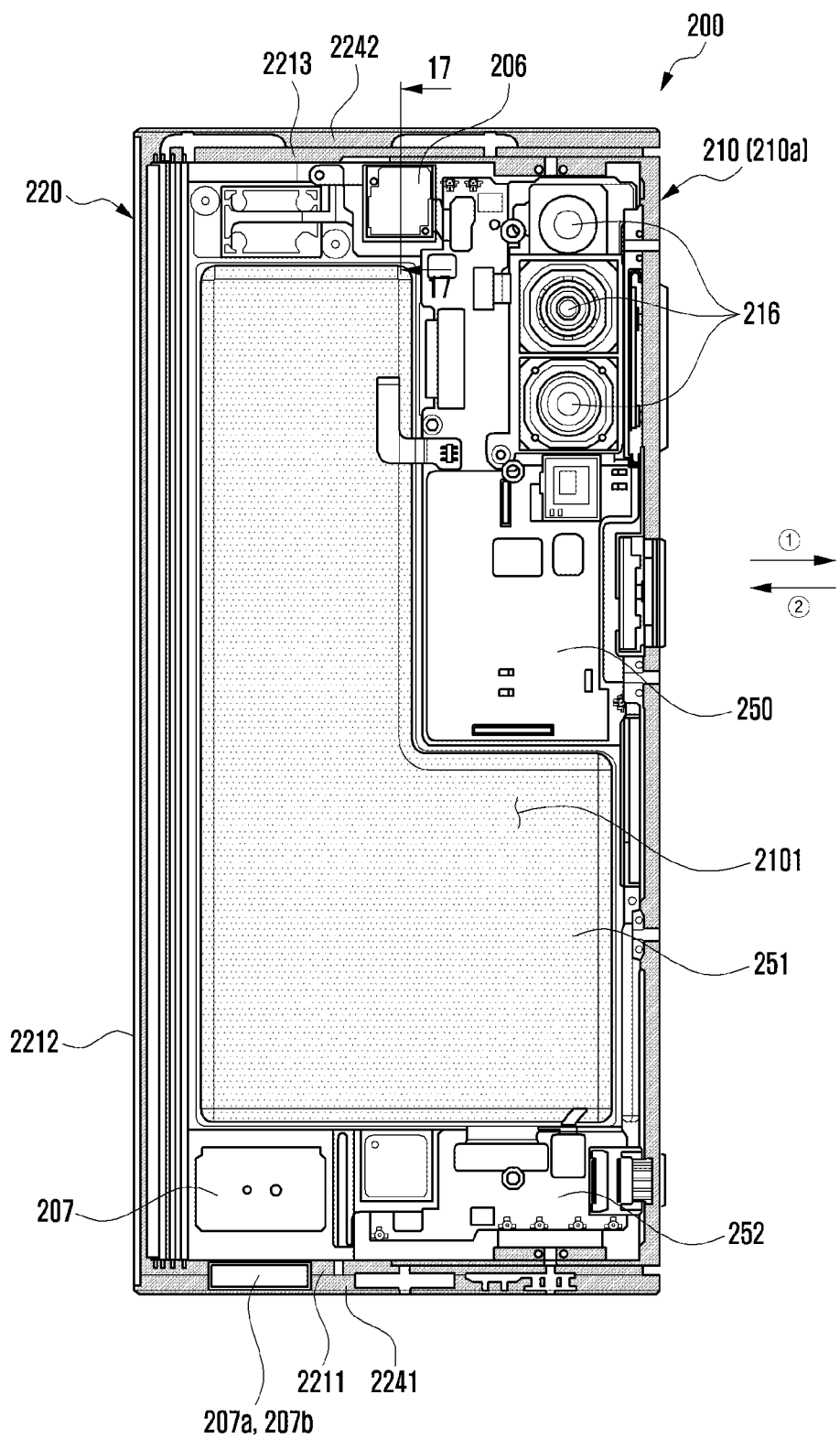
FIG. 16A and FIG. 16B are diagrams illustrating a slide-in state and a slide-out state of an electronic device including a speaker, respectively, according to various embodiments.
Figure 16B:
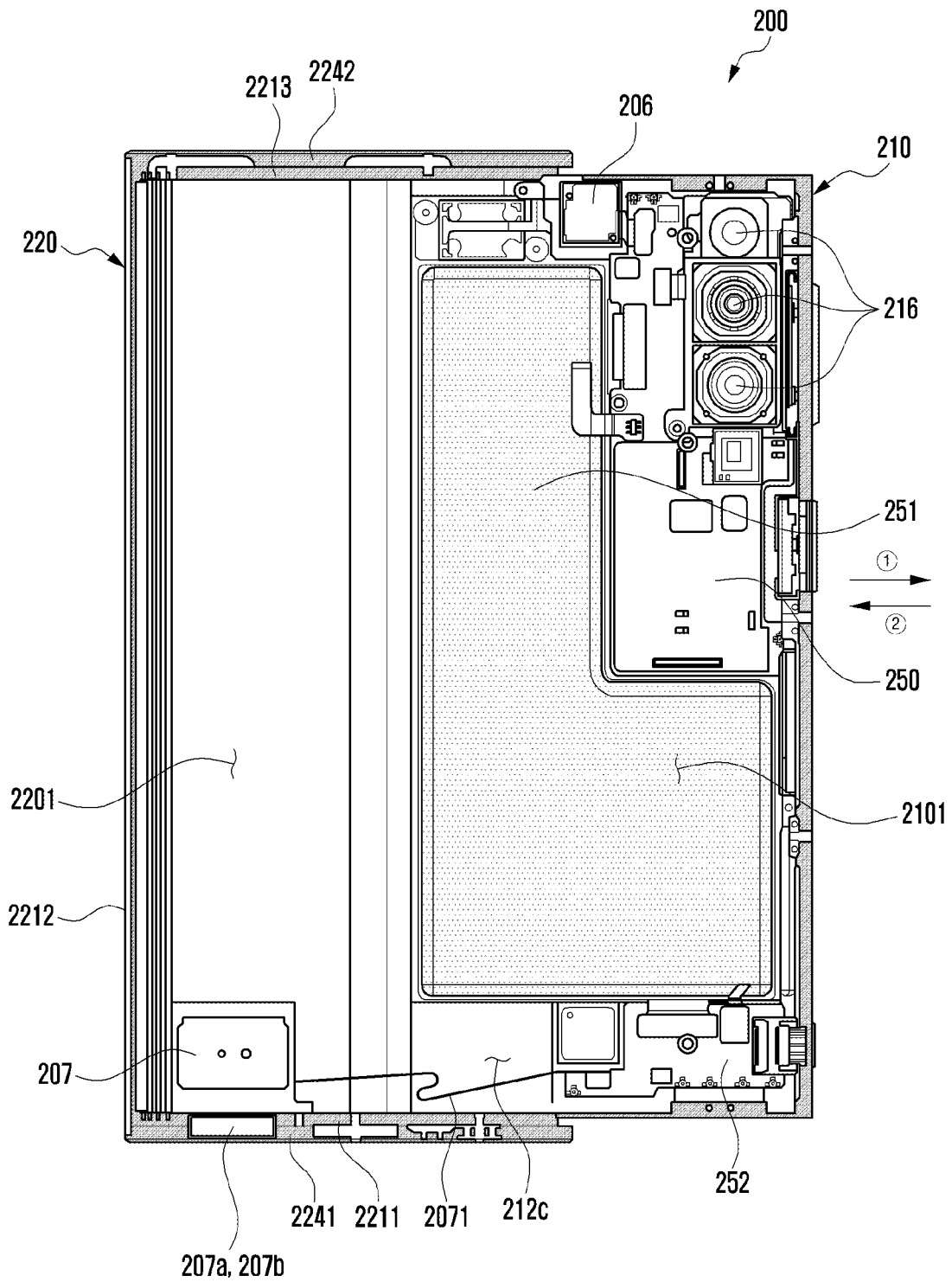

Referring to FIG. 15A and FIG. 15B, an electronic device (e.g., an electronic device 200 of FIG. 16B) may include a first housing 210 including a first space (e.g., a first space 2101 of FIG. 16B) and a second housing (e.g., a second housing 220 of FIG. 16B) slidably coupled to the first housing 210 and including a second space (e.g., a second space 2201 of FIG. 16B). According to an embodiment, the electronic device 200 may include at least one first electronic component arranged in an inner space 2101 of the first housing 210. According to an embodiment, the at least one first electronic component may include a main board 250, at least one camera module 216, a sensor module 217, a flash 218, a receiver 206 (e.g., a speaker for a call) and/or a battery 251, arranged in the first space 2101. For example, the at least one camera module 216 may be arranged on the main board 250. For another example, the battery 251 may be disposed at a position at which the battery does not overlap the main board 250. According to an embodiment, the at least one first electronic component may be arranged to be spaced apart from the main board 250 and may include a sub-board 252 electrically connected thereto via a connection cable 253. In an embodiment, the main board 250 may expand to the area where the sub-board 252 is disposed, while the connection cable 253 and the sub-board 252 are omitted.

According to various embodiments, the electronic device 200 may include at least one second electronic component arranged in a second space 2201 of the second housing 220. According to an embodiment, the at least one second electronic component may include a speaker 207 (e.g., an external speaker). According to an embodiment, the speaker 207 may be disposed in the second space 2201 via a change of a structural shape of the second support member 222 and/or the second side surface member 221. According to an embodiment, the speaker 207 may be fixed in the second space 2201 inserted through the second side surface member 221 via a fastening member such as a screw S1. According to an embodiment, the speaker 207 may be disposed to be capable of outputting sound to the outside via the first speaker hole 207a extending through the first side surface cover 2241. According to an embodiment, in the second space 2201, the speaker 207 may be disposed to face a second speaker output hole 207b extending through the fourth side surface 2211 of the second side surface member 221, and the second speaker hole 207b may be aligned to correspond to the first speaker hole 207a of the first side surface cover 2241. According to an embodiment, the electronic device 200 may include a sealing member 2072 disposed between the fourth side surface 2211 and the first side surface cover 2241. According to an embodiment, the sealing member 2072 may include at least one of a sponge, rubber, urethane, or silicone.

According to various embodiments, the electronic device 200 may include a bendable FPCB 2071 extending from the second space 2201 to the first space 2101 and configured to electrically connect the speaker 207 to the sub-board 252. According to an embodiment, the bendable FPCB 2071 may be configured to have a length and flexibility to accommodate a sliding operation of the electronic device 200. According to an embodiment, the first housing 210 may include an accommodation unit 212c configured to accommodate the speaker 207 disposed in the second space 2201 of the second housing 220, via a structural shape of the first support member 212 in a slide-in state.

The speaker 207 according to an embodiment of the disclosure may be disposed in the second space 2201 of the second housing 220 and be disposed to output sound through the first speaker hole 207a and the second speaker hole 207b which are exposed to the outside via the second side surface member 221 of the second housing 220 regardless of a slide-in/slide-out operation, and thus sound quality deterioration such as sound leakage caused by gaps between the side surfaces (e.g., the first side surface 2111 and the fourth side surface 2211), produced according to the sliding operation or the assembly tolerance of the two housings 210 and 220 may be prevented and/or reduced.

FIGS. 16A and 16B are diagrams illustrating a slide-in state and a slide-out state of an electronic device including a speaker, respectively, according to various embodiments.

Figure 17:
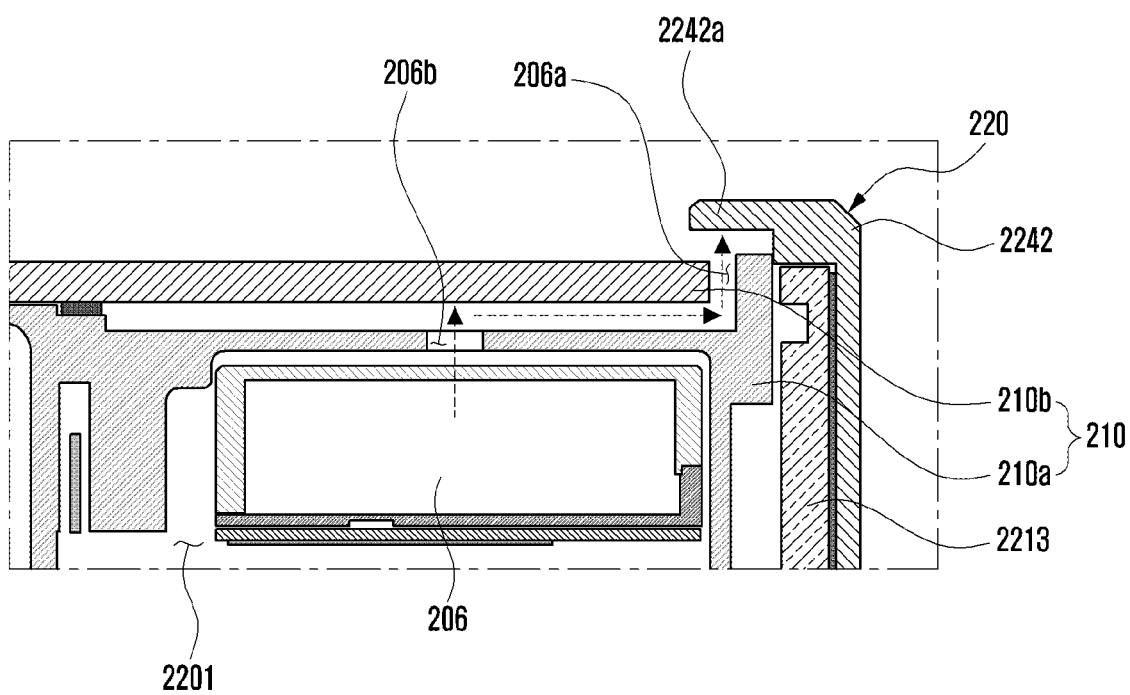
FIG. 17 is a partial cross-sectional view of the electronic device taken along line 17-17 of FIG. 16A according to various embodiments.
Figure 18A:
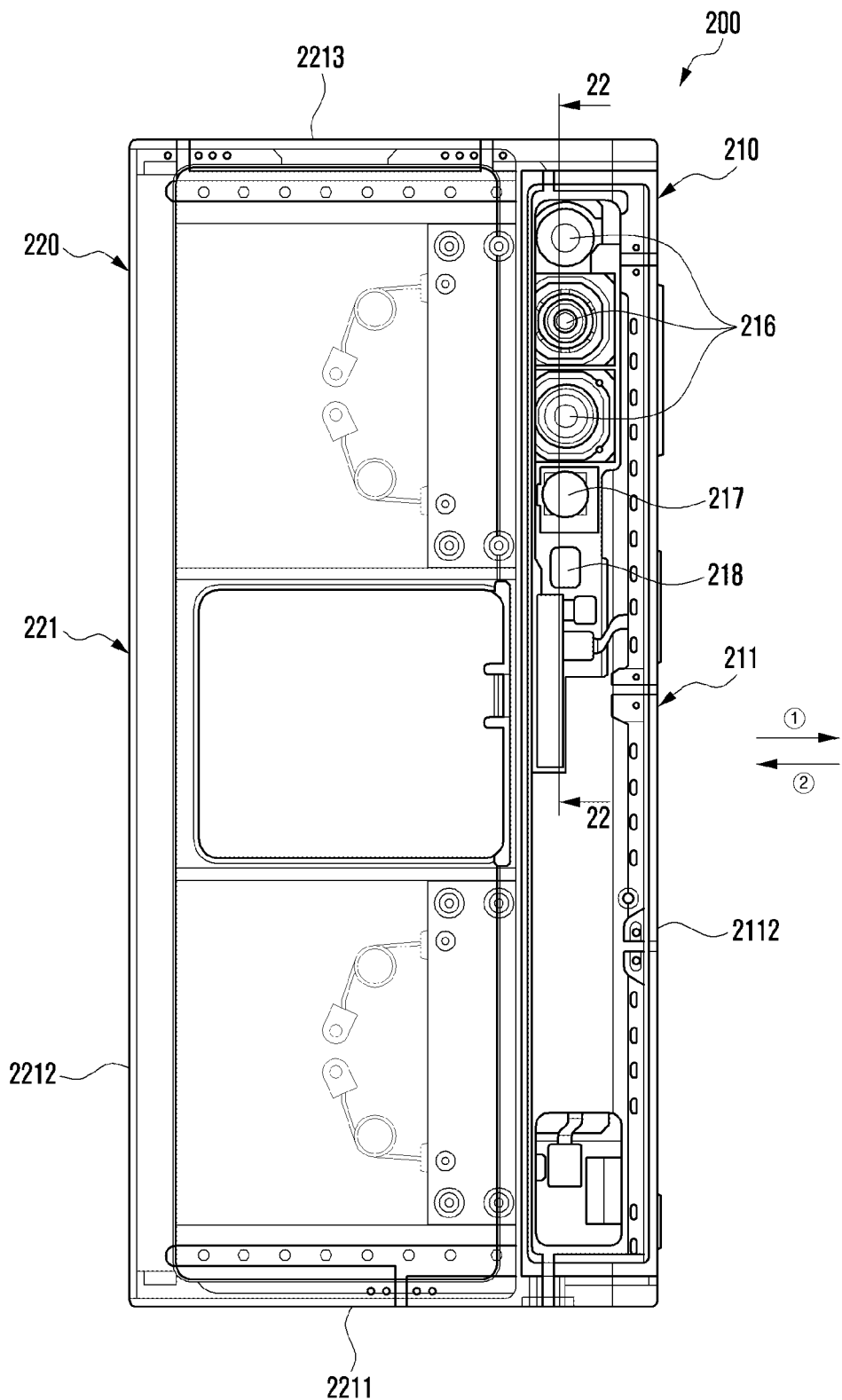
FIGS. 18A, 18B, 19A and 19B are diagrams illustrating a mounting structure of a card tray in a slide-in state and a slide-out state of an electronic device according to various embodiments.
Figure 18B:
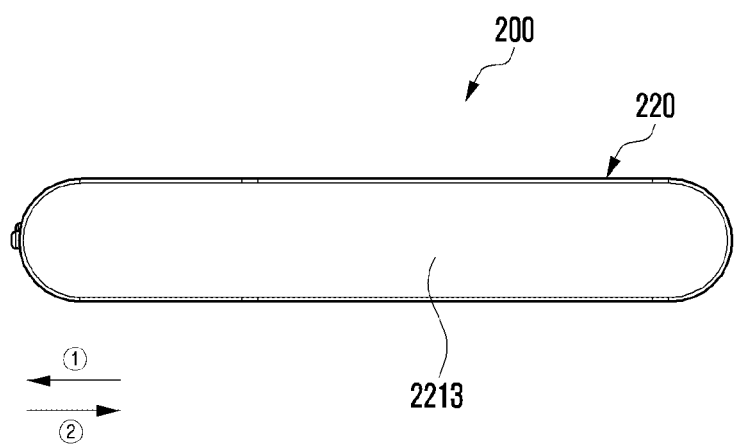
Figure 19A:
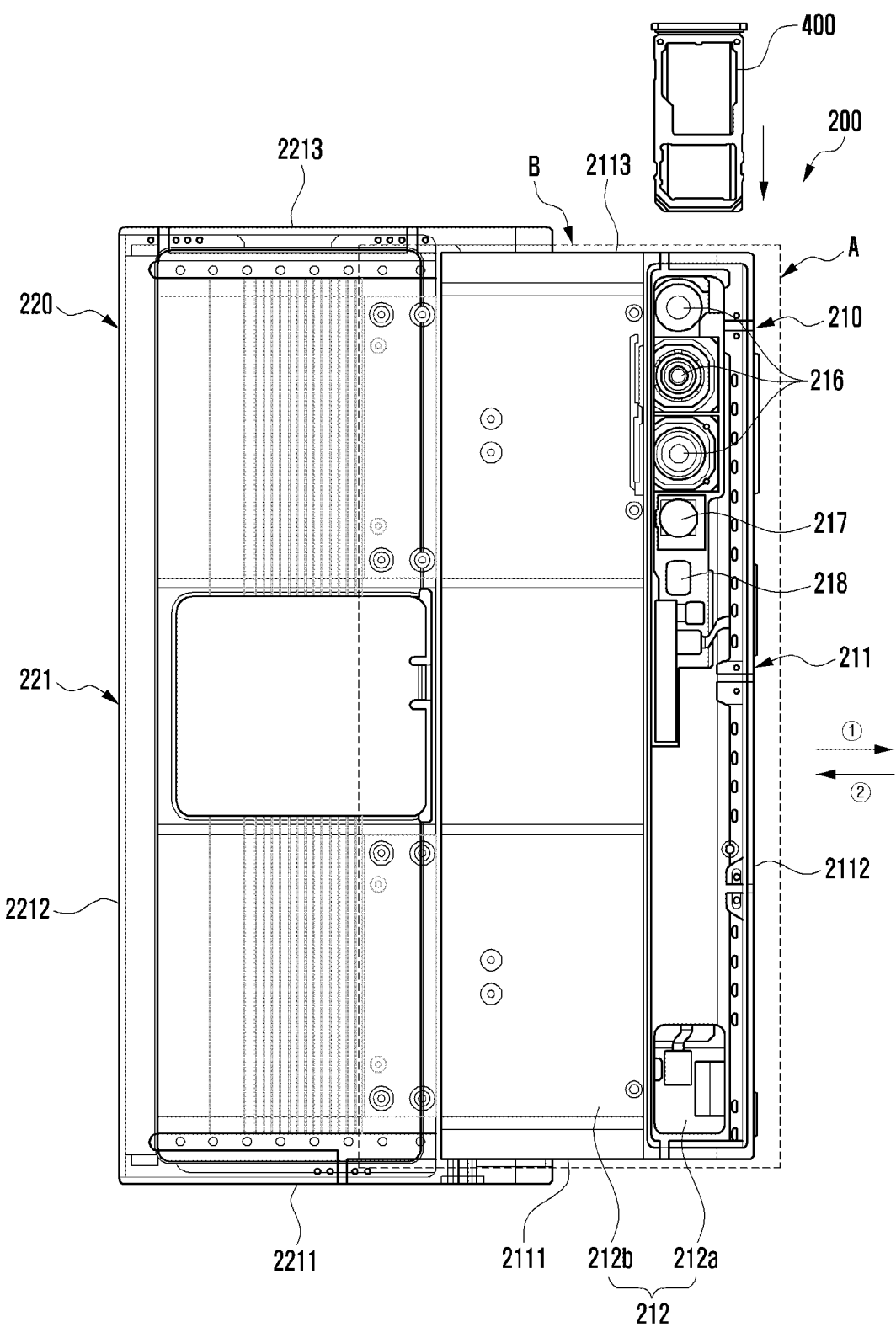
Figure 19B:
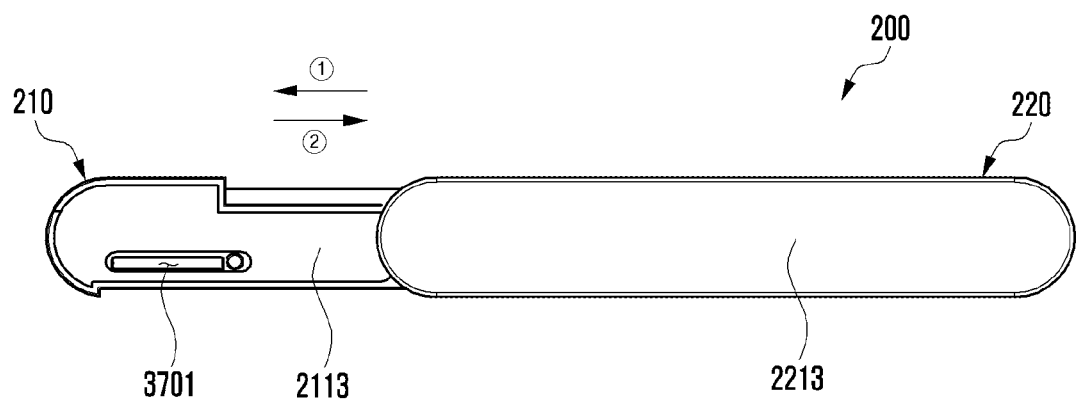

FIG. 17 is a partial cross-sectional view of the electronic device taken along line 17-17 of FIG. 16A according to various embodiments.

FIG. 16A is a view illustrating an arrangement configuration of electronic components of the first housing, in a state where the second support member of the second housing is omitted.

Referring to FIGS. 16A, 16B and 17, in a slide-in state of the electronic device 200, the speaker 207 disposed in the second space 2201 of the second housing 220 may be located in the accommodation unit 212c disposed via a structural shape of the first support member 212 of the first housing 210. According to an embodiment, in a slide-out state of the electronic device 200, the first housing 210 may be moved from the second housing 220 in a predetermined first direction (direction ①), and the speaker 207 disposed in the second space 2201 may also be moved from the accommodation unit 212c. The speaker 207 may continuously maintain the state of the electrical connection with the sub-board 252 via the bendable FPCB 2071. According to an embodiment, the speaker 207 may output sound through the first speaker hole 207a and the second speaker hole 207b which are arranged through the second housing 220 to be exposed to the outside, and thus the best sound output performance may be maintained.

According to various embodiments, the electronic device 200 may include a receiver 206 (e.g., a speaker for a call) disposed in the first space 2101, via a structural shape of the first support member 212 of the first housing 210. According to an embodiment, the receiver 206 may be disposed to output sound to the outside through a through-hole 206b extending through the first bracket housing 210a of the first housing 210 and a sound output hole 206a configured via the coupling structure of the first bracket housing 210a and the second bracket housing 210b. According to an embodiment, in a slide-in state, the sound output hole 206a may be disposed to prevent and/or reduce the sound output hole 206a from being viewed from the outside via the second side surface cover 2242. According to an embodiment, in a slide-in state, the sound output hole 206a may be covered to prevent and/or reduce the sound output hole 206a from being viewed from the outside via a bent unit 2242a configured to be bent at an end of the second side surface cover 2242. In an embodiment, in a slide-out state, the sound output hole 206a may be disposed at a position at least partially visible from the outside. In an embodiment, even in a slide-out state, the sound output hole 206a may be disposed to be covered via the second side surface cover 2242 to prevent and/or reduce the sound output hole 206a from being viewed from the outside.

According to an embodiment of the disclosure, at least one other electronic component, which may be interfered with according to a sliding operation of the first housing 210 and the second housing 220, may be disposed in substantially the same manner as the speaker 207. According to an embodiment, the at least one other electronic component may include at least one of an interface (IF) connector port, a sensor module, or a socket module.

FIGS. 18A, 18B, 19A and 19B are diagrams illustrating a mounting structure of a card tray in a slide-in state and a slide-out state of an electronic device according to various embodiments.

Referring to FIGS. 18A, 18B, 19A and 19B, the electronic device 200 may include a first housing 210 and a second housing 220 slidably coupled to the first housing 210 by a predetermined reciprocating distance. According to an embodiment, the first housing 210 may include a first side surface member 211 including a first side surface 2111, a second side surface 2112, and a third side surface 2113 and a first support member 212 extending from the first side surface member 211 to the first space 2101. According to an embodiment, the second housing 220 may include a second side surface member 222 including a fourth side surface 2211, a fifth side surface 2212, and a sixth side surface 2213 and a second support member 222 extending from the second side surface member 222 to the second space 2201. According to an embodiment, in a slide-in state, at least a portion of the first side surface 2111 and the third side surface 2113 may be accommodated in the second space 2201 and face the fourth side surface 2211 and the sixth side surface 2213 of the second housing 220, respectively, and thus may be arranged to prevent and/or reduce the at least a portion from being viewed from the outside. According to an embodiment, in a slide-out state, the first side surface 2111 and the third side surface 2113 may be at least partially slid out from the second space 2201, and thus may be arranged to be visible from the outside. According to an embodiment, the electronic device 200 may include a component assembly (CA) (see, e.g., FIG. 20) disposed in the first sub-space A and disposed in a manner in which at least two electronic components are stacked. According to an embodiment, the component assembly (CA) may include a first electronic component disposed in the first sub-space A and a second electronic component disposed in a stacked manner with the first electronic component and disposed to correspond to an external environment via at least a portion of the third side surface 2113. According to an embodiment, the first electronic component may include, in the first sub-space A, a camera module 216 disposed to detect an external environment through the first rear surface cover. In an embodiment, the first electronic component may include at least one of a camera module 216, a sensor module 217, or a flash 218. According to an embodiment, the second electronic component may include, in the first sub-space A, a socket module (e.g., a socket module 370 of FIG. 20) disposed to be capable of accommodating a socket tray 400 through an opening 3701 extending through the third side surface 2113. According to an embodiment, when the first support member 212 is viewed from above, at least two electronic components may be arranged in a stacked manner of at least partially overlapping each other via the component assembly (CA), thereby helping to utilize the space of arrangement of other electronic components (e.g., the antenna R of FIG. 9A). According to an embodiment, the opening 3701 extending through the third side surface 2113 to accommodate the socket tray 400 may be covered from the outside via the sixth side surface 2213 in a slide-in state, thereby helping to form a beautiful appearance of the electronic device 200. In an embodiment, the socket module 370 may be replaced with an IF connector port which is fine even when used only in a slide-out state.

Figure 20:
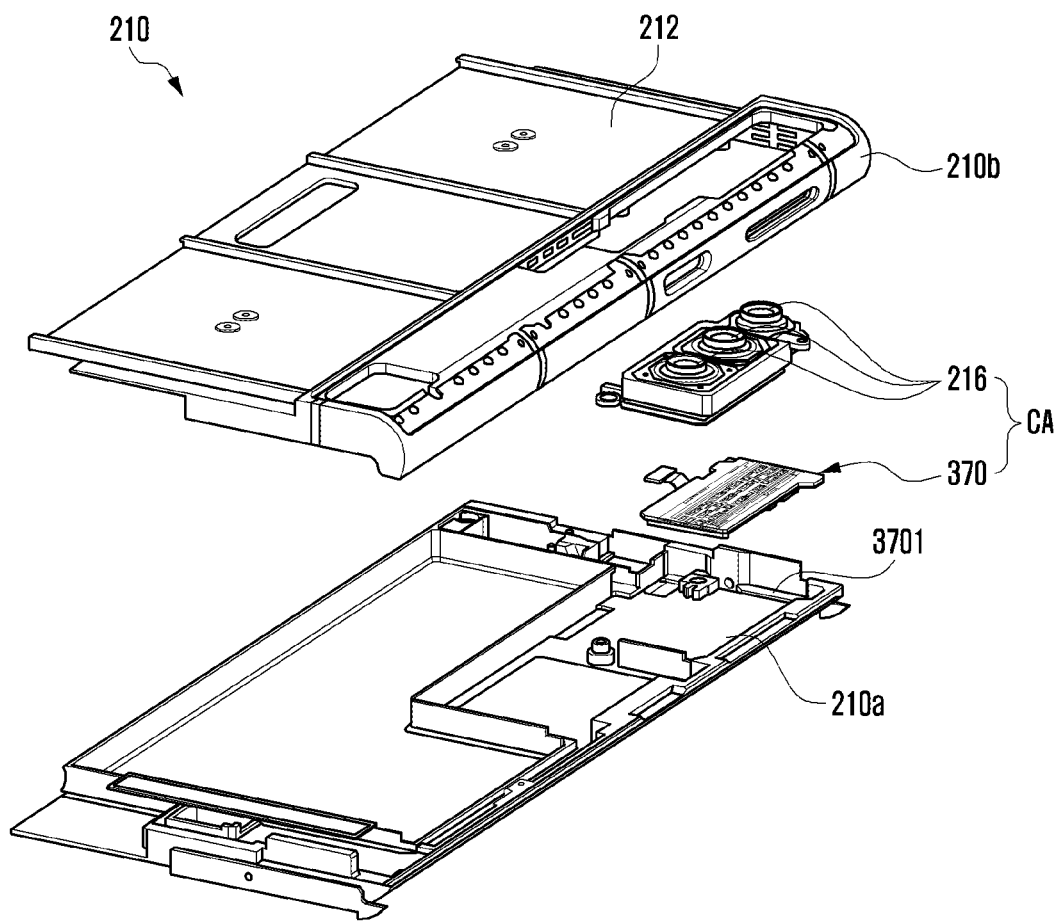
FIG. 20 is an exploded perspective view of a first housing including a component assembly according to various embodiments.

FIG. 20 is an exploded perspective view of a first housing including a component assembly according to various embodiments.

Referring to FIG. 20, the component assembly (CA) may be disposed in the first space (e.g., a first space 2101 of FIG. 22) of the first housing 210, configured via a coupling of the first bracket housing 210a and the second bracket housing 210b. According to an embodiment, the component assembly (CA) may include a camera module 216 and a socket module 370 disposed in a stacked manner with the camera module 216. According to an embodiment, when the first support member 212 is viewed from above, the component assembly (CA) may be disposed to allow the camera module 216 to at least partially overlap the socket module 370. The socket module 370 may be disposed at a position to face the opening 3701 extending through the third side surface (e.g., the third side surface 2113 of FIG. 19B), in the first housing 210.

Figure 21A:
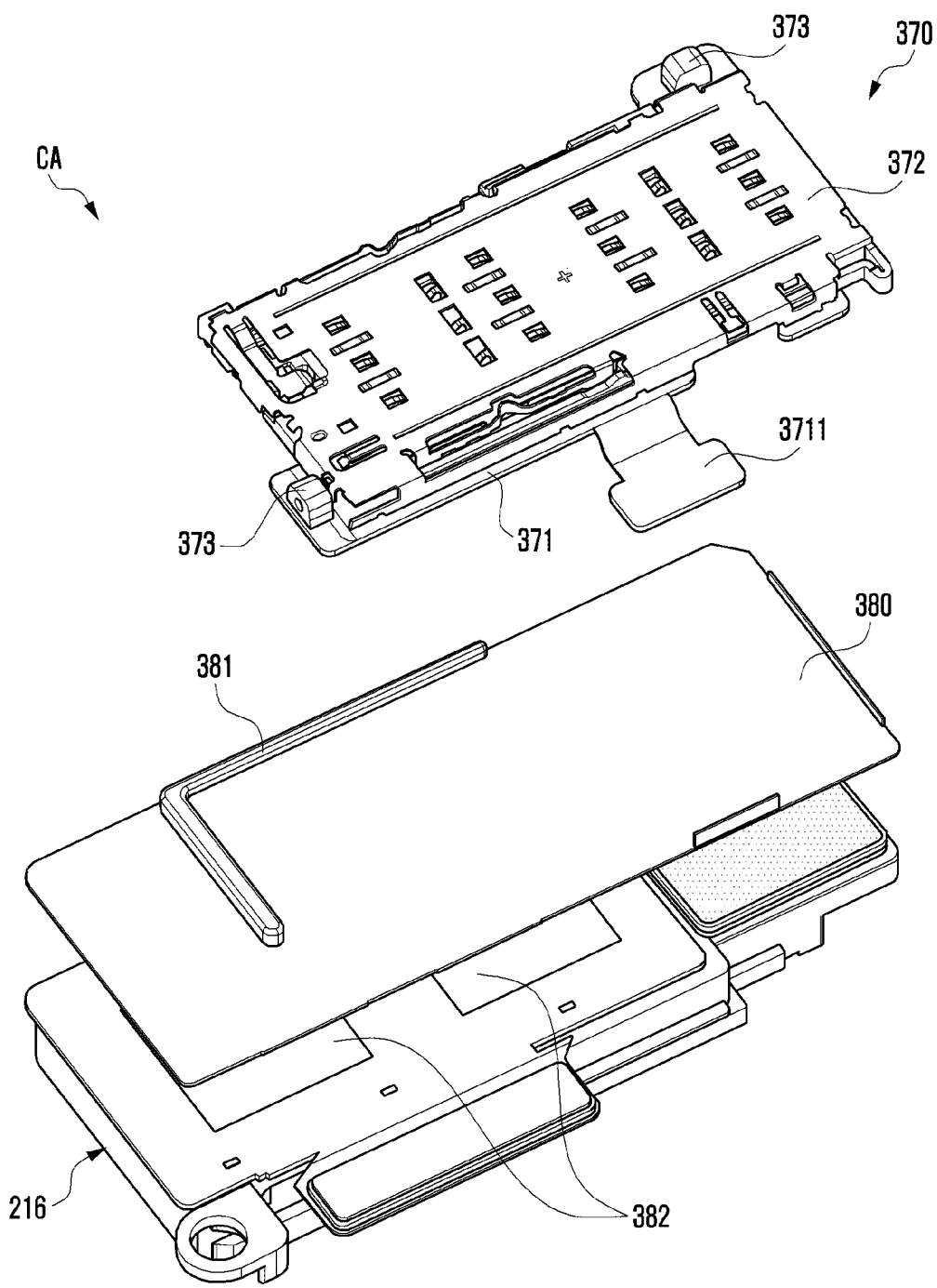
FIGS. 21A, 21B and 21C are perspective views illustrating an assembling operation of a component assembly according to various embodiments.
Figure 21B:
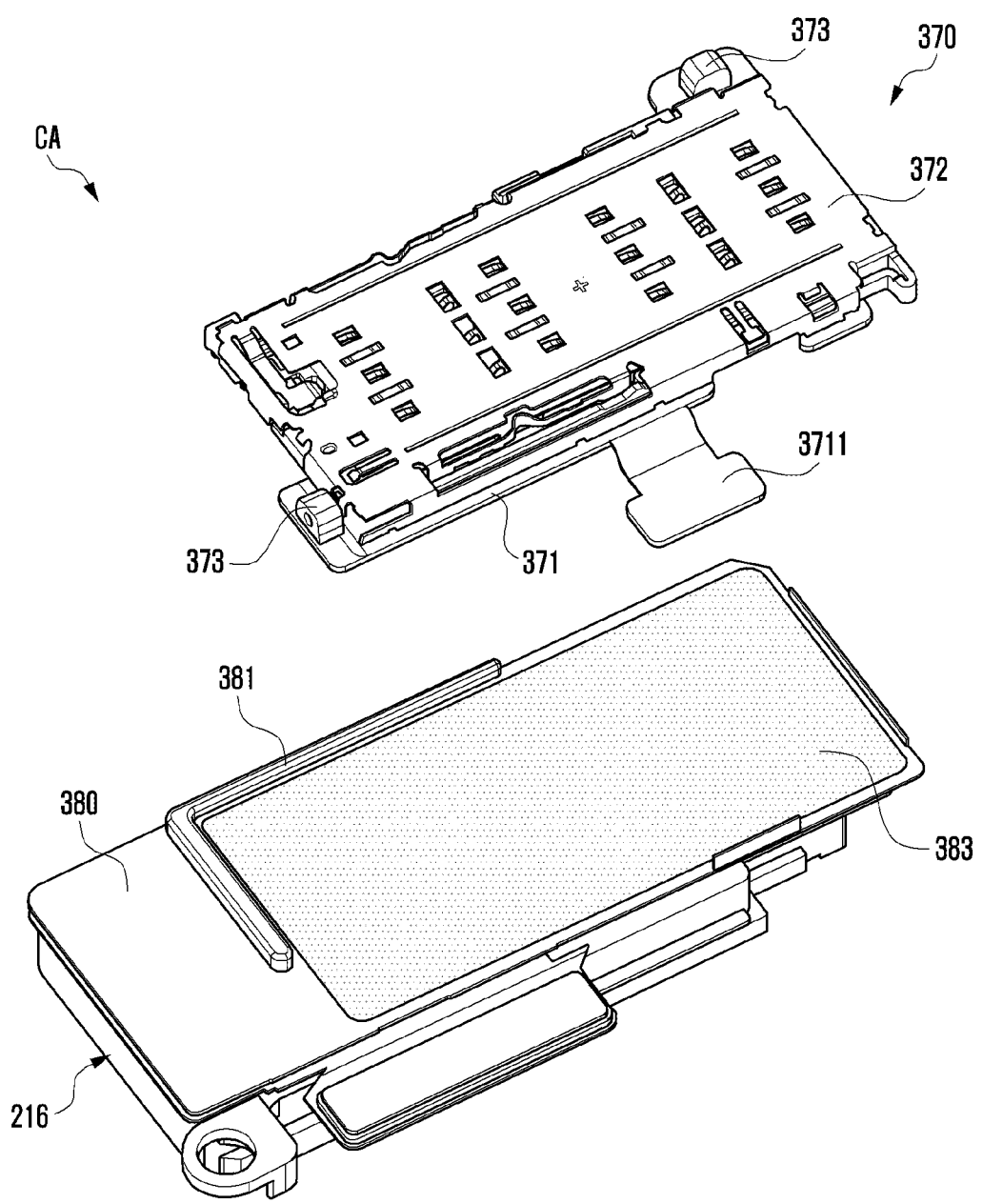
Figure 21C:
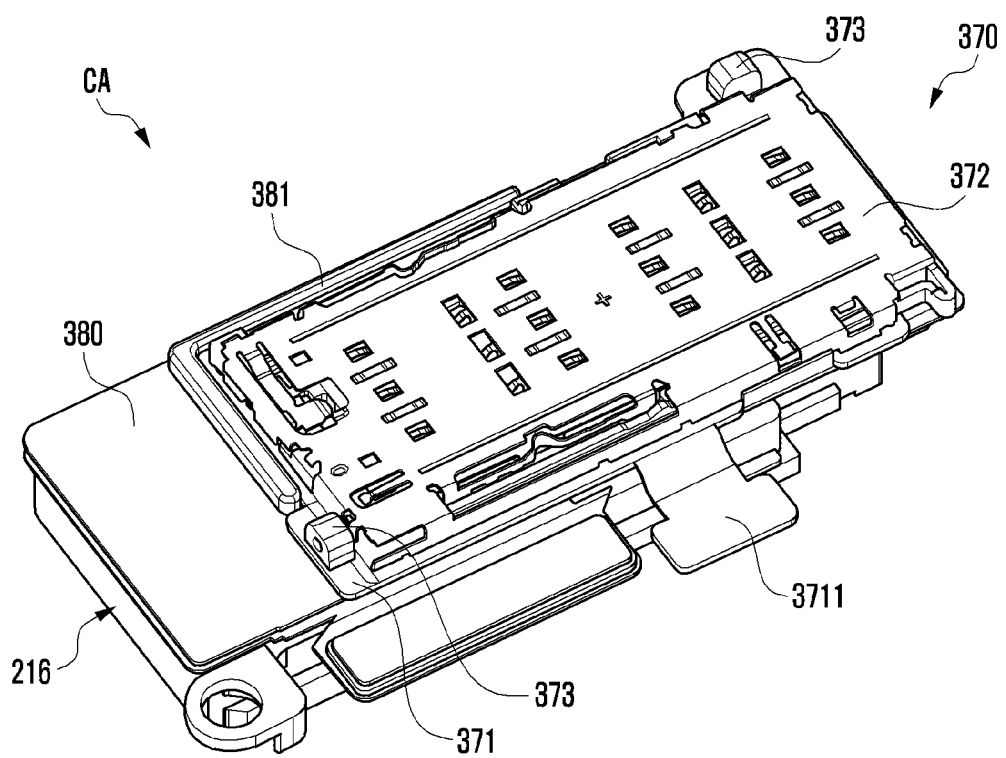
Figure 22:
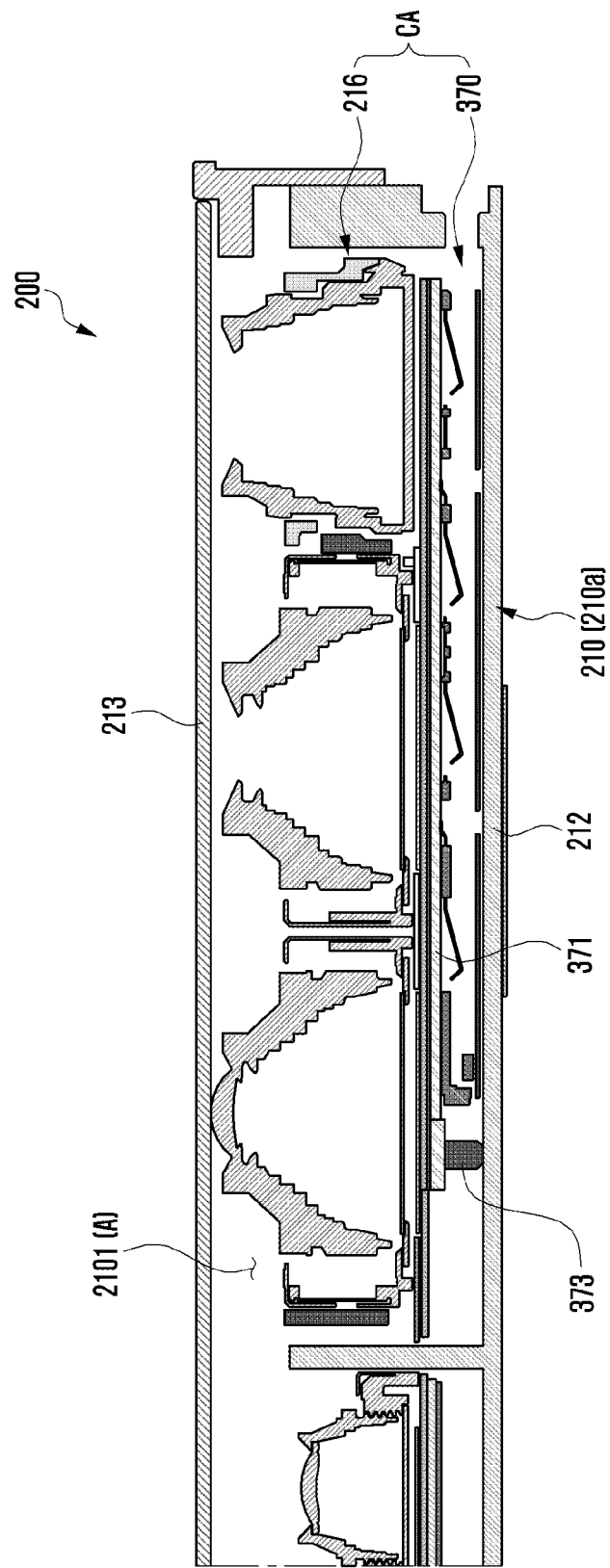
FIG. 22 is a partial cross-sectional view of the electronic device taken along line 22-22 of FIG. 18A according to various embodiments.

FIGS. 21A, 21B and 21C are perspective views illustrating an assembling operation of a component assembly according to various embodiments. FIG. 22 is a partial cross-sectional view of the electronic device taken along line 22-22 of FIG. 18A according to various embodiments.

Referring to FIGS. 21A, 21B and 21C, in an embodiment, the component assembly (CA) may include a socket module 370 and a camera module 216 coupled in a stacked manner with the socket module 370. According to an embodiment, the socket module 370 may include a substrate 371 including a connector 3711 and a socket base 372 disposed on the substrate 371. According to an embodiment, the component assembly (CA) may include a reinforcing plate 380 disposed between the camera module 382 and the substrate 371 of the socket module 370. According to an embodiment, the reinforcing plate 380 may help to reinforce rigidity of the component assembly (CA) and may reduce performance deterioration of the camera module 216 by performing a shielding action. In an embodiment, the reinforcing plate 380 may firmly fix the electronic components of the component assembly (CA) and may provide a fixing structure with the first housing (e.g., the first housing 210 of FIG. 20). In an embodiment, the reinforcing plate 380 may provide a heat transfer structure (e.g., a heat dissipation structure) which diffuses heat produced from the electronic components of the component assembly (CA). According to an embodiment, the reinforcing plate 380 may include an alignment protrusion 381 protruding in a predetermined shape from the outer surface to provide a fixing position of the socket module 370. According to an embodiment, the reinforcing plate 380 may be configured of a metal material. According to an embodiment, the socket module 370 and the camera module 216 may be fixed to the reinforcing plate 380 via adhesive members 382 and 383 (e.g., double-sided tape). In an embodiment, the socket module 370 and the camera module 216 may be fixed to the reinforcing plate 380 via ultrasonic fusion or structural bonding.

Referring to FIG. 22, in a case where the component assembly (CA) is disposed in the first space 2101 (e.g., the first sub-space A) of the first housing 210, the camera module 216 may face the first rear surface cover 213 and the socket module 370 may face the first support member 212. The electronic device 200 may further include an intermediate member 373 disposed between the socket module 370 and the first support member 212. According to an embodiment, the intermediate member 373 may be disposed to be substantially in contact with a conductive portion of the first support member 212 and the socket module 370. According to an embodiment, the intermediate member 373 may include a conductive buffer member configured to ground the socket member 370 to the first housing 210 and perform a buffering operation. According to an embodiment, the conductive buffer member may include at least one of a conductive sponge, a conductive tape, or a conductive adhesive. According to an embodiment, the intermediate member 373 may include a heat transfer member configured to diffuse heat produced from the socket module 370 and/or the camera module 216 to the first housing 210. According to an embodiment, the heat transfer member may include a thermal interface material (TIM). In an embodiment, the intermediate member 373 may be replaced with a material capable of performing all of a buffering action, a shielding action, and a heat transfer action.

According to various example embodiments, an electronic device (e.g., the electronic device 200 in FIG. 3A) may include: a first housing (e.g., the first housing 210 in FIG. 3A) having a first space (e.g., the first space 2101 in FIG. 5A) formed through a first lateral portion (e.g., the first lateral member 211 in FIG. 3A) including a first side surface (e.g., the first side surface 2111 in FIG. 3A), a second side surface (e.g., the second side surface 2112 in FIG. 3A) extending in a direction perpendicular to the first side surface, and a third side surface (e.g., the third side surface 2113 in FIG. 3A) extending from the second side surface parallel to the first side surface; a second housing (e.g., the second housing 220 in FIG. 3A) slidably combined with the first housing along a first direction (e.g., direction ① in FIG. 3A) and having a second space (e.g., the second space 2201 in FIG. 5A) formed through a second lateral portion (e.g., the second lateral member 221 in FIG. 3A); a bendable support (e.g., the bendable member 240 in FIG. 5A) connected to the first housing, accommodated at least in part in the second space in a slide-in state, and coplanar at least in part with the first housing in a slide-out state; a flexible display (e.g., the flexible display 230 in FIG. 3A) including a first portion (e.g., the first portion 230a in FIG. 3A) disposed to be visible from outside in the slide-in state, and a second portion (e.g., the second portion 230b in FIG. 3A) extending from the first portion and accommodated in the second space through the bendable member so as not to be visible at least in part from the outside; at least one electronic component (e.g., the speaker 207 in FIG. 15B) disposed in the second space and in communication with an external environment through a first opening (e.g., the second speaker hole 207b in FIG. 15B) formed in at least a part of the second lateral member in the slide-in state; and a bendable electrical connection member comprising a conductor (e.g., the bendable FPCB 2071 in FIG. 15B) connecting the electronic component to the first space. At least a part of the first and third side surfaces may be accommodated in the second space in the slide-in state so as not to be visible from the outside, and the at least one electronic component may be disposed at a position not subject to interference from the first side surface and/or the second side surface in the slide-in state.

According to various example embodiments, in the slide-out state, the second portion of the flexible display may be supported by the bendable support and visible at least in part from the outside.

According to various example embodiments, the first housing may include a first support extending from the first lateral portion to the first space, the second housing may include a second support extending from the second lateral portion to the second space, and at least a part of the first support and at least a part of the second support may be configured to be slidably combined with each other.

According to various example embodiments, the second lateral portion may include a fourth side surface corresponding to at least a part of the first side surface, a fifth side surface extending from the fourth side surface and disposed parallel to the second side surface, and a sixth side surface extending from the fifth side surface and corresponding to at least a part of the third side surface, and in the slide-in state, the first side surface may be hidden by the fourth side surface, and the third side surface may be hidden by the sixth side surface.

According to various example embodiments, the first opening may be formed through the fourth side surface, and the at least one electronic component may be fastened through at least one fastener in the second space so as to face the first opening.

According to various example embodiments, the at least one fastener may include at least one screw.

According to various example embodiments, the electronic device may further include a first lateral cover disposed on the fourth side surface and having a second opening formed at a position corresponding to the first opening.

According to various example embodiments, the second opening may have substantially a same size and shape as the first opening.

According to various example embodiments, the electronic device may further include a seal disposed between the fourth side surface and the first lateral cover to surround the first opening and the second opening.

According to various example embodiments, the seal may include at least one of sponge, rubber, urethane, and silicone.

According to various example embodiments, the first housing may further include an accommodating portion formed in the first space configured to accommodate the at least one electronic component in the slide-in state.

According to various example embodiments, the accommodating portion may be provided through a structural shape of the first support.

According to various example embodiments, the bendable electrical connection member may include a flexible printed circuit board (FPCB).

According to various example embodiments, the electronic device may further include a main substrate disposed in the first space, a sub-substrate spaced apart from the main substrate, and a connection cable electrically connecting the sub-substrate and the main substrate, and the bendable electrical connection member may be electrically connected to the sub-substrate.

According to various example embodiments, the at least one electronic component may include at least one of a speaker, a microphone, an IF connector port, a sensor module, or a socket module.

According to various example embodiments, the electronic device may further include a receiver disposed in the first space in communication with the outside through a third opening formed on the third side surface of the first housing, wherein in the slide-in state, the third opening may be hidden through at least a part of the second housing so as not to be seen from the outside.

According to various example embodiments, in the slide-in state, the third opening and at least a part of the second housing may be spaced apart from each other.

According to various example embodiments, in the slide-out state, at least a part of the third opening may be disposed at a position visible from the outside.

According to various example embodiments, the second lateral portion may include a fourth side surface facing at least a part of the first side surface, a fifth side surface extending from the fourth side surface and disposed parallel to the second side surface, and a sixth side surface extending from the fifth side surface and facing at least a part of the third side surface, and the sixth side surface may be hidden at least in part through the second lateral cover so as not to be seen from the outside.

According to various example embodiments, in the slide-in state, the third opening may be hidden by a bent portion bent from the second lateral cover.

While the disclosure has been illustrated and described with reference to various example embodiments, it will be understood that the various example embodiments are intended to be illustrative, not limiting. It will be further understood by one skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a first housing;
a second housing configured to move with respect to the first housing between a slide-in state and a slide-out state;
a flexible display having an exposed area that changes based on movement of the second housing with respect to the first housing;
a speaker disposed at a position corresponding to a first opening formed in at least a part of the second housing; and
a flexible printed circuit board (FPCB) configured to connect the speaker to a first substrate disposed on the first housing,
wherein the first housing further includes an accommodating portion configured to accommodate the speaker in the slide-in state, and
wherein the speaker is displaceable with the second housing relative to the first housing into the accommodating portion adjacent to the first substrate in the slide-in state and out of the accommodating portion in the slide-out state.

2. The electronic device of claim 1, further comprising a bendable support connected to the first housing, wherein a part of the flexible display is supported by the bendable support.

3. The electronic device of claim 1, wherein the first housing includes a first space formed through a first lateral member including a first side surface, a second side surface extending in a direction perpendicular to the first side surface, and a third side surface extending parallel to the first side surface from the second side surface, the first housing including a first support extending from the first lateral member to the first space, the first space being formed through the first lateral member,
wherein the second housing includes a second space formed through a second lateral member, the second housing including a second support extending from the second lateral member to the second space, the second space being formed through the second lateral member,
wherein at least a part of the first support and at least a part of the second support are configured to be slidably combined with each other,
wherein at least a part of the first and third side surfaces is accommodated in the second space in the slide-in state so as not to be visible from the outside, and
wherein the speaker is disposed at a position not subject to interference from the first side surface and/or the second side surface in the slide-in state.

4. The electronic device of claim 3, wherein the second lateral member includes a fourth side surface corresponding to at least a part of the first side surface, a fifth side surface extending from the fourth side surface and disposed parallel to the second side surface, and a sixth side surface extending from the fifth side surface and corresponding to at least a part of the third side surface, and
wherein in the slide-in state, the first side surface is hidden by the fourth side surface, and the third side surface is hidden by the sixth side surface.

5. The electronic device of claim 4, wherein the first opening is formed through the fourth side surface, and the speaker is fastened through at least one fastener in the second space to face the first opening.

6. The electronic device of claim 5, further comprising:
a first lateral cover disposed on the fourth side surface and having a second opening formed at a position corresponding to the first opening.

7. The electronic device of claim 6, wherein the second opening has substantially a same size and shape as the first opening.

8. The electronic device of claim 6, further comprising:
a seal disposed between the fourth side surface and the first lateral cover to surround the first opening and the second opening.

9. The electronic device of claim 8, wherein the seal includes at least one of sponge, rubber, urethane, and silicone.

10. The electronic device of claim 5, wherein the at least one fastener includes at least one screw.

11. The electronic device of claim 3, wherein the accommodating portion is provided through a structural shape of the first support.

12. The electronic device of claim 3, further comprising:
a second substrate disposed in the first space; and
a connection cable electrically connecting the first substrate and the second substrate.

13. The electronic device of claim 3, further comprising:
a receiver disposed in the first space and in communication with the outside through a third opening formed on the third side surface of the first housing,
wherein in the slide-in state, the third opening is hidden through at least a part of the second housing so as not to be seen from the outside.

14. The electronic device of claim 13, wherein in the slide-in state, the third opening and at least a part of the second housing are spaced apart from each other.

15. The electronic device of claim 13, wherein in the slide-out state, at least a part of the third opening is disposed at a position visible from the outside.

16. The electronic device of claim 13, wherein the second lateral portion includes a fourth side surface facing at least a part of the first side surface, a fifth side surface extending from the fourth side surface and disposed parallel to the second side surface, and a sixth side surface extending from the fifth side surface and facing at least a part of the third side surface, and the sixth side surface may be hidden at least in part through the second lateral cover so as not to be seen from the outside.

17. The electronic device of claim 16, wherein in the slide-in state, the third opening is configured to be hidden by a bent portion bent from the second lateral cover.

* * * * *